United States Patent
Amimoto et al.

(10) Patent No.: US 11,750,109 B2
(45) Date of Patent: Sep. 5, 2023

(54) POWER CONVERSION DEVICE

(71) Applicant: Mitsubishi Electric Corporation, Tokyo (JP)

(72) Inventors: Takeshi Amimoto, Tokyo (JP); Yu Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 98 days.

(21) Appl. No.: 17/618,505

(22) PCT Filed: Jul. 26, 2019

(86) PCT No.: PCT/JP2019/029431
§ 371 (c)(1),
(2) Date: Dec. 13, 2021

(87) PCT Pub. No.: WO2021/019603
PCT Pub. Date: Feb. 4, 2021

(65) Prior Publication Data
US 2022/0239234 A1    Jul. 28, 2022

(51) Int. Cl.
*H02M 7/483* (2007.01)
*H02M 1/34* (2007.01)
(Continued)

(52) U.S. Cl.
CPC .......... *H02M 7/483* (2013.01); *H02M 1/34* (2013.01); *H02M 7/487* (2013.01); *H02M 7/53871* (2013.01)

(58) Field of Classification Search
CPC ...... H02M 7/483; H02M 7/44; H02M 7/5395; H02M 7/487; H02M 7/53871; H02M 7/5387; H02M 1/34; H02M 1/007
See application file for complete search history.

(56) References Cited

U.S. PATENT DOCUMENTS 8,542,467 B2 *   9/2013  Yamaguchi ........... H02M 7/003
                                                          361/18
2014/0369088 A1  12/2014 Yoo
(Continued)

FOREIGN PATENT DOCUMENTS

EP       3029821 A1    6/2016
JP    2013-172530 A    9/2013
(Continued)

OTHER PUBLICATIONS

International Search Report and Written Opinion dated Oct. 21, 2019, received for PCT Application PCT/JP2019/029431, Filed on Jul. 26, 2019, 9 pages including English Translation.
(Continued)

*Primary Examiner* — Adolf D Berhane
(74) *Attorney, Agent, or Firm* — XSENSUS LLP

(57) ABSTRACT

The connection distance between a first snubber circuit and the positive electrode of a first semiconductor element is shorter than the connection distance between the first snubber circuit and the positive electrode of a third semiconductor element. The connection distance between the first snubber circuit and the negative electrode of a fourth semiconductor element is shorter than the connection distance between the first snubber circuit and the negative electrode of a second semiconductor element. The connection distance between a second snubber circuit and the positive electrode of the third semiconductor element is shorter than the wiring distance between the second snubber circuit and the positive electrode of the first semiconductor element, and the connection distance between the second snubber circuit and the negative electrode of the second semiconductor element is shorter than the wiring distance between the second snubber circuit and the negative electrode of the fourth semiconductor element.

17 Claims, 58 Drawing Sheets

(51) Int. Cl.
*H02M 7/487* (2007.01)
*H02M 7/5387* (2007.01)

(56) References Cited

U.S. PATENT DOCUMENTS

2018/0183349 A1* 6/2018 Kadota ................ H02M 7/003
2022/0181990 A1* 6/2022 Amimoto ............ H02M 1/0009

FOREIGN PATENT DOCUMENTS

| JP | 2015-2677 A | 1/2015 |
| JP | 2015-33217 A | 2/2015 |
| JP | 2015-65781 A | 4/2015 |
| JP | 2017-127114 A | 7/2017 |
| JP | 2017-127115 A | 7/2017 |

OTHER PUBLICATIONS

Fuji Electric Co. Ltd., "Protection Circuit Design", Application Manual of IGBT Module, 33 pages including English Translation.

* cited by examiner

FIG.33

| OPERATION PATTERN | 1 | 2 | 3 | 4 |
|---|---|---|---|---|
| VOLTAGE/CURRENT | AC VOLTAGE (POSITIVE) AC CURRENT (POSITIVE) | AC VOLTAGE (NEGATIVE) AC CURRENT (NEGATIVE) | AC VOLTAGE (POSITIVE) AC CURRENT (NEGATIVE) | AC VOLTAGE (NEGATIVE) AC CURRENT (POSITIVE) |
| SEMICONDUCTOR ELEMENT 5 | OFF SURGE | — | RECOVERY SURGE | — |
| SEMICONDUCTOR ELEMENT 6 | — | OFF SURGE | — | RECOVERY SURGE |
| SEMICONDUCTOR ELEMENT 7 | — | OFF SURGE | — | RECOVERY SURGE |
| SEMICONDUCTOR ELEMENT 8 | OFF SURGE | — | RECOVERY SURGE | — |
| SEMICONDUCTOR ELEMENT 9 | — | RECOVERY SURGE | — | OFF SURGE |
| SEMICONDUCTOR ELEMENT 10 | RECOVERY SURGE | — | OFF SURGE | — |
| SURGE-PRODUCING CURRENT PATH | DC POWER SUPPLY 2– SEMICONDUCTOR ELEMENT 5– SEMICONDUCTOR ELEMENT 9– SEMICONDUCTOR ELEMENT 10– SEMICONDUCTOR ELEMENT 8– DC POWER SUPPLY 2 | DC POWER SUPPLY 2– SEMICONDUCTOR ELEMENT 7– SEMICONDUCTOR ELEMENT 10– SEMICONDUCTOR ELEMENT 9– SEMICONDUCTOR ELEMENT 6– DC POWER SUPPLY 2 | DC POWER SUPPLY 2– SEMICONDUCTOR ELEMENT 5– SEMICONDUCTOR ELEMENT 9– SEMICONDUCTOR ELEMENT 10– SEMICONDUCTOR ELEMENT 8– DC POWER SUPPLY 2 | DC POWER SUPPLY 2– SEMICONDUCTOR ELEMENT 7– SEMICONDUCTOR ELEMENT 10– SEMICONDUCTOR ELEMENT 9– SEMICONDUCTOR ELEMENT 6– DC POWER SUPPLY 2 |

FIG.37

| OPERATION PATTERN | 1 | 2 | 3 | 4 |
|---|---|---|---|---|
| VOLTAGE/CURRENT | AC VOLTAGE (POSITIVE) AC CURRENT (POSITIVE) | AC VOLTAGE (NEGATIVE) AC CURRENT (NEGATIVE) | AC VOLTAGE (POSITIVE) AC CURRENT (NEGATIVE) | AC VOLTAGE (NEGATIVE) AC CURRENT (POSITIVE) |
| SEMICONDUCTOR ELEMENT 5 | OFF SURGE | RECOVERY SURGE | RECOVERY SURGE | OFF SURGE |
| SEMICONDUCTOR ELEMENT 6 | RECOVERY SURGE | OFF SURGE | OFF SURGE | RECOVERY SURGE |
| SEMICONDUCTOR ELEMENT 7 | RECOVERY SURGE | OFF SURGE | OFF SURGE | RECOVERY SURGE |
| SEMICONDUCTOR ELEMENT 8 | OFF SURGE | RECOVERY SURGE | RECOVERY SURGE | OFF SURGE |
| SURGE-PRODUCING CURRENT PATH | DC POWER SUPPLY 2− SEMICONDUCTOR ELEMENT 5− SEMICONDUCTOR ELEMENT 6− DC POWER SUPPLY 2<br><br>DC POWER SUPPLY 2− SEMICONDUCTOR ELEMENT 7− SEMICONDUCTOR ELEMENT 8− DC POWER SUPPLY 2 | DC POWER SUPPLY 2− SEMICONDUCTOR ELEMENT 5− SEMICONDUCTOR ELEMENT 6− DC POWER SUPPLY 2<br><br>DC POWER SUPPLY 2− SEMICONDUCTOR ELEMENT 7− SEMICONDUCTOR ELEMENT 8− DC POWER SUPPLY 2 | DC POWER SUPPLY 2− SEMICONDUCTOR ELEMENT 5− SEMICONDUCTOR ELEMENT 6− DC POWER SUPPLY 2<br><br>DC POWER SUPPLY 2− SEMICONDUCTOR ELEMENT 7− SEMICONDUCTOR ELEMENT 8− DC POWER SUPPLY 2 | DC POWER SUPPLY 2− SEMICONDUCTOR ELEMENT 5− SEMICONDUCTOR ELEMENT 6− DC POWER SUPPLY 2<br><br>DC POWER SUPPLY 2− SEMICONDUCTOR ELEMENT 7− SEMICONDUCTOR ELEMENT 8− DC POWER SUPPLY 2 |

FIG.53

| OPERATION PATTERN | 1 | 2 | 3 | 4 |
|---|---|---|---|---|
| VOLTAGE/CURRENT | AC VOLTAGE (POSITIVE) AC CURRENT (POSITIVE) | AC VOLTAGE (NEGATIVE) AC CURRENT (NEGATIVE) | AC VOLTAGE (POSITIVE) AC CURRENT (NEGATIVE) | AC VOLTAGE (NEGATIVE) AC CURRENT (POSITIVE) |
| SEMICONDUCTOR ELEMENT 5 | OFF SURGE | — | RECOVERY SURGE | — |
| SEMICONDUCTOR ELEMENT 6 | — | OFF SURGE | — | RECOVERY SURGE |
| SEMICONDUCTOR ELEMENT 7 | — | OFF SURGE | — | RECOVERY SURGE |
| SEMICONDUCTOR ELEMENT 8 | OFF SURGE | — | RECOVERY SURGE | — |
| SEMICONDUCTOR ELEMENT 81 | RECOVERY SURGE | — | OFF SURGE | — |
| SEMICONDUCTOR ELEMENT 82 | — | RECOVERY SURGE | — | OFF SURGE |
| SEMICONDUCTOR ELEMENT 83 | — | RECOVERY SURGE | — | OFF SURGE |
| SEMICONDUCTOR ELEMENT 84 | RECOVERY SURGE | — | OFF SURGE | — |
| SURGE-PRODUCING CURRENT PATH | DC POWER SUPPLY 2− SEMICONDUCTOR ELEMENT 5− SEMICONDUCTOR ELEMENT 82− SEMICONDUCTOR ELEMENT 81− SEMICONDUCTOR ELEMENT 83− SEMICONDUCTOR ELEMENT 84− SEMICONDUCTOR ELEMENT 8− DC POWER SUPPLY 2 | DC POWER SUPPLY 2− SEMICONDUCTOR ELEMENT 7− SEMICONDUCTOR ELEMENT 84− SEMICONDUCTOR ELEMENT 83− SEMICONDUCTOR ELEMENT 81− SEMICONDUCTOR ELEMENT 82− SEMICONDUCTOR ELEMENT 6− DC POWER SUPPLY 2 | DC POWER SUPPLY 2− SEMICONDUCTOR ELEMENT 5− SEMICONDUCTOR ELEMENT 82− SEMICONDUCTOR ELEMENT 81− SEMICONDUCTOR ELEMENT 83− SEMICONDUCTOR ELEMENT 84− SEMICONDUCTOR ELEMENT 8− DC POWER SUPPLY 2 | DC POWER SUPPLY 2− SEMICONDUCTOR ELEMENT 7− SEMICONDUCTOR ELEMENT 84− SEMICONDUCTOR ELEMENT 83− SEMICONDUCTOR ELEMENT 81− SEMICONDUCTOR ELEMENT 82− SEMICONDUCTOR ELEMENT 6− DC POWER SUPPLY 2 |

POWER CONVERSION DEVICE

CROSS-REFERENCE TO RELATED APPLICATION

The present application is based on PCT filing PCT/JP2019/029431, filed Jul. 26, 2019 the entire contents of which are incorporated herein by reference.

TECHNICAL FIELD

The present disclosure relates to a power conversion device.

BACKGROUND ART

As a typical example of power conversion devices, an inverter is used to convert DC power into AC power. The inverter has a plurality of semiconductor switching elements that perform on/off operation (switching operation) and performs DC/AC power conversion using a filter configured with a reactor and a capacitor.

Three-level power conversion devices are known as an example of inverters. For example, Japanese Patent Laying-Open No. 2017-127114 (PTL 1) describes a three-level power conversion device including a clamp circuit in addition to a bridge circuit having a plurality of semiconductor switching elements and a filter circuit.

In the configuration in PTL 1, the bridge circuit converts DC voltage and outputs AC voltage. The filter circuit attenuates a high frequency component of the AC voltage output from the bridge circuit. Furthermore, the clamp circuit is connected between the bridge circuit and the filter circuit to short-circuit the output side of the bridge circuit. The switching elements included in the bridge circuit and the clamp circuit are controlled whereby AC voltage having three or more voltage levels can be output from the filter circuit.

CITATION LIST

Patent Literature

PTL 1: Japanese Patent Laying-Open No. 2017-127114

SUMMARY OF INVENTION

Technical Problem

It is known that surge voltage resulting from current change associated with on/off during switching operation of semiconductor switching elements is produced when an inverter is operated. The surge voltage is reduced, for example, by arranging a snubber capacitor.

Unfortunately, PTL 1 does not mention an effective configuration for reducing the surge voltage in the configuration of the three-level power conversion device as described above.

Therefore, an object of the present disclosure is to provide a circuit configuration for reducing the surge voltage produced in semiconductor elements of a three-level power conversion device.

Solution to Problem

According to an aspect of the present disclosure, a power conversion device includes a first leg and a second leg connected in parallel, first and second snubber circuits, and at least one semiconductor element. The first leg includes first and second semiconductor elements connected to each other in series. The second leg includes third and fourth semiconductor elements connected to each other in series. The first snubber circuit is connected in parallel with the first leg and the second leg. The second snubber circuit is connected in parallel with the first leg, the second leg, and the first snubber circuit. The at least one semiconductor element is electrically connected between a midpoint of the first leg that is a connection point of the first semiconductor element and the second semiconductor element and a midpoint of the second leg that is a connection point of the third semiconductor element and the fourth semiconductor element. A positive electrode of the first semiconductor element and a positive electrode of the third semiconductor element are connected to each other, a negative electrode of the first semiconductor element and a negative electrode of the second semiconductor element are connected, a negative electrode of the third semiconductor element and a positive electrode of the fourth semiconductor element are connected, and a negative electrode of the second semiconductor element and a negative electrode of the fourth semiconductor element are connected. A connection distance between the first snubber circuit and the positive electrode of the first semiconductor element is shorter than a connection distance between the first snubber circuit and the third semiconductor element, and a connection distance between the first snubber circuit and the negative electrode of the fourth semiconductor element is shorter than a connection distance between the first snubber circuit and the negative electrode of the second semiconductor element. A connection distance between the second snubber circuit and the positive electrode of the third semiconductor element is shorter than a connection distance between the second snubber circuit and the positive electrode of the first semiconductor element, and a connection distance between the second snubber circuit and the negative electrode of the second semiconductor element is shorter than a connection distance between the second snubber circuit and the negative electrode of the fourth semiconductor element.

Advantageous Effects of Invention

The present disclosure can reduce wiring inductance on a path including the first or second snubber circuit formed in parallel with the semiconductor elements in a path of current causing surge voltage, thereby reducing the surge voltage produced in the semiconductor element.

BRIEF DESCRIPTION OF DRAWINGS

FIG. 33 is a table showing a list of semiconductor elements in which surge voltage is produced and a current path causing surge voltage in each operation pattern of the power conversion device according to the first embodiment.

FIG. 37 is a table showing a list of semiconductor elements in which surge voltage is produced and a current path causing surge voltage in each operation pattern of the two-level inverter shown in FIG. 34.

FIG. 53 is a table showing a list of semiconductor elements in which surge voltage is produced and a current path causing surge voltage in each operation pattern of the power conversion device according to the third embodiment.

DESCRIPTION OF EMBODIMENTS

Figure 1:
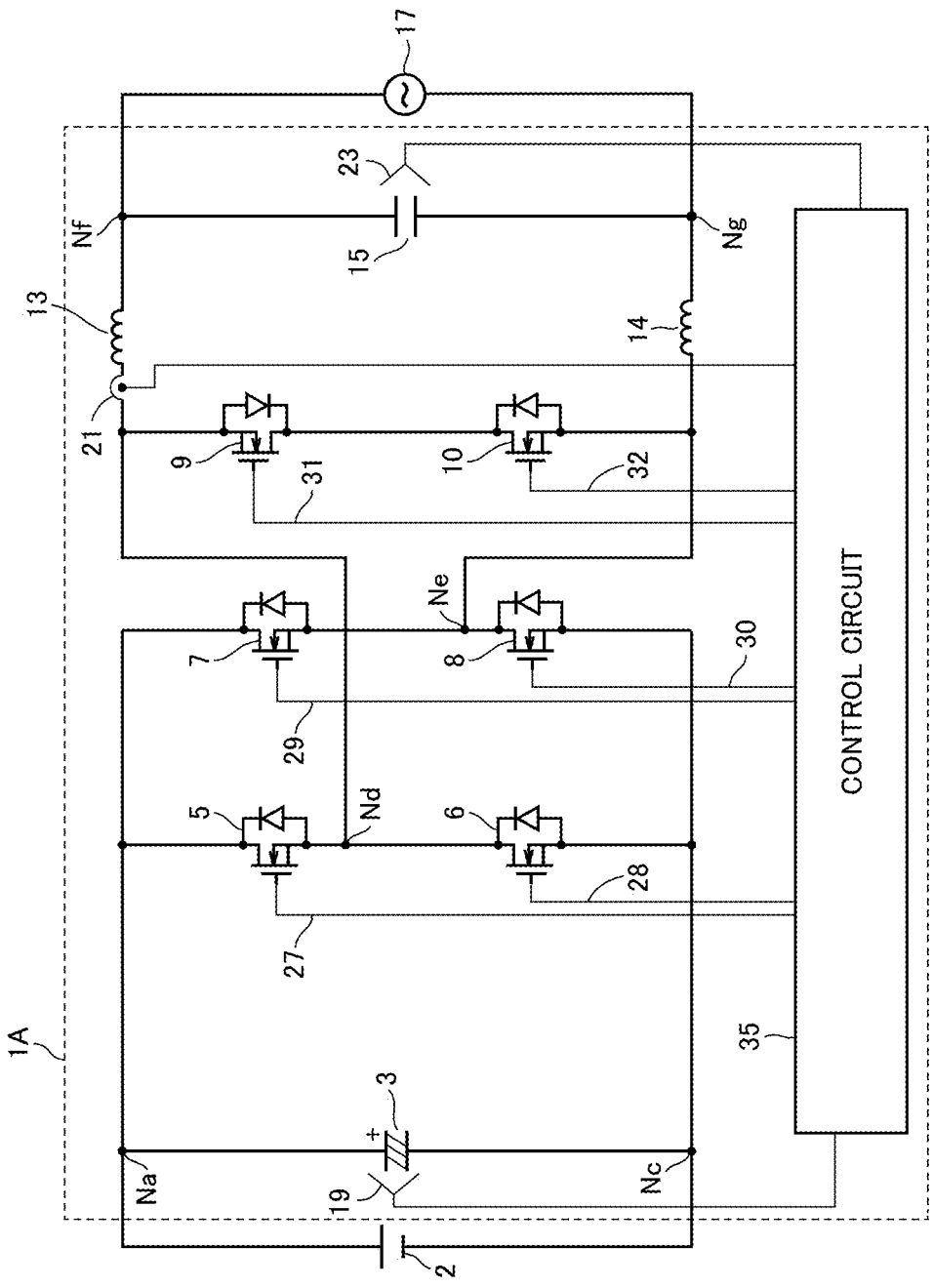
FIG. 1 is a circuit diagram depicting a configuration of a power conversion device according to a first embodiment.

Embodiments of the present disclosure will be described in detail below with reference to the drawings. In the following, like or corresponding parts in the drawings are denoted by like reference signs and a description thereof is basically not repeated.

First Embodiment (Circuit Configuration)
FIG. 1 is a circuit diagram depicting a configuration of a power conversion device according to a first embodiment.

Referring to FIG. 1, a power conversion device 1A according to the first embodiment has a main circuit configuration similar to that of the three-level power conversion device having a clamp circuit described in PTL 1. A DC power supply 2 and an AC power supply 17 are respectively connected to the input side (DC side) and the output side (AC side) of power conversion device 1A.

DC power supply 2 is configured with, for example, a DC regulated power supply, a fuel cell, a solar cell, a wind power generator, or a storage battery. DC power supply 2 may include a converter for DC/DC conversion of output from these power supplies. AC power supply 17 is configured with, for example, a power system or an AC load.

When DC power supply 2 is configured with a rechargeable secondary battery, power conversion device 1A can perform not only power transmission through DC/AC conversion from the input side (DC side) to the output side (AC side) but also AC/DC conversion from the AC side to the DC side. Although AC power supply 17 is depicted as a single-phase two-wire system in FIG. 1, AC power supply 17 may be configured as a single-phase three-wire system.

Power conversion device 1A includes a smoothing capacitor 3, semiconductor elements 5 to 10, output filter reactors 13 and 14, an output filter capacitor 15, voltage detectors 19 and 23, a current detector 21, and a control circuit 35. Voltage detector 19 detects a voltage at smoothing capacitor 3. Voltage detector 23 detects a voltage at output filter capacitor 15. Current detector 21 detects a current at output filter reactor 13.

Each of semiconductor elements 5 to 10 is configured with a switching element capable of on/off control, such as an insulated gate bipolar transistor (IGBT) or a metal-oxide-semiconductor field-effect transistor (MOSFET), and has a positive electrode, a negative electrode, and a control electrode. For example, when semiconductor elements 5 to 10 are IGBTs, the positive electrode corresponds to collector, the negative electrode corresponds to emitter, and the control electrode corresponds to gate. When semiconductor elements 5 to 10 are MOSFETs, the positive electrode corresponds to drain, the negative electrode corresponds to source, and the control electrode corresponds to gate. Semiconductor elements 5 to 10 each contain or are each externally connected to an antiparallel diode for forming a current path in a direction from the negative electrode to the positive electrode.

A node Na is connected to the positive side of DC power supply 2 and one end of smoothing capacitor 3. Node Na is further connected to the positive electrodes of semiconductor element 5 and semiconductor element 7. A node Nc is connected to the negative side of DC power supply 2 and the other end of smoothing capacitor 3. Node Nc is further connected to the positive electrodes of semiconductor element 6 and semiconductor element 8.

Semiconductor element 5 and semiconductor element 6 are connected in series through a node Nd. The negative electrode of semiconductor element 5 and the positive electrode of semiconductor element 6 are therefore connected to node Nd. Semiconductor element 5 and semiconductor element 6 connected in series constitute a "first leg". Node Nd corresponds to the midpoint of the first leg.

Similarly, semiconductor element 7 and semiconductor element 8 are connected through a node Ne and thus the negative electrode of semiconductor element 7 and the positive electrode of semiconductor element 8 are connected to node Ne. Semiconductor element 7 and semiconductor element 8 connected in series constitute a "second leg". Node Ne corresponds to the midpoint of the second leg. The first leg and the second leg connected in parallel, that is, semiconductor elements 5 to 8 constitute a full bridge-type bridge circuit. In power conversion device 1A, the first leg, the second leg, DC power supply 2, and smoothing capacitor 3 are connected to each other in parallel.

Node Nd is further connected to the negative electrode of semiconductor element 9 and one end of output filter reactor 13. Node Ne is further connected to the negative electrode of semiconductor element 10 and one end of output filter reactor 14. The positive electrodes of semiconductor element 9 and semiconductor element 10 are therefore connected to each other.

When semiconductor element 10 is ON, a current path is formed between node Nd and node Ne in a direction from node Nd to node Ne. On the other hand, when semiconductor element 9 is ON, a current path is formed in a direction from node Ne to node Nd. In this way, semiconductor element 9 and semiconductor element 10 connected in series in opposite polarities constitute a bidirectional switch.

Output filter capacitor 15 is connected between a node Nf and a node Ng. Node Nf is further connected to the other end of output filter reactor 13 and one end of AC power supply 17. Similarly, node Ng is further connected to the other end of output filter reactor 14 and the other end of AC power supply 17.

Detection values from voltage detector 19, current detector 21, and voltage detector 23 are input to control circuit 35. Control circuit 35 outputs a drive signal 27 for driving semiconductor element 5, a drive signal 28 for driving semiconductor element 6, a drive signal 29 for driving semiconductor element 7, a drive signal 30 for driving semiconductor element 8, a drive signal 31 for driving semiconductor element 9, and a drive signal 32 for driving semiconductor element 10. Drive signals 27 to 32 are transmitted to the control electrodes of semiconductor elements 5 to 10, respectively. As a result, semiconductor elements 5 to 9 are on/off-controlled in response to drive signals 27 to 32, respectively, from control circuit 35.

Semiconductor elements 6 to 10 are depicted as MOSFETs in FIG. 1 but may be configured with other switching elements such as IGBTs. In the example in FIG. 1, since semiconductor elements 6 to 10 are MOSFETs, antiparallel diodes can be configured with body diodes without connecting external elements. Furthermore, smoothing capacitor 3 is assumed to be an electrolytic capacitor in FIG. 1 but may be configured with, for example, a film capacitor. Alternatively, a storage battery may be used instead of smoothing capacitor 3.

The operation of power conversion device 1A shown in FIG. 1 will now be described.

Figure 2:
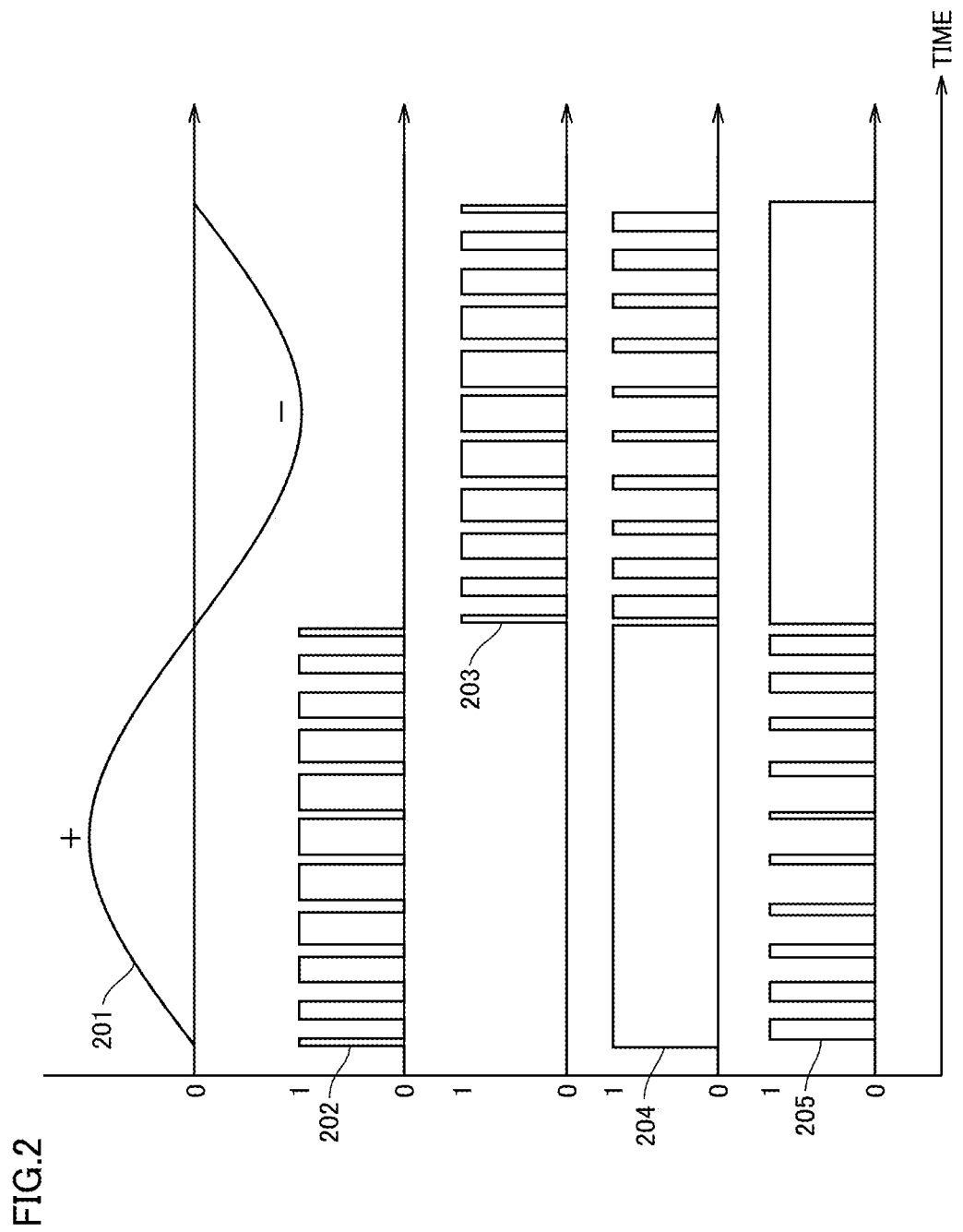
FIG. 2 is a waveform diagram depicting on/off control of semiconductor elements in the power conversion device shown in FIG. 1.

FIG. 2 is a waveform diagram depicting on/off control of semiconductor elements in power conversion device 1A shown in FIG. 1.

Referring to FIG. 2, with reference to an AC output command value 201, a drive signal 202 for semiconductor element 5 and semiconductor element 8, a drive signal 203 for semiconductor element 6 and semiconductor element 7, a drive signal 204 for semiconductor element 9, and a drive signal 205 for semiconductor element 10 are generated. The "1" period of each drive signal indicates the ON period of the corresponding semiconductor element, and the "0" period of each drive signal indicates the OFF period of the corresponding semiconductor element.

In a period in which AC output command value 201 is positive, drive signal 202 and drive signal 205 are alternately and complementarily set to "1" and "0". On the other hand, drive signal 203 is fixed to "0", and drive signal 204 is fixed to "1". Therefore, semiconductor element 6 and semiconductor element 7 are always turned off and semiconductor element 9 is always turned on. On the other hand, semiconductor elements 5, 8, and 10 are switching-controlled. Specifically, semiconductor element 5 and semiconductor element 8 are turned on/off in common, and semiconductor element 10 is turned on/off complementarily to semiconductor element 5 and semiconductor element 8.

On the other hand, in a period in which AC output command value 201 is negative, drive signal 203 and drive signal 204 are alternately and complementarily set to "1" and "0". By contrast, drive signal 202 is fixed to "0", and drive signal 205 is fixed to "1". Therefore, semiconductor element 5 and semiconductor element 8 are always turned off and semiconductor element 10 is always turned on. On the other hand, semiconductor elements 6, 7, and 9 are switching-controlled. Specifically, semiconductor element 6 and semiconductor element 7 are turned on/off in common, and semiconductor element 9 is turned on/off complementarily to semiconductor element 6 and semiconductor element 7.

Drive signal 27 for semiconductor element 5 and drive signal 30 for semiconductor element 8 are generated in accordance with drive signal 202. Drive signal 28 for semiconductor element 6 and drive signal 29 for semiconductor element 7 are generated in accordance with drive signal 203. Drive signal 31 for semiconductor element 9 is generated in accordance with drive signal 204, and drive signal 32 for semiconductor element 10 is generated in accordance with drive signal 205.

Drive signals 27 to 32 have a deadtime when on/off of semiconductor elements 5 to 10 is switched. The deadtime is provided in order to prevent formation of an unintended short-circuited path of DC power supply 2 due to a certain time difference between the actual on/off timing of semiconductor elements 5 to 10 and the on/off timing by drive signals 27 to 32 when a plurality of semiconductor elements are switched.

As an example, the timing when semiconductor element 5 and semiconductor element 8 switch from ON to OFF and semiconductor element 10 complementarily switches from OFF to ON in a positive period of AC output command value 201 will be discussed. In a period in which AC output command value 201 is positive, semiconductor element 9 is always ON and therefore, if the OFF timing of semiconductor element 5 and semiconductor element 8 is delayed, all of semiconductor element 5, semiconductor element 8, semiconductor element 9, and semiconductor element 10 may temporarily enter the ON state. Accordingly, a path that short-circuits DC power supply 2 is produced, and overcurrent may cause a failure in power conversion device 1A.

Thus, in the case described above, the occurrence of a short-circuit is prevented by providing a period in which all of drive signals 27, 28, and 31 are "0" (deadtime) in order to turn off all of semiconductor elements 5, 8, and 10 at the timing when drive signals 202 and 205 change.

In a power conversion device of about a few (kW), the switching frequency of semiconductor elements is typically about a few tens of (kHz), and in this case, the deadtime of about a few (µs) is usually provided. Alternatively, in semiconductor elements including wide-bandgap semiconductor such as silicon carbide (SiC) or gallium nitride (GaN), the turn-off and turn-on times are short, and the deadtime may be about a few tens to a few hundreds of (ns) in some cases.

(Current Path of Power Conversion Device)

The operation patterns of power conversion device 1A include four patterns depending on combinations of positive/negative AC voltages and AC currents. In the following, a case where current of output filter reactor 13 flows from the left to the right in the drawing is defined as a case where AC current in power conversion device 1A is "positive". Furthermore, as for AC voltage, a case where the voltage at output filter capacitor 15 is positive on the output filter reactor 13 side and is negative on the output filter reactor 14 side is defined as a case where AC voltage is "positive".

Figure 3:
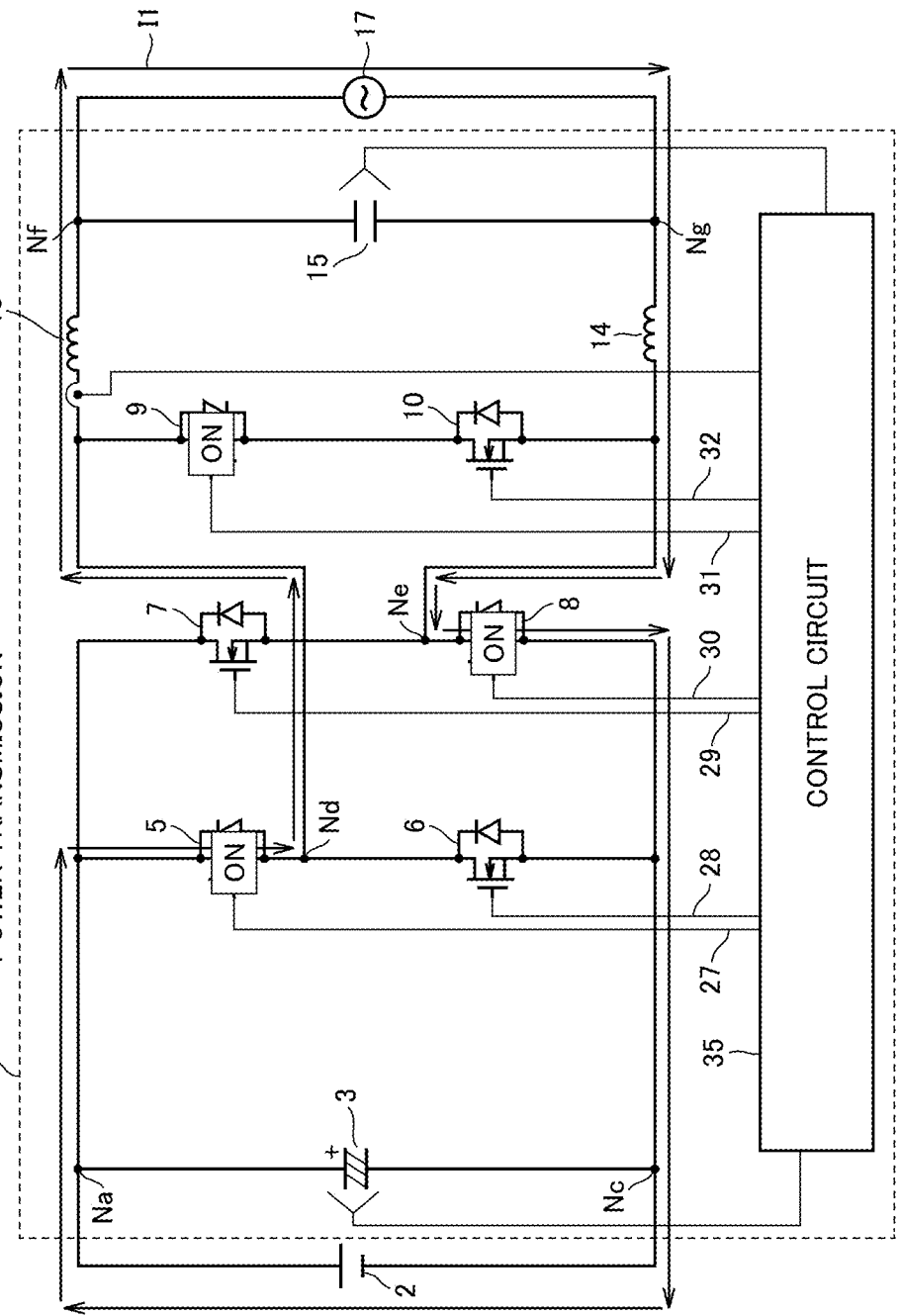
FIG. 3 is a circuit diagram depicting a current path in a power transmission period when AC voltage and AC current are positive (in a first operation pattern) in the power conversion device according to the first embodiment.
Figure 4:
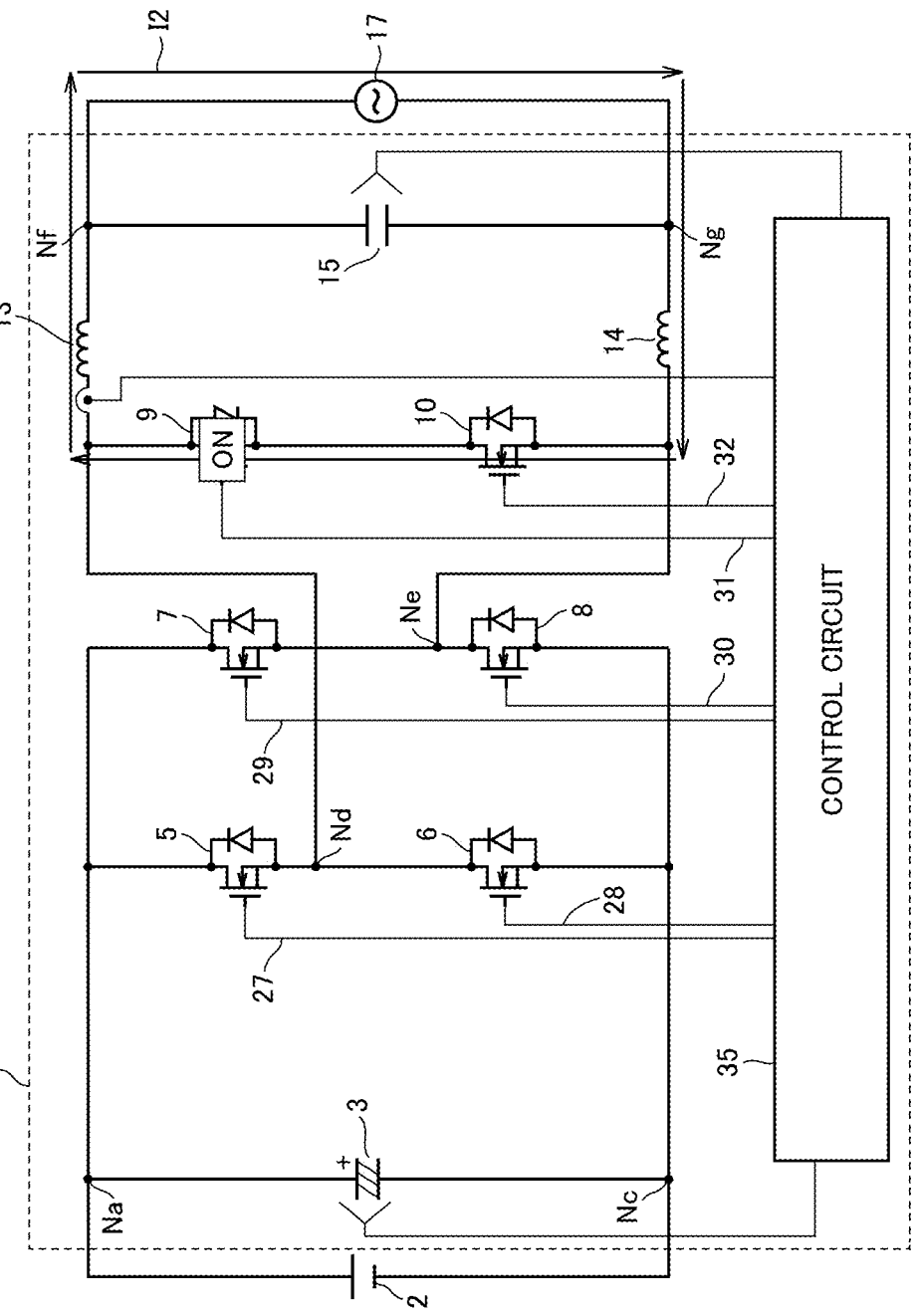
FIG. 4 is a second circuit diagram depicting a current path in a deadtime period in the first operation pattern of the power conversion device according to the first embodiment.
Figure 5:
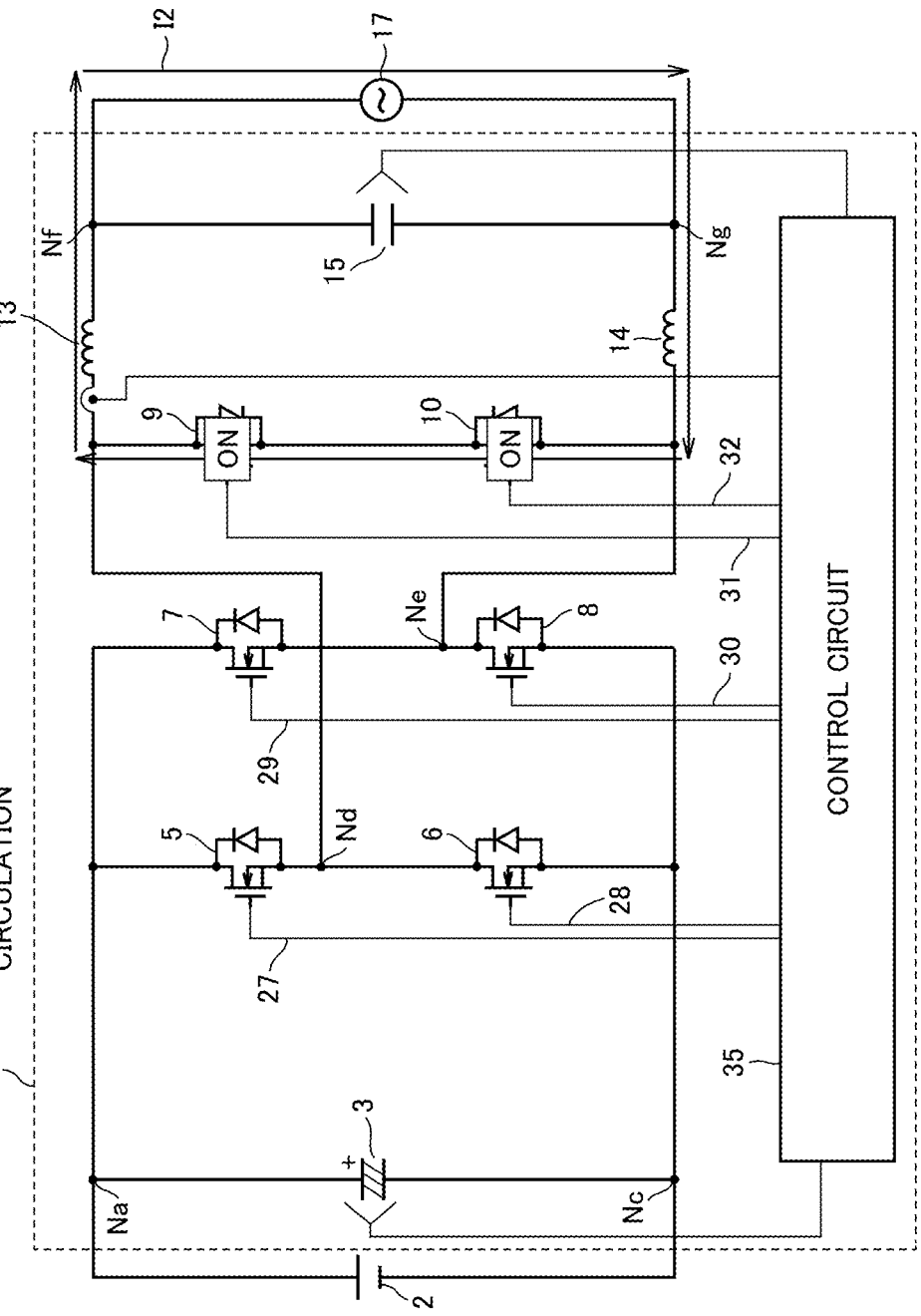
FIG. 5 is a third circuit diagram depicting a current path in a circulation period in the first operation pattern of the power conversion device according to the first embodiment.

Referring first to FIG. 3 to FIG. 5, a current path in power conversion device 1A in a first operation pattern in which AC voltage is positive and AC current is positive will be described. As described above, in a period in which AC voltage is positive, semiconductor element 9 is fixed to ON, and semiconductor element 6 and semiconductor element 7 are fixed to OFF. On the other hand, semiconductor element 5 and semiconductor element 8 as well as semiconductor element 10 are switching-controlled.

FIG. 3 shows a current path in the ON period of semiconductor element 5 and semiconductor element 8 (power transmission period) in the first operation pattern.

Referring to FIG. 3, in the ON period of semiconductor element 5 and semiconductor element 8, current I1 flows through a path of the positive side of DC power supply 2-semiconductor element 5-output filter reactor 13-AC power supply 17-output filter reactor 14-semiconductor element 8-the negative side of DC power supply 2.

Although the current path including DC power supply 2 and AC power supply 17 is illustrated below as a typical current path, in actuality, a current path including smoothing capacitor 3 and output filter capacitor 15 is also formed in parallel.

FIG. 4 shows a current path in a deadtime period in which semiconductor element 5 and semiconductor element 8 switch from ON to OFF.

Referring to FIG. 4, in a deadtime period, current I2 flows through a path including output filter reactor 13-AC power supply 17-output filter reactor 14-semiconductor element 10 (antiparallel diode)-semiconductor element 9.

FIG. 5 shows a current path (circulation period) when semiconductor element 10 switches from OFF to ON after the deadtime period (FIG. 4).

Referring to FIG. 5, in a circulation period, current I2 similar to that in FIG. 4 flows through a path including output filter reactor 13-AC power supply 17-output filter reactor 14-semiconductor element 10-semiconductor element 9. In a circulation period and a deadtime period, the current path (current I2) is the same but synchronous rectification is possible when semiconductor elements 5 to 10 are MOSFETs. Specifically, semiconductor element 10 switches from OFF to ON whereby the path of current I2 changes from the body diode (antiparallel diode) to the MOSFET (channel path from the positive electrode to the negative electrode). Thus, when a voltage drop in the MOSFET in the ON state is smaller than a voltage drop in passing through the body diode, power loss is reduced and the efficiency is thereby improved.

When semiconductor element 10 in the state in FIG. 5 (circulation period) switches from ON to OFF, a current path in a deadtime period shown in FIG. 4 is formed again. Thereafter, when semiconductor element 5 and semiconductor element 8 switch from OFF to ON, current I1 flows through the current path shown in FIG. 3 (transmission period) again.

Figure 6:
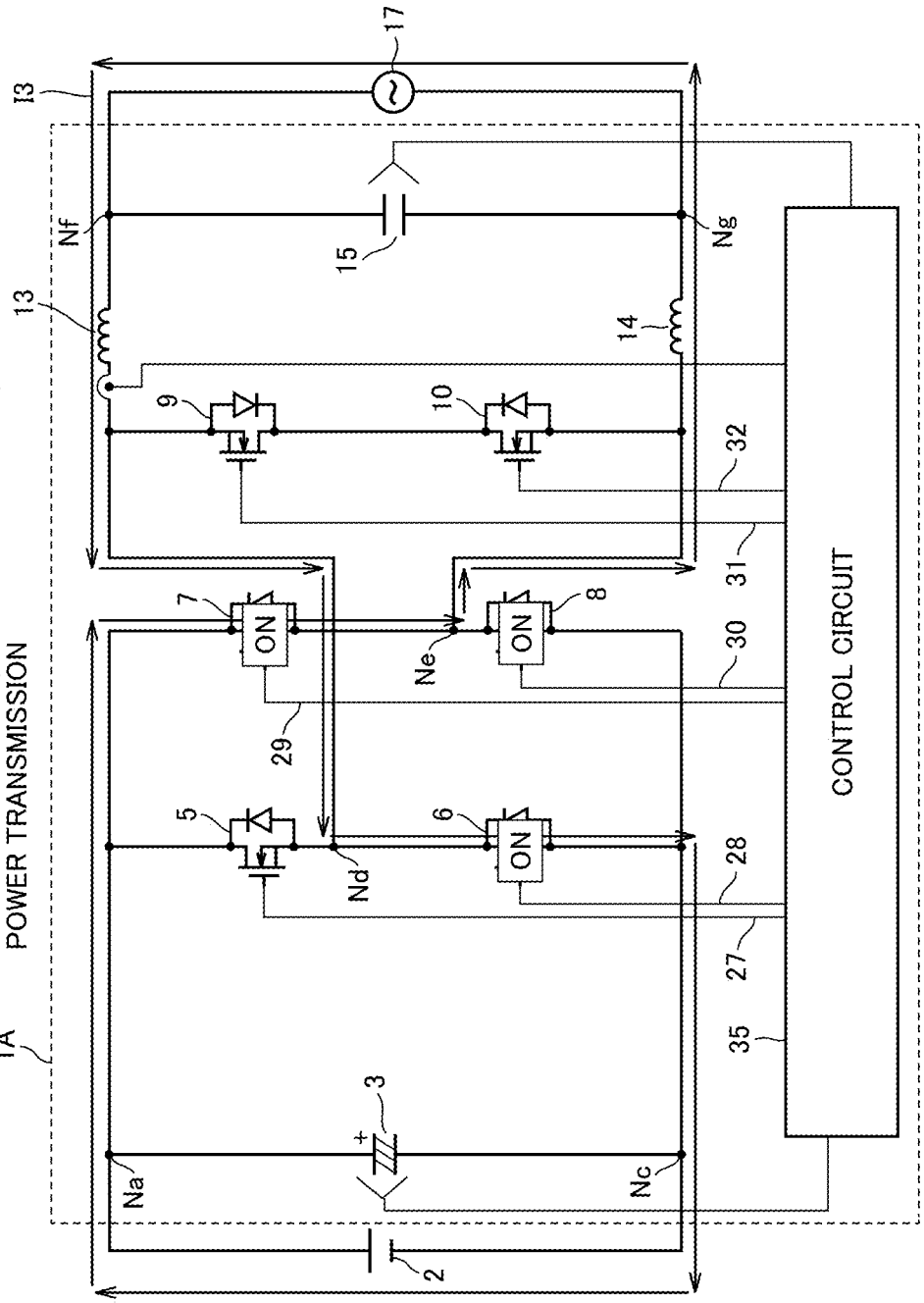
FIG. 6 is a circuit diagram depicting a current path in a power transmission period when AC voltage and AC current are negative (in a second operation pattern) in the power conversion device according to the first embodiment.
Figure 7:
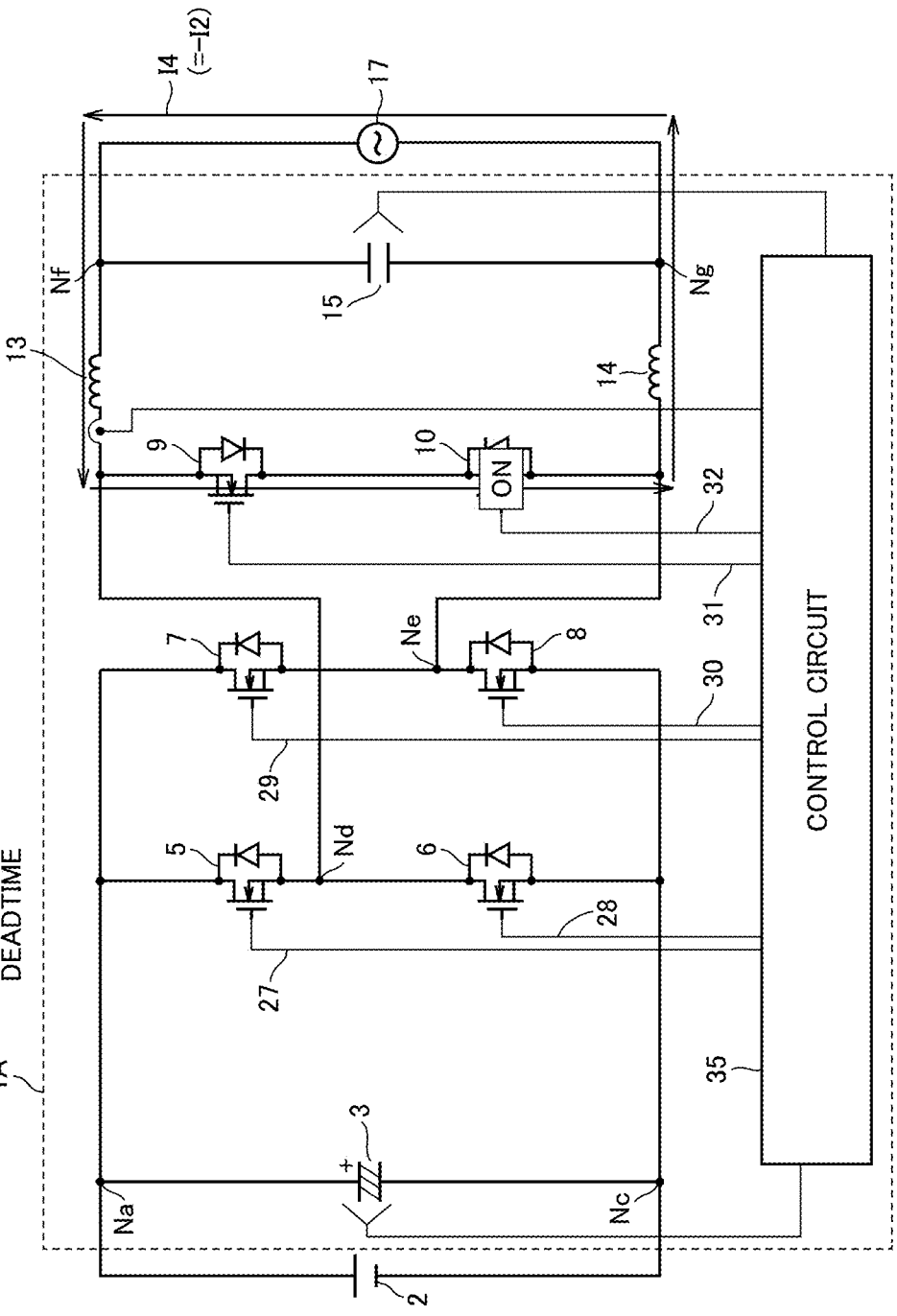
FIG. 7 is a circuit diagram depicting a current path in a deadtime period in the second operation pattern of the power conversion device according to the first embodiment.
Figure 8:
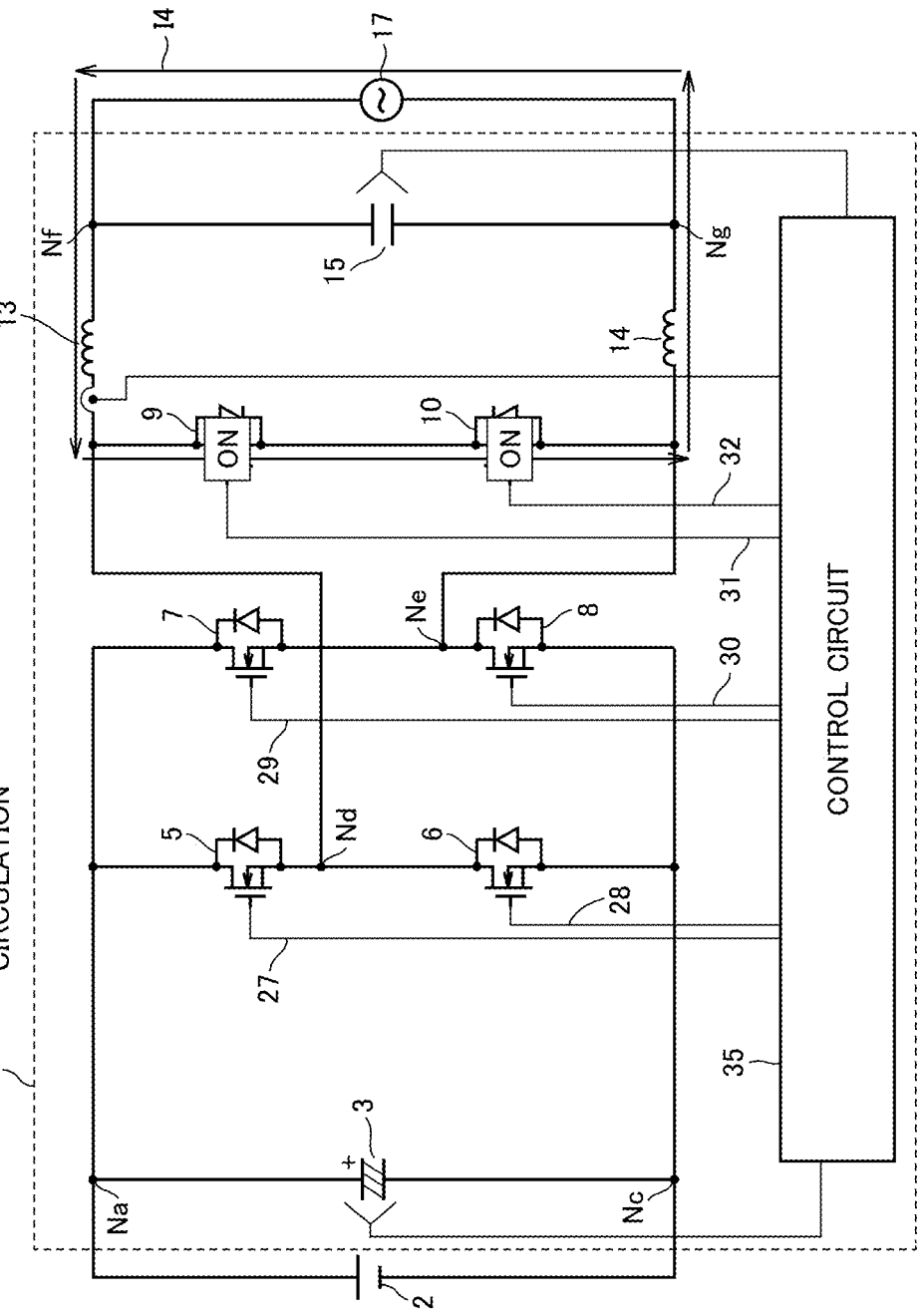
FIG. 8 is a circuit diagram depicting a current path in a circulation period in the second operation pattern of the power conversion device according to the first embodiment.

Referring now to FIG. 6 to FIG. 8, a current path in power conversion device 1A in a second operation pattern in which AC voltage is negative and AC current is negative will be described. When AC voltage is negative, the voltage at output filter capacitor 15 is negative on the output filter reactor 13 side and positive on the output filter reactor 14 side. When AC current is negative, current of output filter reactor 13 flows in a direction from right to left in the drawing. As described above, in a period in which AC voltage is negative, semiconductor element 10 is fixed to ON, and semiconductor element 5 and semiconductor element 8 are fixed to OFF. On the other hand, semiconductor element 6 and semiconductor element 7 as well as semiconductor element 9 are switching-controlled.

FIG. 6 shows a current path in the ON period of semiconductor element 6 and semiconductor element 7 (power transmission period) in the second operation pattern.

Referring to FIG. 6, in the ON period of semiconductor element 6 and semiconductor element 7, current I3 flows through a path of the positive side of DC power supply 2-semiconductor element 7-output filter reactor 14-AC power supply 17-output filter reactor 13-semiconductor element 6-the negative side of DC power supply 2.

FIG. 7 shows a current in a deadtime period in which semiconductor element 6 and semiconductor element 7 switch from ON to OFF.

Referring to FIG. 7, in a deadtime period, current I4 flows through a path of output filter reactor 14-AC power supply 17-output filter reactor 13-semiconductor element 9 (antiparallel diode)-semiconductor element 10. Current I4 flows through the same path as current I2 in FIG. 3 in a direction opposite to that of current I2.

FIG. 8 shows a current path that is a current path (circulation period) when semiconductor element 9 switches from OFF to ON after the deadtime period (FIG. 7).

Referring to FIG. 8, in a circulation period, current I4 similar to that in FIG. 7 flows through a path of output filter reactor 14-AC power supply 17-output filter reactor 13-semiconductor element 9-semiconductor element 10. In a circulation period, semiconductor element 9 is switched from OFF to ON, thereby improving efficiency by synchronous rectification, as described with reference to FIG. 5.

Figure 9:
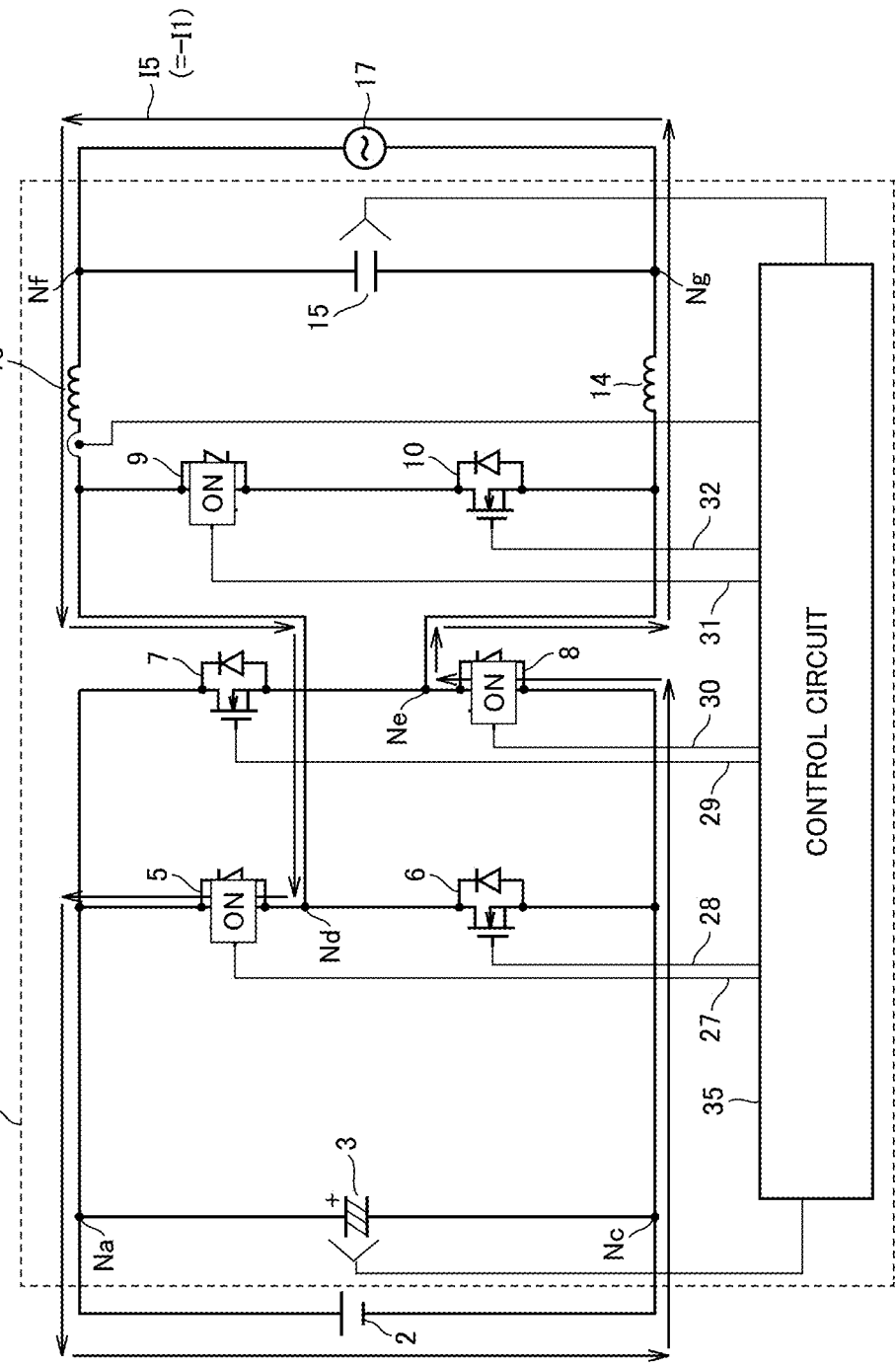
FIG. 9 is a circuit diagram depicting a current path in a power transmission period when AC voltage is positive and AC current is negative (in a third operation pattern) in the power conversion device according to the first embodiment.
Figure 10:
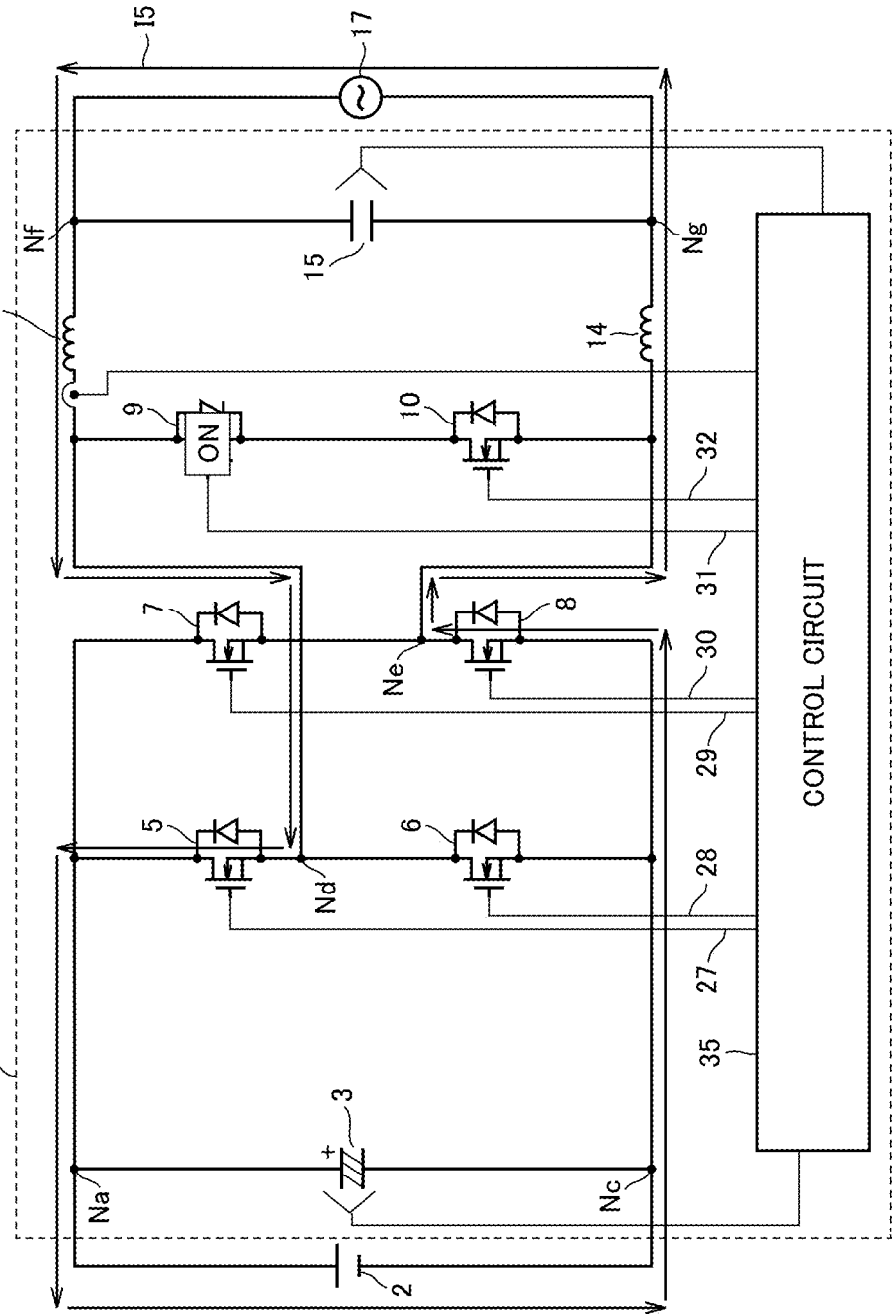
FIG. 10 is a circuit diagram depicting a current path in a deadtime period in the third operation pattern of the power conversion device according to the first embodiment.
Figure 11:
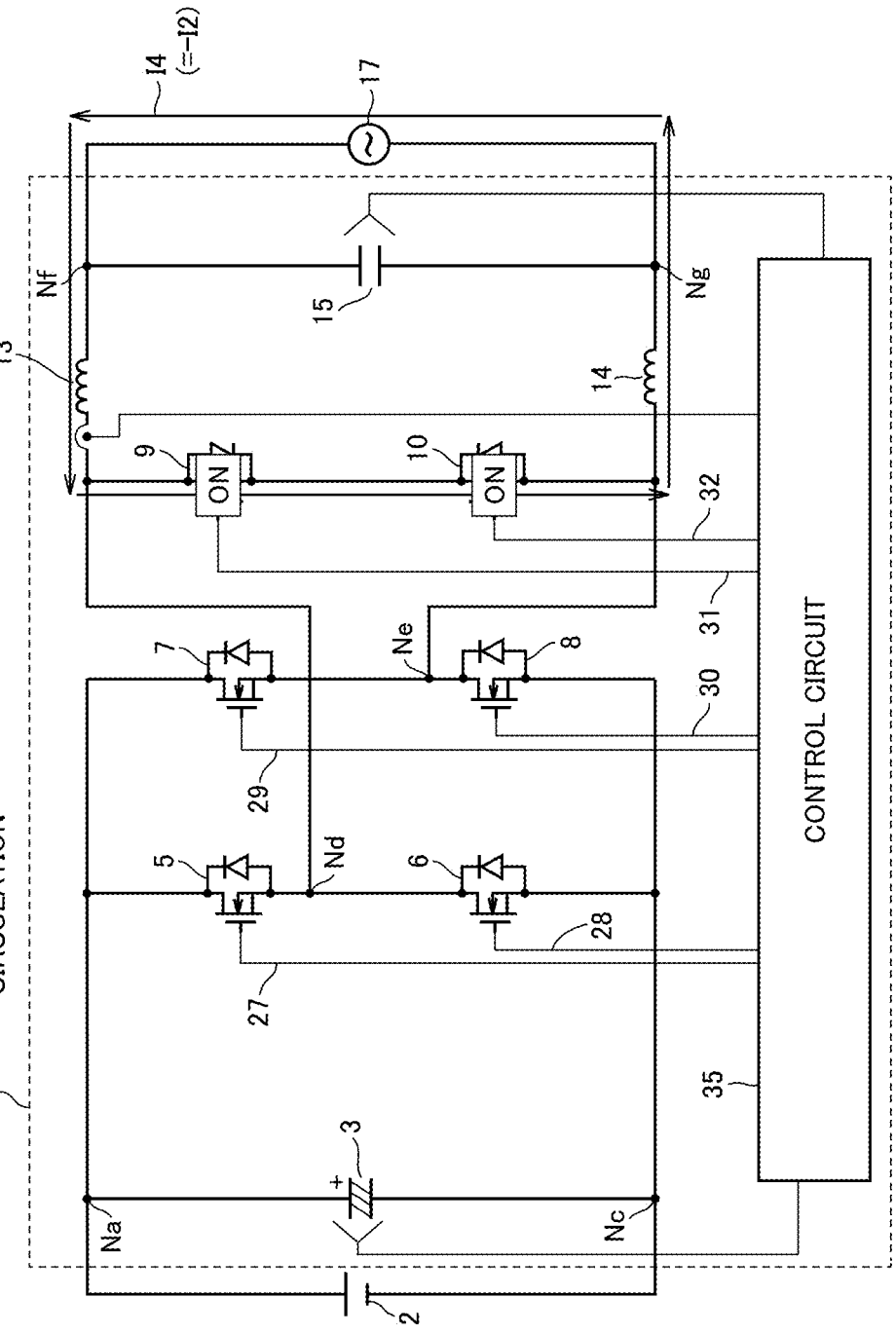
FIG. 11 is a circuit diagram depicting a current path in a circulation period in the third operation pattern of the power conversion device according to the first embodiment.

Referring now to FIG. 9 to FIG. 11, a current path in power conversion device 1A in a third operation pattern in which AC voltage is positive and AC current is negative will be described. In the third operation pattern, since AC voltage is positive, semiconductor element 9 is fixed to ON, and semiconductor element 6 and semiconductor element 7 are fixed to OFF, in the same manner as the first operation pattern. On the other hand, semiconductor element 5 and semiconductor element 8 as well as semiconductor element 10 are switching-controlled. Furthermore, current of output filter reactor 13 flows in the rightward direction from right in the drawing.

FIG. 9 shows a current path in the ON period of semiconductor element 5 and semiconductor element 8 (power transmission period) in the third operation pattern.

Referring to FIG. 9, in the ON period of semiconductor element 5 and semiconductor element 8, current I5 flows through a path of the negative side of DC power supply 2-semiconductor element 8-output filter reactor 14-AC power supply 17-output filter reactor 13-semiconductor element 5-the positive side of DC power supply 2. Current I5 flows through the same path as current I1 in FIG. 3 in a direction opposite to that of current I1.

FIG. 10 shows a current path in a deadtime period in which semiconductor element 5 and semiconductor element 8 switch from ON to OFF.

Referring to FIG. 10, in a deadtime period, current I5 flows through a path of the negative side of DC power supply 2-semiconductor element 8 (antiparallel diode)-output filter reactor 14-AC power supply 17-output filter reactor 13-semiconductor element 5 (antiparallel diode)-the positive side of DC power supply 2, that is, the same path as in FIG. 9.

FIG. 11 shows a current path that is a current path (circulation period) when semiconductor element 10 switches from OFF to ON after the deadtime period (FIG. 10).

Referring to FIG. 11, in a circulation period, current I4 flows through a path including output filter reactor 13-semiconductor element 9-semiconductor element 10-output filter reactor 14-AC power supply 17. Current I4 flows through the same path as the similar current I2 in FIG. 4 in a direction opposite to that of current I2.

When semiconductor element 10 in the state in FIG. 11 (circulation period) switches from ON to OFF, a current path in a deadtime period shown in FIG. 10 is formed again. Thereafter, when semiconductor element 5 and semiconductor element 8 switch from OFF to ON, current I5 flows through the current path shown in FIG. 9 (transmission period) again.

Figure 12:
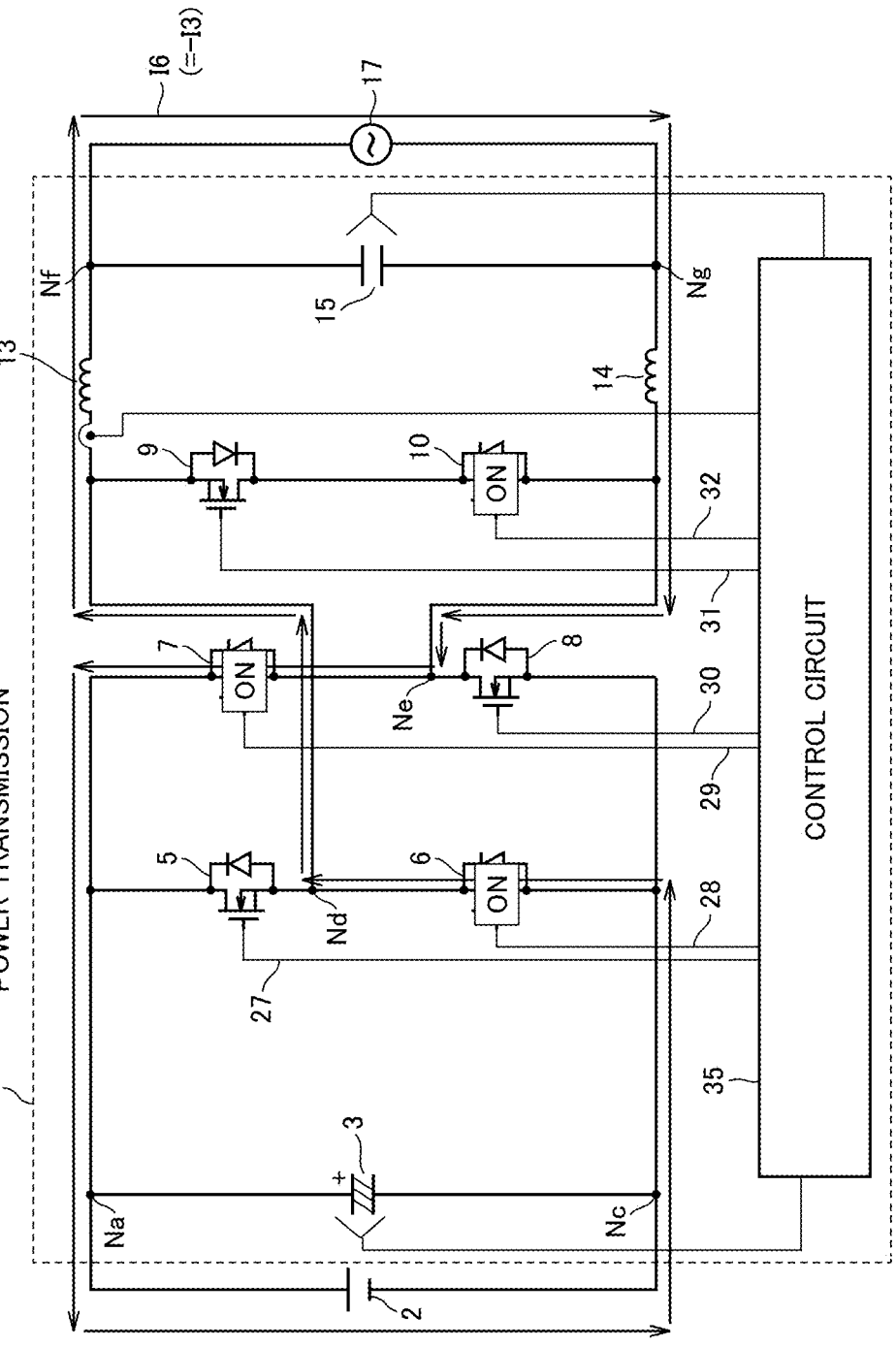
FIG. 12 is a first circuit diagram depicting a current path in a power transmission period when AC voltage is negative and AC current is positive (in a fourth operation pattern) in the power conversion device according to the first embodiment.
Figure 13:
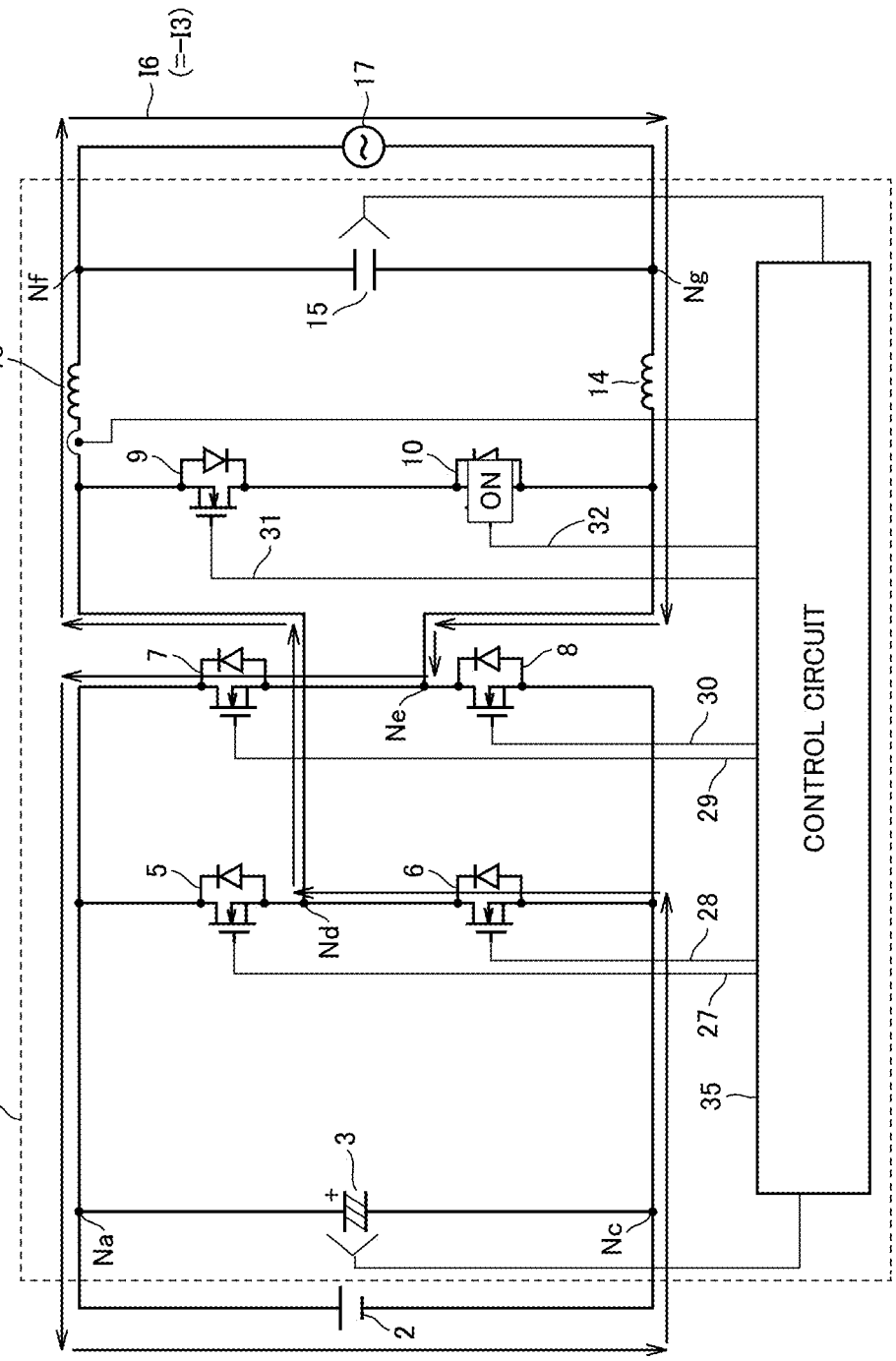
FIG. 13 is a circuit diagram depicting a current path in a deadtime period in the fourth operation pattern of the power conversion device according to the first embodiment.
Figure 14:
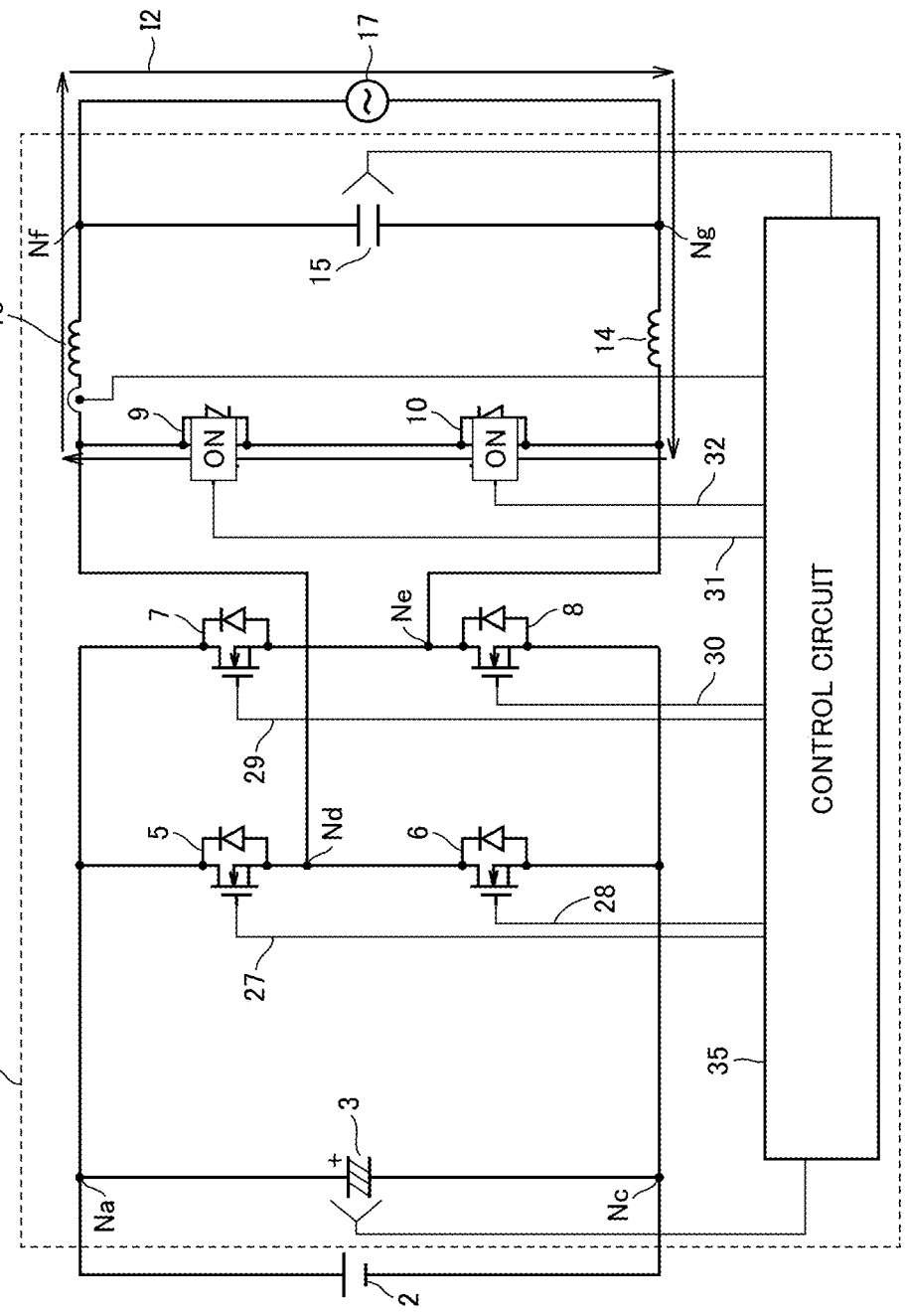
FIG. 14 is a circuit diagram depicting a current path in a circulation period in the fourth operation pattern of the power conversion device according to the first embodiment.

Referring now to FIG. 12 to FIG. 14, a current path in power conversion device 1A in a fourth operation pattern in which AC voltage is negative and AC current is positive will be described. In the fourth operation pattern, since AC voltage is negative, semiconductor element 10 is fixed to ON, and semiconductor element 5 and semiconductor element 8 are fixed to OFF. On the other hand, semiconductor element 6 and semiconductor element 7 as well as semiconductor element 9 are switching-controlled.

FIG. 12 shows a current path in the ON period of semiconductor element 6 and semiconductor element 7 (power transmission period) in the fourth operation pattern.

Referring to FIG. 12, in the ON period of semiconductor element 6 and semiconductor element 7, current I6 flows through a path of the negative side of DC power supply 2-semiconductor element 6-output filter reactor 13-AC power supply 17-output filter reactor 14-semiconductor element 7-the positive side of DC power supply 2. Current I6 flows through the same path as current I3 in FIG. 6 in a direction opposite to that of current I3.

FIG. 13 shows a current in a deadtime period in which semiconductor element 6 and semiconductor element 7 switch from ON to OFF.

Referring to FIG. 13, in a deadtime period, current I6 in the same path as in FIG. 12 flows through a path of the negative side of DC power supply 2-semiconductor element 6 (antiparallel diode)-output filter reactor 13-AC power supply 17-output filter reactor 14-semiconductor element 7 (antiparallel diode)-the positive side of DC power supply 2.

FIG. 14 shows a current path (circulation period) when semiconductor element 9 switches from OFF to ON after the deadtime period (FIG. 13).

Referring to FIG. 14, in a circulation period, current I2 similar to that in FIG. 5 flows through a path including output filter reactor 14-semiconductor element 10-semiconductor element 9-output filter reactor 13 AC-power supply 17.

When semiconductor element 9 in the state in FIG. 14 (circulation period) switches from ON to OFF, a current path in a deadtime period shown in FIG. 13 is formed again. Thereafter, when semiconductor element 6 and semiconductor element 7 switch from OFF to ON, current I6 flows through the current path shown in FIG. 12 (transmission period) again.

(Surge Voltage in Power Conversion Device)

The surge voltage produced in power conversion device 1A shown in FIG. 1 will now be discussed based on the current paths illustrated in FIG. 3 to FIG. 14. As is known, the surge voltage is caused by counter electromotive voltage produced in parasitic inductance due to current change (di/dt) at the time of switching operation of semiconductor elements.

Figure 15:
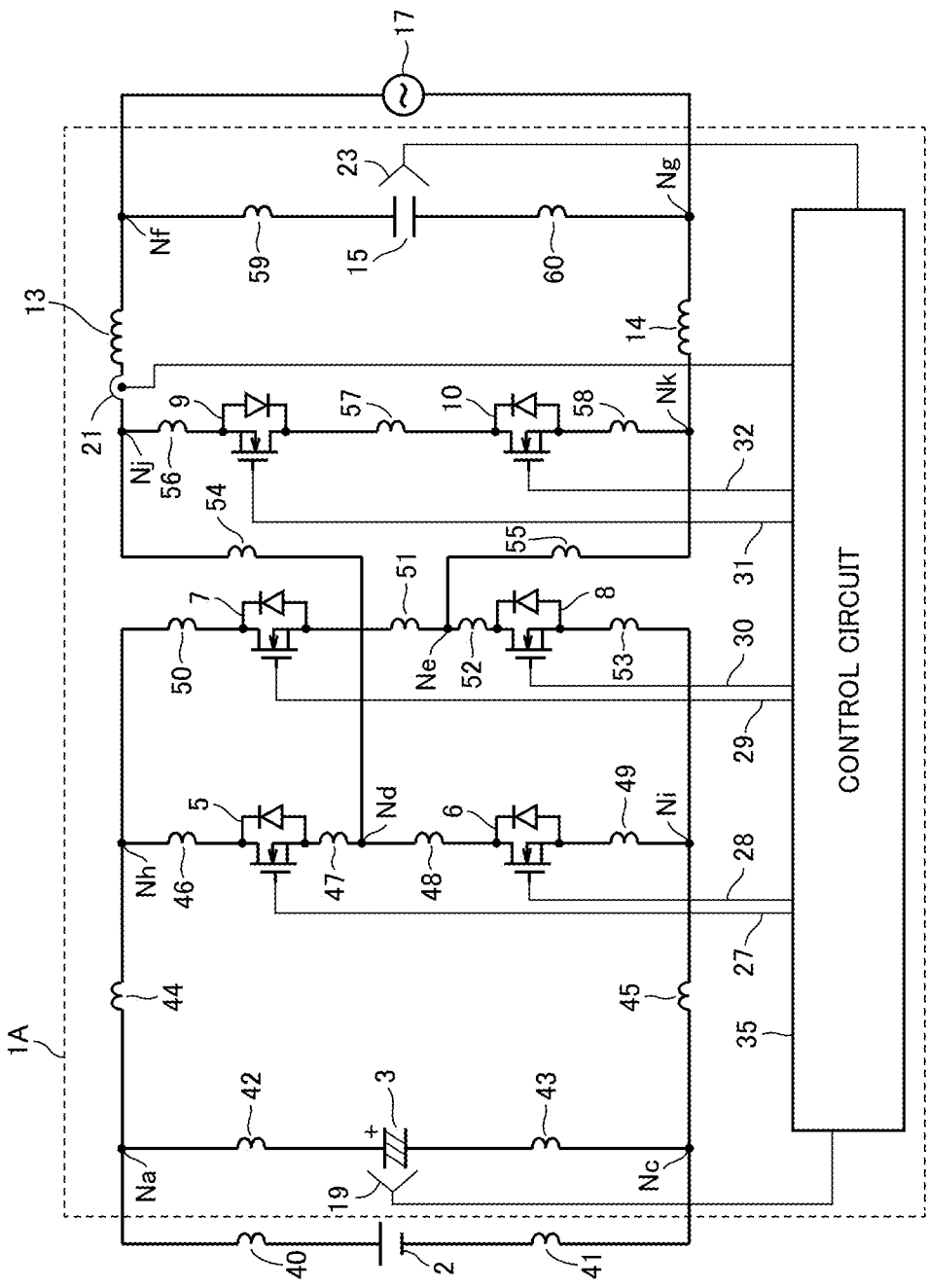
FIG. 15 is a circuit diagram depicting wiring inductance present in the power conversion device shown in FIG. 1.

FIG. 15 is a circuit diagram depicting wiring inductance present in power conversion device 1A shown in FIG. 1.

Referring to FIG. 15, in implementation of power conversion device 1A, wiring inductances 40 to 60 due to parasitic inductance components of wiring are produced.

Wiring inductance 40 corresponds to parasitic inductance of wiring connecting the positive side of DC power supply 2 and node Na. Similarly, wiring inductance 41 corresponds to parasitic inductance of wiring connecting the negative side of DC power supply 2 and node Nc. Wiring inductance 42 is present between node Na and smoothing capacitor 3, and wiring inductance 43 is present between smoothing capacitor 3 and node Nc.

Figure 17:
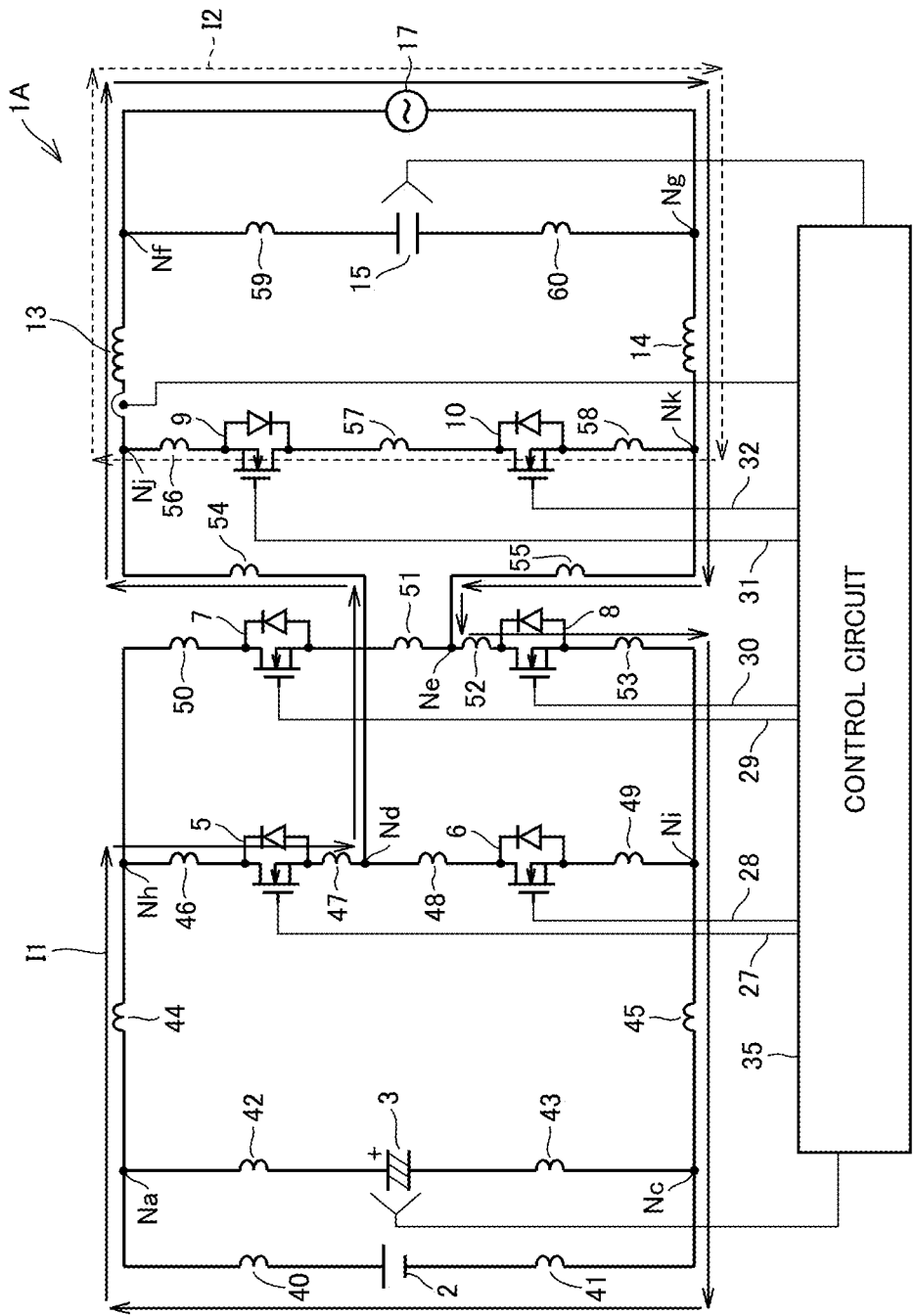
FIG. 17 is a circuit diagram for comparing current paths in a power transmission period and a deadtime period in the first operation pattern of the power conversion device according to the first embodiment.

In FIG. 17, a node Nh connected to the positive electrodes of semiconductor element 5 and semiconductor element 7 is defined separately from node Na in FIG. 1. Nodes Na and Nh have in common in electrical connection destination in FIG. 1 (specifically, DC power supply 2, smoothing capacitor 3, semiconductor element 5, and semiconductor element 7) but are separately defined in order to consider the effect of parasitic inductance of wiring. For the same reason, a node Ni connected to the negative electrodes of semiconductor element 6 and semiconductor element 8 is defined separately from node Nc in FIG. 1.

As a result, wiring inductance 44 between node Na and node Nh and wiring inductance 45 between node Nb and node Ni are defined. Furthermore, wiring inductance 46 between node Nh and the positive electrode of semiconductor element 5, wiring inductance 50 between node Nh and the positive electrode of semiconductor element 7, wiring inductance 49 between node Ni and the negative electrode of semiconductor element 6, and wiring inductance 53 between node Ni and the negative electrode of semiconductor element 8 are defined.

Furthermore, wiring inductance 47 is also present between the negative electrode of semiconductor element 5 and node Nd, and wiring inductance 48 is also present between node Nd and the positive electrode of semiconductor element 6. Similarly, wiring inductance 51 is also present between the negative electrode of semiconductor element 7 and node Ne, and wiring inductance 52 is also present between node Ne and the positive electrode of semiconductor element 8.

Furthermore, in FIG. 17, a node Nj connected to the negative electrode of semiconductor element 9 is defined separately from node Nf in FIG. 1. In the same manner as described above, nodes Nf and Nj have in common in electrical connection destination in FIG. 1 (specifically, AC power supply 17, output filter capacitor 15, semiconductor element 9, and node Nd) but are separately defined in order to consider the effect of parasitic inductance of wiring. For the same reason, a node Nk connected to semiconductor element 10 is defined separately from node Ng in FIG. 1.

As a result, wiring inductance 54 between node Nd and node Nj and wiring inductance 55 between node Ne and node Nk are defined. Furthermore, wiring inductance 56 between node Nj and the negative electrode of semiconductor element 9, wiring inductance 57 between the positive electrode of semiconductor element 9 and the positive electrode of semiconductor element 10, and wiring inductance 58 between node Nk and the negative electrode of semiconductor element 10 are defined.

Furthermore, wiring inductance 59 corresponds to parasitic inductance of wiring connecting node Nf and output filter capacitor 15. Similarly, wiring inductance 60 corresponds to parasitic inductance of wiring connecting node Ng and output filter capacitor 15.

In FIG. 15, wiring inductance is also present between node Nj and node Nf and between nodes Nk and Ng. However, these wiring inductances are sufficiently small, compared with the inductances of output filter reactor 13 connected between node Nj and node Nf and output filter reactor 14 connected between nodes Nk and Ng. Therefore, the wiring inductances between node Nj and node Nf and between nodes Nk and Ng are not considered.

Figure 16:
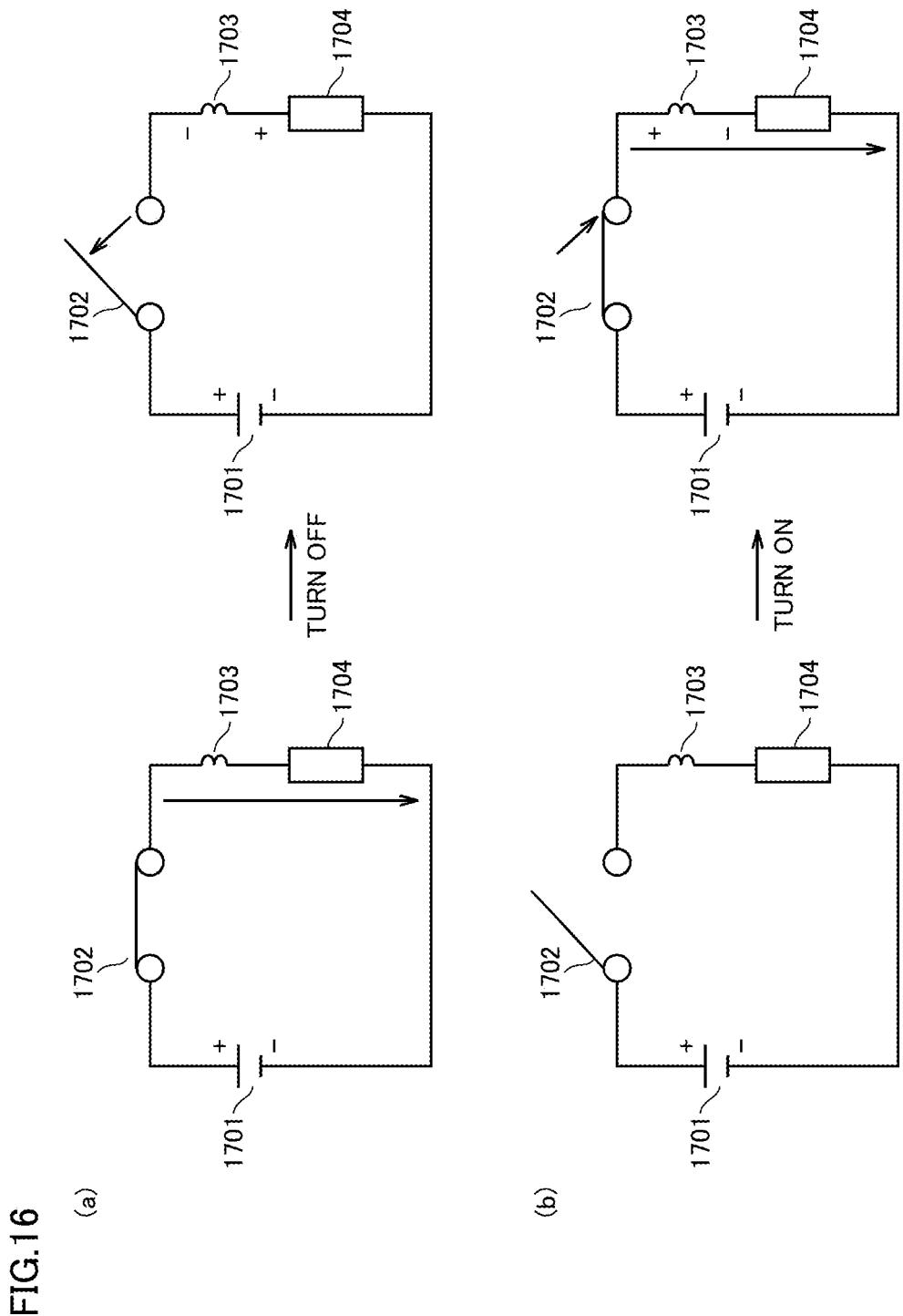
FIG. 16 is a conceptual diagram depicting a voltage produced in the inductance at the time of switching operation.

FIG. 16 is a conceptual diagram depicting a voltage produced in the inductance at the time of switching operation.

In FIG. 16, the circuit behavior when a switch 1702 is turned on or turned off in a closed circuit including a DC power supply 1701, switch 1702, a wiring inductance 1703, and a load 1704 will be described.

Referring to FIG. 16(a), the operation in a case where switch 1702 is turned off and current is cut off from the state in which switch 1702 is turned on and certain current flows will be discussed. In this case, wiring inductance 1703 changes from a state in which current flows to a state in which current does not flow. Since inductance is characterized by having energy in a direction to hinder change of current, in this case, wiring inductance 1703 has energy that produces electromotive force in a direction to keep the cut-off current flowing. Thus, a potential difference is produced in wiring inductance 1703, where the switch 1702 side is negative and the load 1704 side is positive.

At the time of turning-off in FIG. 16(a), the voltage produced between both ends of switch 1702 is the sum of the voltage at DC power supply 1701 and the potential difference produced at wiring inductance 1703 described above. Since the potential difference at wiring inductance 1703 and the voltage at DC power supply 1701 are in the same direction, a voltage higher than the voltage at DC power supply 1701 is applied to switch 1702 immediately after turning-off.

On the other hand, the operation in a case where switch 1702 turns on and current starts flowing from a state in which switch 1702 is turned off and current does not flow as shown in FIG. 16(b) will be discussed. In this case, wiring inductance 1703 changes from a state in which current does not flow to a state in which current flows and therefore has energy in a direction to hinder current starting flowing. As a result, at the time of turning-off of switch 1702, a potential difference is produced in wiring inductance 1703, where the switch 1702 side is positive and the load 1704 side is negative.

At this time, the sum of the voltage at DC power supply 1701 and the potential difference produced in wiring inductance 1703 is applied to load 1704. As described above, a potential difference in a direction opposite to that of DC power supply 1701 is produced in wiring inductance 1703. Therefore, a voltage lower than the voltage at DC power supply 1701 is applied to load 1704.

Subsequently, when current no longer changes and certain current is supplied to the load, the energy produced in wiring inductance 1703 is absorbed by consumption by Joule heat produced by a resistance component of wiring and storage of energy by a power source and a capacitance component such as a capacitor. As a result, the potential difference produced in wiring inductance 1703 disappears, and the voltage at DC power supply 1701 is applied to load 1704.

In power conversion device 1A, each of semiconductor elements 5 to 10 corresponds to switch 1702 in FIG. 6. At the time of switching operation of semiconductor elements 5 to 10 as illustrated in FIG. 2 and FIG. 3 to FIG. 14, the circuit behavior as illustrated in FIG. 16(a) or FIG. 16(b) occurs. In this case, it is understood that each wiring inductance shown in FIG. 15 can have energy that produces a potential difference to hinder current change associated with ON or OFF of semiconductor elements 5 to 10.

(Discussion of Surge Voltage in First Operation Pattern of Power Conversion Device)

The surge voltage produced in the first to fourth operation patterns in power conversion device 1A will now be described.

First, the surge voltage produced when power conversion device 1A is in the first operation pattern (AC voltage is positive and AC current is positive) will be discussed. Here, it is necessary to consider the transition from the power transmission period shown in FIG. 3 to the deadtime period shown in FIG. 4 and vice versa, the transition from the deadtime period (FIG. 4) to the power transmission period (FIG. 3).

FIG. 17 is a circuit diagram for comparing current paths in a power transmission period (FIG. 3) and a deadtime period (FIG. 4) in the first operation pattern. In FIG. 17, the current path (I1) in the power transmission period (FIG. 3) is indicated by a solid line, and the current path (I2) in the deadtime period (FIG. 4) is indicated by a dotted line. FIG. 17 does not depict which of semiconductor elements 5 to 10 in FIG. 3 and FIG. 4 is turned on.

Referring to FIG. 17, in the path indicated by the solid line and the dotted line in an overlapped manner, node Nj-output filter reactor 13-node Nf-AC power supply 17-node Ng-output filter reactor 14-node Nk, change of current does not occur at the time of transition between the power transmission period and the deadtime period.

On the other hand, in the path of node Nk-wiring inductance 55-wiring inductance 52-semiconductor element 8-wiring inductance 53-node Ni-wiring inductance 45-node Nc-wiring inductance 41-DC power supply 2-wiring inductance 40-node Na-wiring inductance 44-node Nh-wiring inductance 46-semiconductor element 5-wiring inductance 47-node Nd-wiring inductance 54-node Nj, current change occurs such that current flows so far but current no longer flows, at the time of transition from the power transmission period to the deadtime period.

On the other hand, in the path of node Nj-wiring inductance 56-semiconductor element 9-wiring inductance 57-semiconductor element 10-wiring inductance 58-node Nk, current change occurs such that current does not flow so far but current comes to flow, at the time of transition from the power transmission period to the deadtime period.

Figure 18:
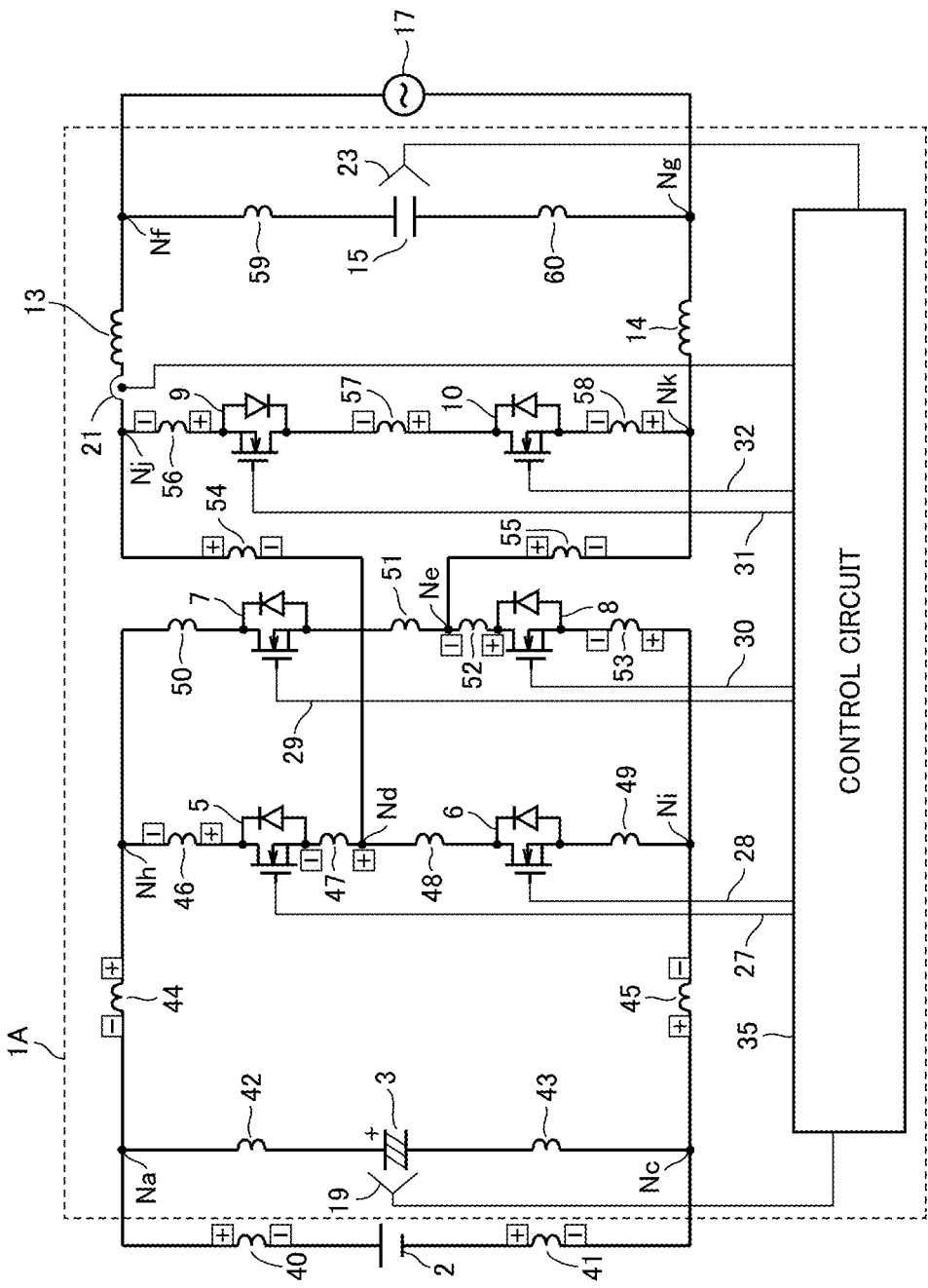
FIG. 18 is a circuit diagram for explaining a potential difference produced in wiring inductance at the time of transition from a power transmission period to a deadtime period in the first operation pattern.

FIG. 18 is a circuit diagram for explaining a potential difference produced in wiring inductance at the time of transition from a power transmission period to a deadtime period in the first operation pattern.

Referring to FIG. 18, a potential difference in a direction that hinders current change is produced as described below in the wiring inductance included in the path in which current change occurs as explained with reference to FIG. 17.

Specifically, wiring inductance 40 produces a potential difference where DC power supply 2 is the negative side and node Na is the positive side. Wiring inductance 44 produces a potential difference where node Na is the negative side and node Nh is the positive side. Wiring inductance 46 produces a potential difference where node Nh is the negative side and semiconductor element 5 is the positive side. Wiring inductance 47 produces a potential difference where semiconductor element 5 is the negative side and node Nd is the positive side. Wiring inductance 54 produces a potential difference where node Nd is the negative side and node Nj is the positive side. Wiring inductance 56 produces a potential difference where node Nj is the negative side and semiconductor element 9 is the positive side.

Similarly, wiring inductance 57 produces a potential difference where semiconductor element 9 is the negative side and semiconductor element 10 is the positive side, and wiring inductance 58 produces a potential difference where semiconductor element 10 is the negative side and node Nk is the positive side. Wiring inductance 55 produces a potential difference where node Nk is the negative side and node Ne is the positive side. Wiring inductance 52 produces a potential difference where node Ne is the negative side and semiconductor element 8 is the positive side. Wiring inductance 53 produces a potential difference where semiconductor element 10 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

In FIG. 18, DC power supply 2 is considered as a current path. However, when smoothing capacitor 3 has smaller wiring inductance on the current path than DC power supply 2 and can provide instantaneous energy, a current path is formed so as to pass through smoothing capacitor 3 rather than DC power supply 2.

As will be described later, when a snubber capacitor is connected to form a path with smaller wiring inductance than that of the path passing through smoothing capacitor 3 and DC power supply 2, the path passing through the snubber capacitor serves as a current path so that the wiring inductance can be reduced.

Here, a voltage applied to semiconductor element 5 and semiconductor element 8 that are turned off at the time of transition from the power transmission period to the deadtime period will be discussed. In the deadtime period, only a voltage corresponding to a voltage drop due to current I2 is applied to semiconductor element 9 and semiconductor element 10. On the other hand, the sum voltage of the voltage at DC power supply 2, the voltage at wiring inductance 40, the voltage at wiring inductance 44, the voltage at wiring inductance 46, the voltage at wiring inductance 47, the voltage at wiring inductance 54, the voltage at wiring inductance 56, the voltage at wiring inductance 57, the voltage at wiring inductance 58, the voltage at wiring inductance 55, the voltage at wiring inductance 52, the voltage at wiring inductance 53, the voltage at wiring inductance 45, and the voltage at wiring inductance 41 is applied to both of semiconductor element 5 and semiconductor element 8.

At what ratio the sum voltage is applied to each of semiconductor element 5 and semiconductor element 8 depends on the impedance difference due to leakage current of the semiconductor elements and a deviation of switching timing. Therefore, the voltage actually applied to each of semiconductor element 5 and semiconductor element 8 may vary. However, as understood from the description above, the sum of voltages applied to semiconductor element 5 and semiconductor element 8 increases from the voltage at DC power supply 2 by the amount of voltages produced in a plurality of wiring inductances. This is called "off surge voltage".

As described above, it is understood that in power conversion device 1A that is a three-level inverter having a clamp circuit, in the first operation pattern (AC voltage is positive and AC current is positive), at the time of transition from the power transmission period to the deadtime period, the wiring inductance on the path from DC power supply 2 to connect semiconductor element 5-semiconductor element 9-semiconductor element 10-semiconductor element 8-DC power supply 2 contributes to production of surge voltage.

Next, the transition of power conversion device 1A from the deadtime period (FIG. 4) to the power transmission period (FIG. 3) in the first operation pattern will be discussed.

At the time of transition from the deadtime period (FIG. 4) to the power transmission period (FIG. 3), change from the current path (I2) indicated by a dotted line to the current path (I1) indicated by a solid line occurs in FIG. 17. In this case, in actuality, recovery current or displacement current occurs when the diode in semiconductor element 10 changes from a conducting state to a non-conducting state.

Figure 19:
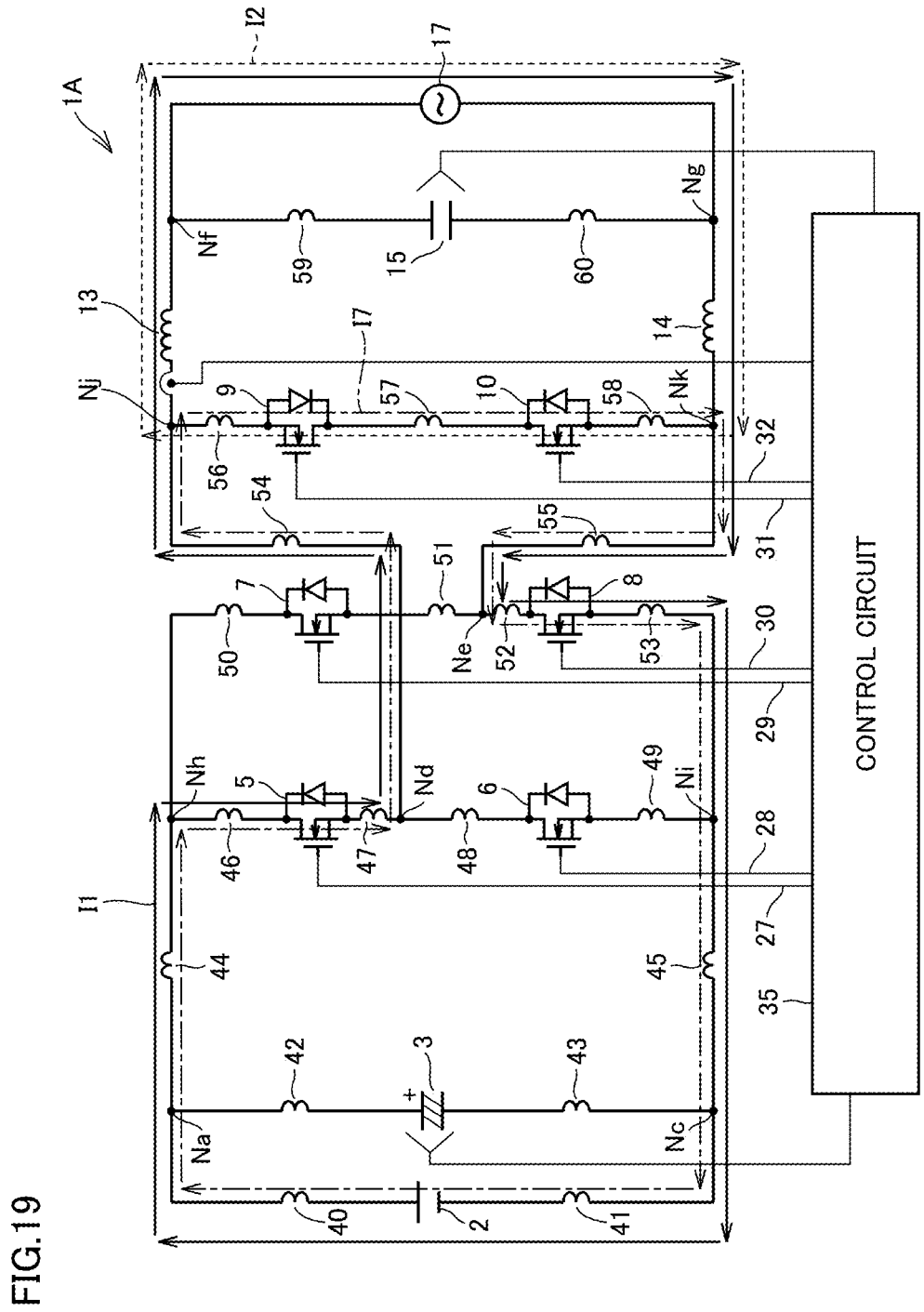
FIG. 19 is a circuit diagram depicting a path of recovery current or displacement current produced at the time of transition from a deadtime period to a power transmission period in the first operation pattern.

FIG. 19 is a circuit diagram depicting recovery current or displacement current produced at the time of transition from the deadtime period to the power transmission period in the first operation pattern.

Referring to FIG. 19, at the time of transition from the deadtime period to the power transmission period, current I7 as recovery current or displacement current occurs, which is different from the current path (I1) in the power transmission period (FIG. 3) indicated by a solid line and the current path (I2) in the deadtime period (FIG. 4) indicated by a dotted line. Current I7 flows through a path of DC power supply 2-semiconductor element 5-semiconductor element 9-semiconductor element 10-semiconductor element 8-DC power supply 2, as depicted by a dot-and-dash line.

This current I7 (recovery current or displacement current) disappears when charge inside the diode of semiconductor element 10 is depleted or charging of the floating capacitance is completed. In this case, the wiring inductance included in the path of current I7 produces a potential difference in a direction that hinders current change by which current I7 disappears.

Figure 20:
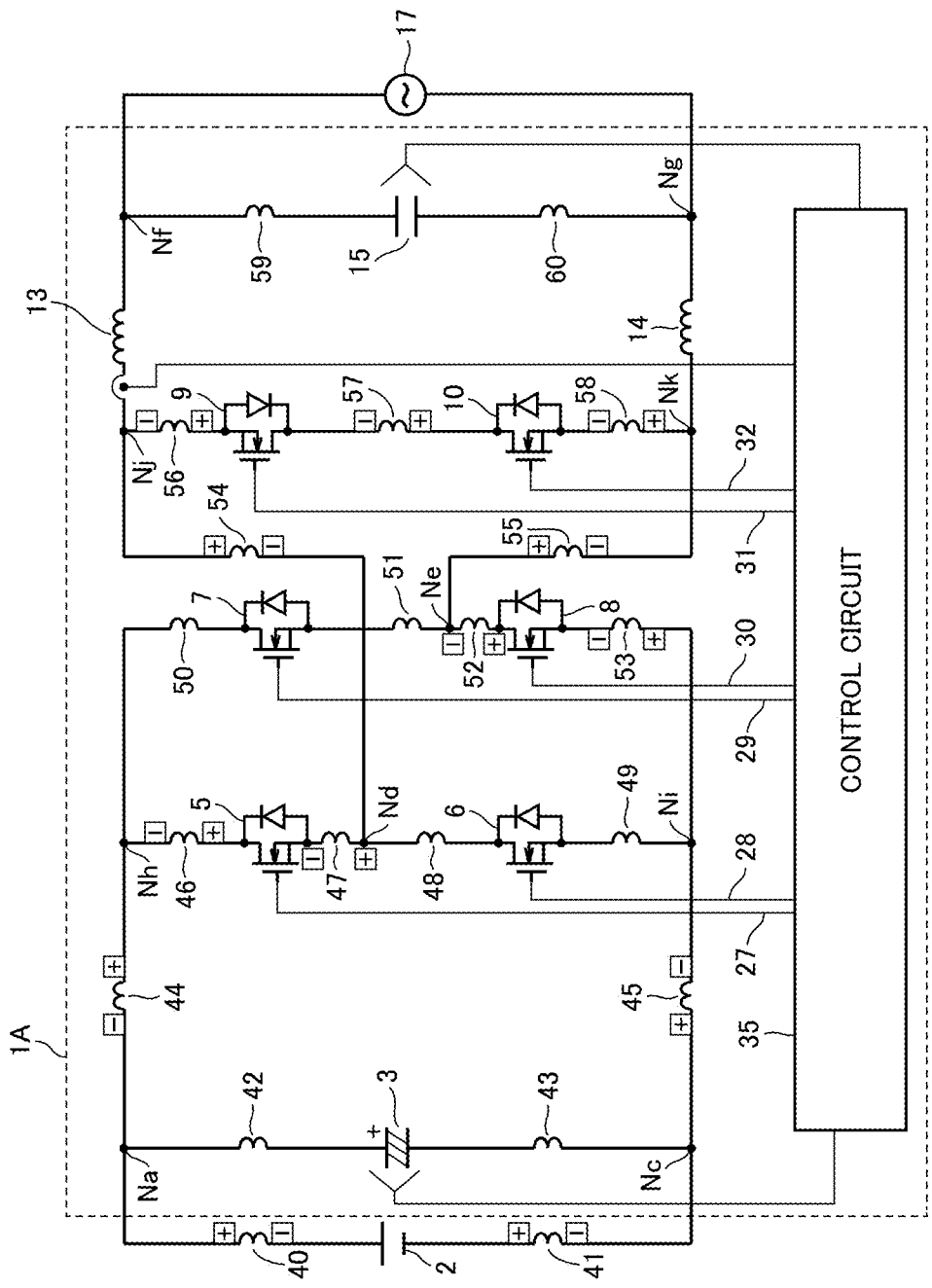
FIG. 20 is a circuit diagram for explaining a potential difference produced in wiring inductance when recovery current or displacement current shown in FIG. 19 disappears.

FIG. 20 shows a circuit diagram for explaining a potential difference produced in wiring inductance when current I7 shown in FIG. 19 disappears.

Referring to FIG. 20, when current I7 shown in FIG. 19 disappears, wiring inductance 40 produces a potential difference where DC power supply 2 is the negative side and node Na is the positive side. Wiring inductance 44 produces a potential difference where node Na is the negative side and node Nh is the positive side. Wiring inductance 46 produces a potential difference where node Ng is the negative side and semiconductor element 5 is the positive side. Wiring inductance 47 produces a potential difference where semiconductor element 5 is the negative side and node Nd is the positive side.

Similarly, wiring inductance 54 produces a potential difference where node Nd is the negative side and node Nj is the positive side. Wiring inductance 56 produces a potential difference where node Nj is the negative side and semiconductor element 9 is the positive side. Wiring inductance 57 produces a potential difference where semiconductor element 9 is the negative side and semiconductor element 10 is the positive side. Wiring inductance 58 produces a potential difference where semiconductor element 10 is the negative side and node Nk is the positive side. Wiring inductance 55 produces a potential difference where node Nk is the negative side and node Ne is the positive side. Wiring inductance 52 produces a potential difference where node Ne is the negative side and semiconductor element 8 is the positive side. Wiring inductance 53 produces a potential difference where semiconductor element 8 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

In this way, at the time of transition from the deadtime period to the power transmission period, the voltage produced in each wiring inductance is in the same direction as at the time of transition from the power transmission period to the deadtime period. However, in the power transmission period, semiconductor element 5, semiconductor element 9, and semiconductor element 8 are in the ON state. Therefore, when current I7 disappears, only a voltage corresponding to a voltage drop due to current is applied to these semiconductor element 5, semiconductor element 9, and semiconductor element 8. Therefore, when recovery current or displacement current disappears at the time of transition from the deadtime period to the power transmission period, the sum of the voltage at DC power supply 2 and the voltage produced in wiring inductance, that is, a voltage higher than the voltage at DC power supply 2 is applied to semiconductor element 10. This voltage applied to semiconductor element 10 is called "recovery surge voltage".

Based on the above, it is understood that when power conversion device 1A is in the first operation pattern (AC voltage is positive and AC current is positive), the wiring inductance that is problematic at the time of transition between the deadtime period and the power transmission period, that is, the wiring inductance contributing to production of surge voltage is the wiring inductance included in the path from DC power supply 2 to connect semiconductor element 5-semiconductor element 9-semiconductor element 10-semiconductor element 8-DC power supply 2.

(Discussion of Surge Voltage in Second Operation Pattern of Power Conversion Device)

Next, the surge voltage produced when power conversion device 1A is in the second operation pattern (AC voltage is negative and AC current is negative) will be discussed. Here, it is necessary to consider the transition from the power transmission period shown in FIG. 6 to the deadtime period shown in FIG. 7 and vice versa, the transition from the deadtime period (FIG. 7) to the power transmission period (FIG. 3).

Figure 21:
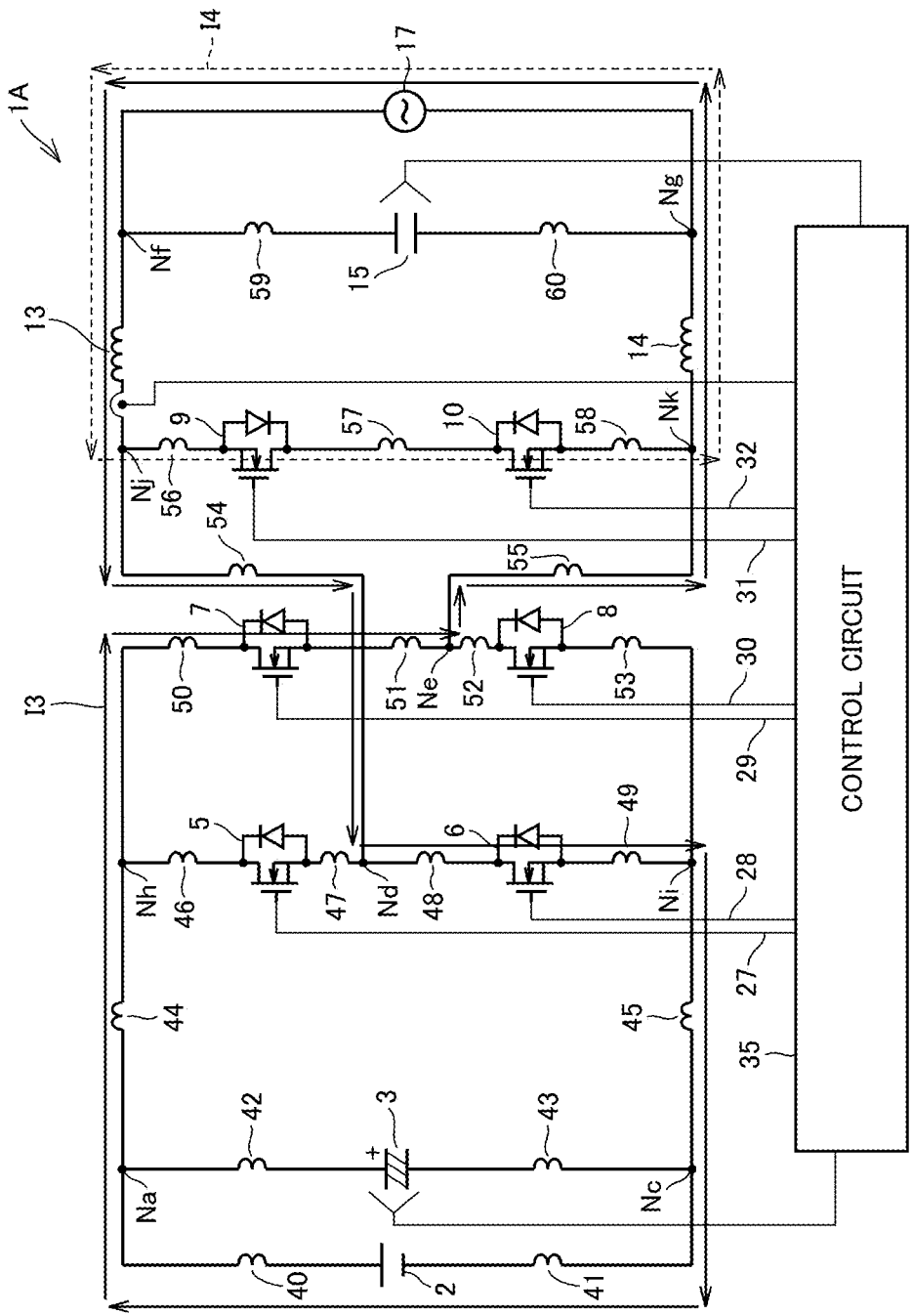
FIG. 21 is a circuit diagram for comparing current paths in a power transmission period and a deadtime period in the second operation pattern of the power conversion device according to the first embodiment.

FIG. 21 is a circuit diagram for comparing current paths in a power transmission period (FIG. 6) and a deadtime period (FIG. 7) in the second operation pattern. In FIG. 21, the current path (I3) in the power transmission period (FIG. 6) is indicated by a solid line, and the current path (I4) in the deadtime period (FIG. 7) is indicated by a dotted line. FIG. 21 does not depict which of semiconductor elements 5 to 10 in FIG. 6 and FIG. 7 is turned on.

Referring to FIG. 21, in the path indicated by the solid line and the dotted line in an overlapped manner, node Nk-output filter reactor 14-node Ng-AC power supply 17-node Nf-output filter reactor 13-node Nj, change of current does not occur at the time of transition between the power transmission period and the deadtime period.

By contrast, in the path of node Nj-wiring inductance 54-wiring inductance 48-semiconductor element 6-wiring inductance 49-node Ni-wiring inductance 45-node Nc-wiring inductance 41-DC power supply 2-wiring inductance 40-node Na-wiring inductance 44-node Nh-wiring inductance 50-semiconductor element 7-wiring inductance 51-node Ne-wiring inductance 55-node Nk, current change occurs such that current flows so far but current no longer flows, at the time of transition from the power transmission period to the deadtime period.

On the other hand, in the path of node Nj-wiring inductance 56-semiconductor element 9-wiring inductance 57-semiconductor element 10-wiring inductance 58-node Nk, current change occurs such that current does not flow so far but current comes to flow, at the time of transition from the power transmission period to the deadtime period.

Figure 22:
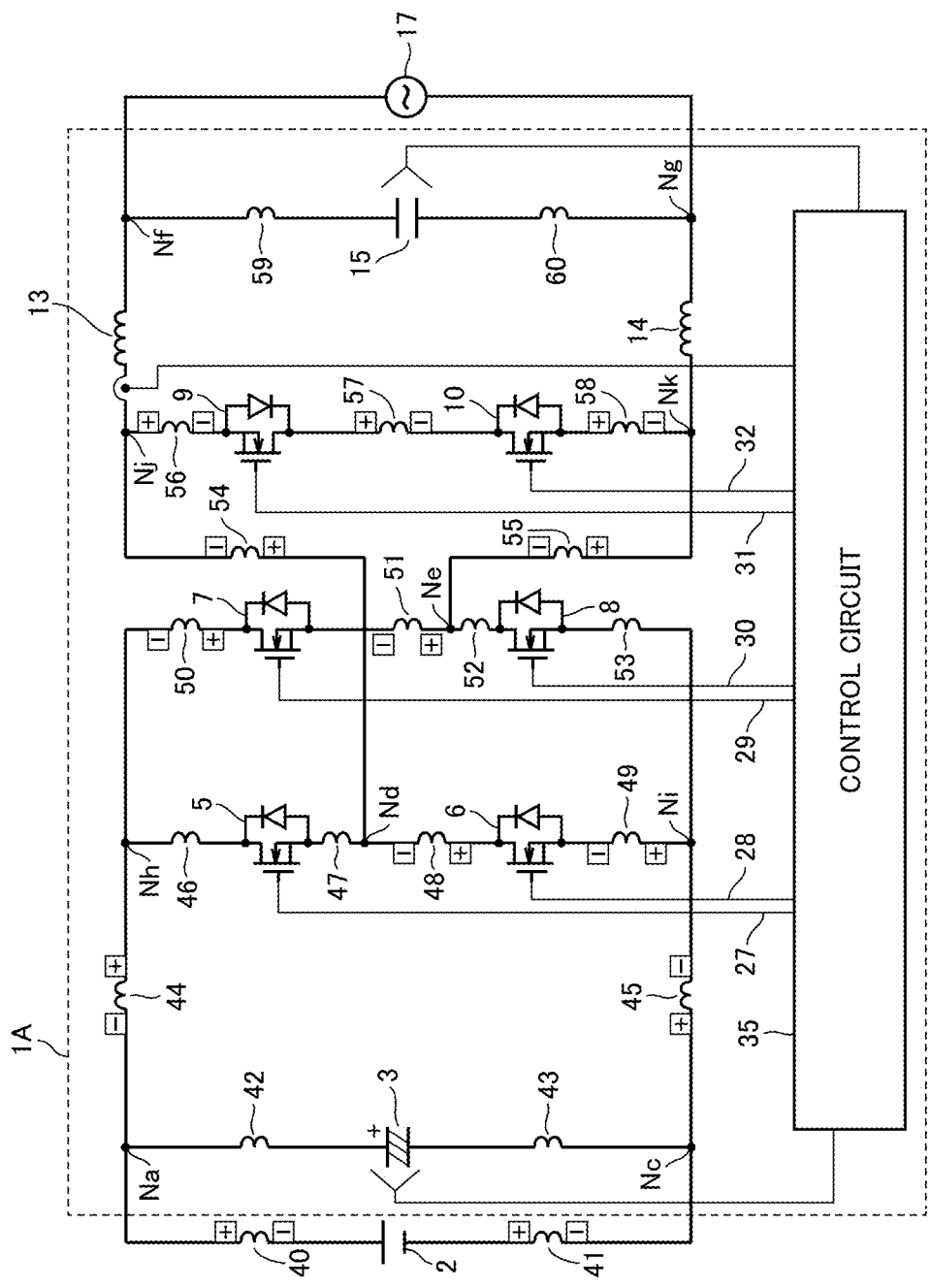
FIG. 22 is a circuit diagram for explaining a potential difference produced in wiring inductance at the time of transition from a power transmission period to a deadtime period in the second operation pattern.

FIG. 22 is a circuit diagram for explaining a potential difference produced in wiring inductance at the time of transition from a power transmission period to a deadtime period in the second operation pattern.

Referring to FIG. 22, a potential difference in a direction that hinders current change is produced as described below in the wiring inductance included in the path in which current change occurs as explained with reference to FIG. 21.

Specifically, wiring inductance 40 produces a potential difference where DC power supply 2 is the negative side and node Na is the positive side. Wiring inductance 44 produces a potential difference where node Na is the negative side and node Nh is the positive side. Wiring inductance 50 produces a potential difference where node Nh is the negative side and semiconductor element 7 is the positive side. Wiring inductance 51 produces a potential difference where semiconductor element 7 is the negative side and node Ne is the positive side. Wiring inductance 55 produces a potential difference where node Ne is the negative side and node Nk is the positive side.

Similarly, wiring inductance 58 produces a potential difference where node Nk is the negative side and semiconductor element 10 is the positive side. Wiring inductance 57 produces a potential difference where semiconductor element 10 is the negative side and semiconductor element 9 is the positive side. Wiring inductance 56 produces a potential difference where semiconductor element 9 is the negative side and node Nj is the positive side. Wiring inductance 54 produces a potential difference where node Nj is the negative side and node Nd is the positive side. Wiring inductance 48 produces a potential difference where node Nd is the negative side and semiconductor element 6 is the positive side. Wiring inductance 49 produces a potential difference where semiconductor element 6 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

Here, a voltage applied to semiconductor element 7 and semiconductor element 6 that are turned off at the time of transition from the power transmission period to the deadtime period will be discussed. In the deadtime period, only a voltage corresponding to a voltage drop due to current I4 is applied to semiconductor element 9 and semiconductor element 10.

On the other hand, the sum voltage of the voltage at DC power supply 2, the voltage at wiring inductance 40, the voltage at wiring inductance 44, the voltage at wiring inductance 50, the voltage at wiring inductance 51, the voltage at wiring inductance 55, the voltage at wiring inductance 58, the voltage at wiring inductance 57, the voltage at wiring inductance 56, the voltage at wiring inductance 54, the voltage at wiring inductance 48, the voltage at wiring inductance 49, the voltage at wiring inductance 45, and the voltage at wiring inductance 41 is applied to both of semiconductor element 6 and semiconductor element 7.

At what ratio the sum voltage is applied to each of semiconductor element 6 and semiconductor element 7 depends on the impedance difference due to leakage current of the semiconductor elements and a deviation of switching timing. Therefore, the voltage actually applied to each of semiconductor element 6 and semiconductor element 7 may vary. In this way, the off surge voltage higher than the voltage at DC power supply 2 is applied to semiconductor element 6 and semiconductor element 7.

Based on the above, it is understood that in power conversion device 1A that is a three-level inverter having a clamp circuit, in the second operation pattern (AC voltage is negative and AC current is negative), at the time of transition from the power transmission period to the deadtime period, the wiring inductance on the path from DC power supply 2 to connect semiconductor element 7-semiconductor element 10-semiconductor element 9-semiconductor element 6-DC power supply 2 contributes to production of surge voltage.

Next, the transition of power conversion device 1A from the deadtime period (FIG. 7) to the power transmission period (FIG. 6) in the second operation pattern will be discussed.

At the time of transition from the deadtime period (FIG. 7) to the power transmission period (FIG. 6), change from the current path (I4) indicated by a dotted line to the current path (I3) indicated by a solid line occurs in FIG. 21. In this case, in actuality, recovery current or displacement current occurs when the diode in semiconductor element 9 changes from a conducting state to a non-conducting state.

Figure 23:
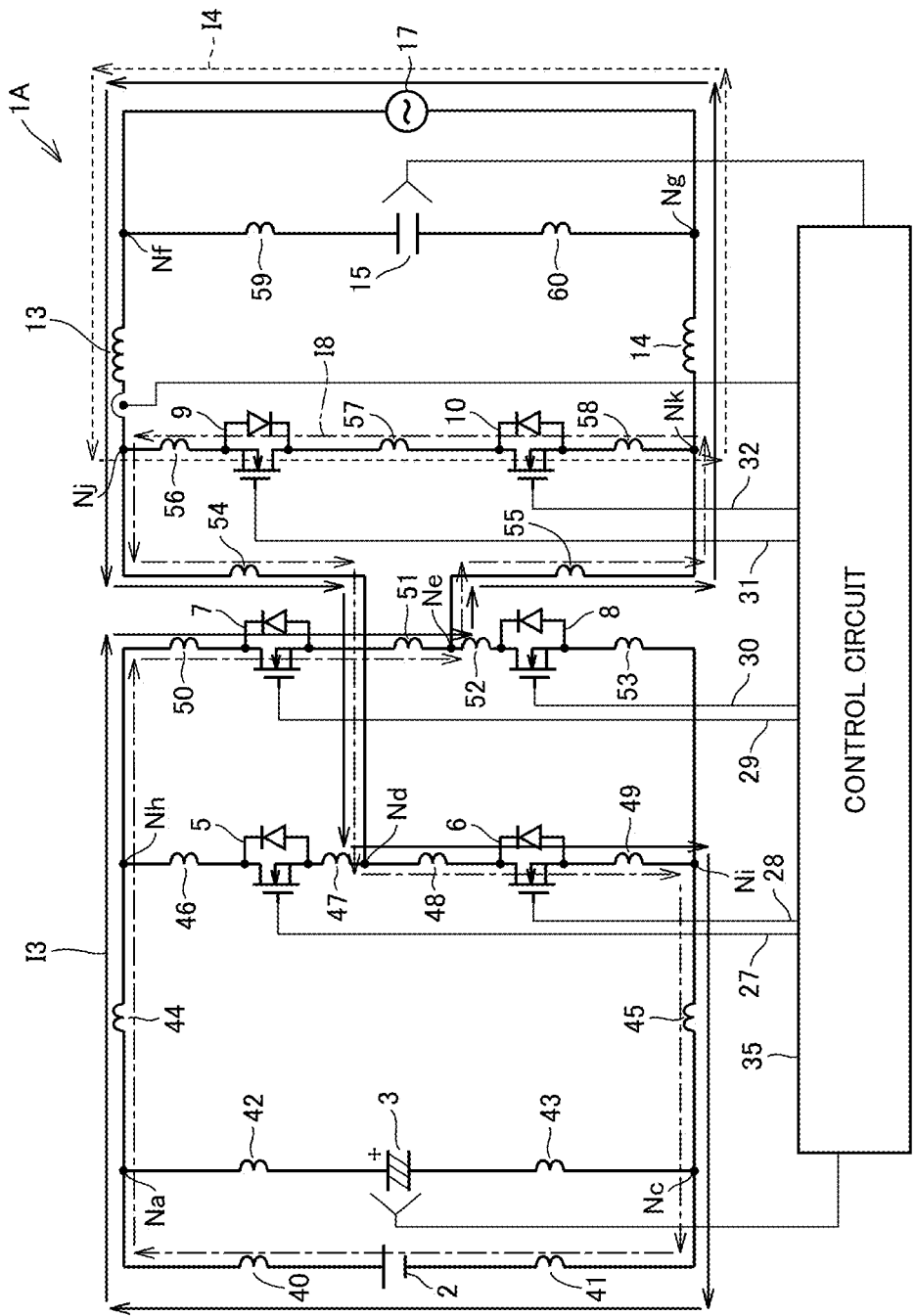
FIG. 23 is a circuit diagram depicting a path of recovery current or displacement current produced at the time of transition from a deadtime period to a power transmission period in the second operation pattern.

FIG. 23 is a circuit diagram depicting a path of recovery current or displacement current produced at the time of transition from the deadtime period to the power transmission period in the second operation pattern.

Referring to FIG. 23, at the time of transition from the deadtime period to the power transmission period, current I8 as recovery current or displacement current occurs, which is different from the current path (I3) in the power transmission period (FIG. 6) indicated by a solid line and the current path (I4) in the deadtime period (FIG. 7) indicated by a dotted line. Current I8 flows through a path of DC power supply 2-semiconductor element 7-semiconductor element 10-semiconductor element 9-semiconductor element 6-DC power supply 2, as depicted by a dot-and-dash line.

This current I8 (recovery current or displacement current) also disappears when charge inside the diode of semiconductor element 9 is depleted or charging of the floating capacitance is completed. In this case, the wiring inductance included in the path of current I8 produces a potential difference in a direction that hinders current change by which current I8 disappears.

Figure 24:
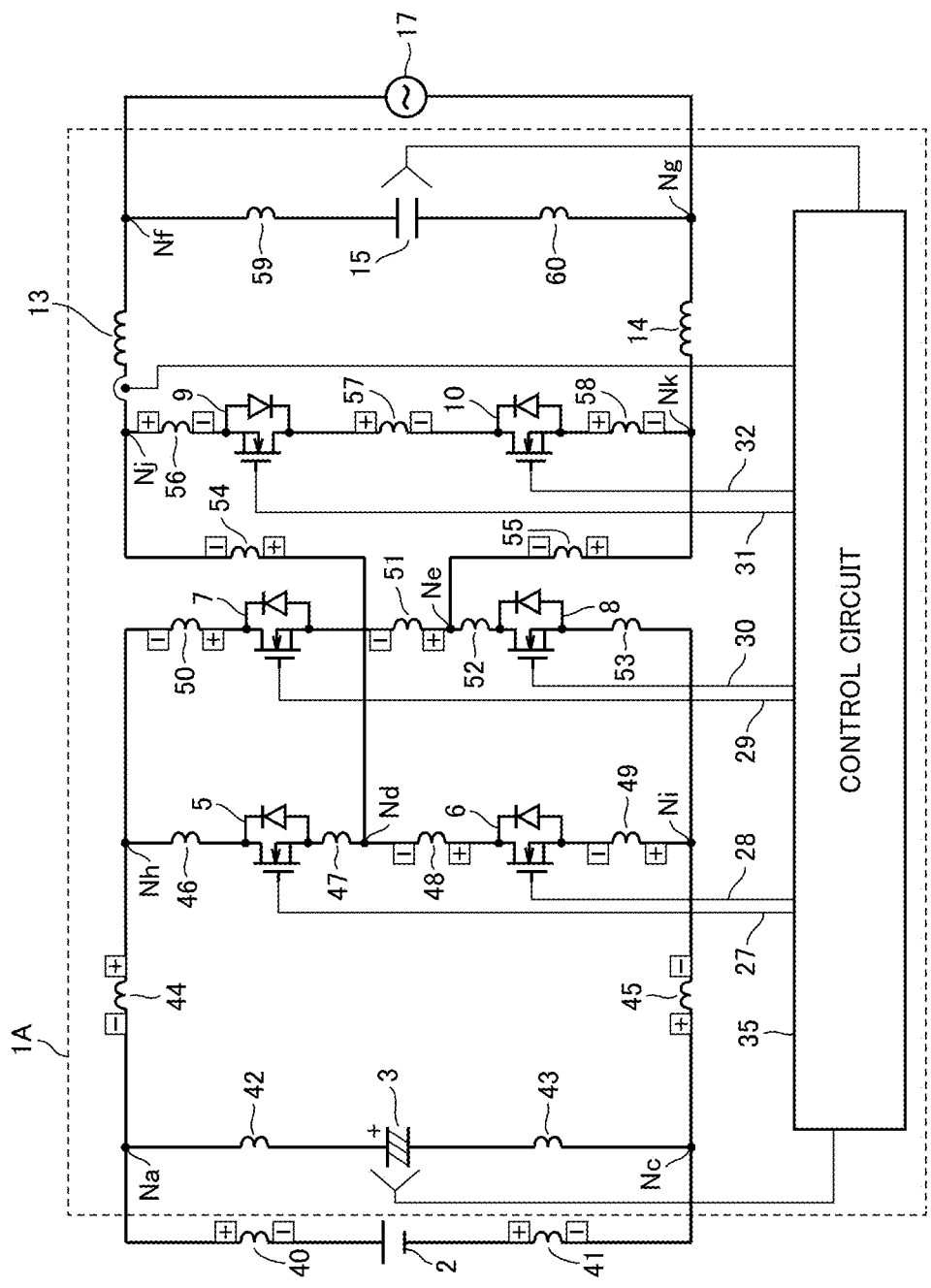
FIG. 24 is a circuit diagram for explaining a potential difference produced in wiring inductance when recovery current or displacement current shown in FIG. 23 disappears.

FIG. 24 shows a circuit diagram for explaining a potential difference produced in wiring inductance when current I8 shown in FIG. 23 disappears.

Referring to FIG. 24, when current I8 (FIG. 23) disappears, wiring inductance 40 produces a potential difference where DC power supply 2 is the negative side and node Na is the positive side. Wiring inductance 44 produces a potential difference where node Na is the negative side and node Nh is the positive side. Wiring inductance 50 produces a potential difference where node Nh is the negative side and semiconductor element 7 is the positive side. Wiring inductance 51 produces a potential difference where semiconductor element 7 is the negative side and node Ne is the positive side. Wiring inductance 55 produces a potential difference where node Ne is the negative side and node Nk is the positive side. Wiring inductance 58 produces a potential difference where node Nk is the negative side and semiconductor element 10 is the positive side. Wiring inductance 57 produces a potential difference where semiconductor element 10 is the negative side and semiconductor element 9 is the positive side.

Similarly, wiring inductance 56 produces a potential difference where semiconductor element 9 is the negative side and node Nj is the positive side. Wiring inductance 54 produces a potential difference where node Nj is the negative side and node Nd is the positive side. Wiring inductance 48 produces a potential difference where node Nd is the negative side and semiconductor element 6 is the positive side. Wiring inductance 49 produces a potential difference where semiconductor element 6 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

In this way, even in the second operation pattern, at the time of transition from the deadtime period to the power transmission period, the voltage produced in each wiring inductance is in the same direction as at the time of transition from the power transmission period to the deadtime period. However, since semiconductor element 7, semiconductor element 6, and semiconductor element 10 are in the ON state in the power transmission period, only a voltage corresponding to a voltage drop due to current is applied to these semiconductor element 7, semiconductor element 6, and semiconductor element 10 when current I8 disappears. Therefore, when recovery current or displacement current disappears at the time of transition from the deadtime period to the power transmission period, the recovery surge voltage higher than the voltage at DC power supply 2 is applied to semiconductor element 9.

Based on the above, it is understood that when power conversion device 1A is in the second operation pattern (AC voltage is negative and AC current is negative), the wiring inductance that is problematic at the time of transition between the deadtime period and the power transmission period, that is, the wiring inductance contributing to production of surge voltage is the wiring inductance included in the path from DC power supply 2 to connect semiconductor element 7-semiconductor element 10-semiconductor element 9-semiconductor element 6-DC power supply 2.

(Discussion of Surge Voltage in Third Operation Pattern of Power Conversion Device) Next, the surge voltage produced when power conversion device 1A is in the third operation pattern (AC voltage is positive and AC current is negative) will be discussed. Here, it is necessary to consider the transition from the circulation period shown in FIG. 11 to the deadtime period shown in FIG. 10 and vice versa, the transition from the deadtime period (FIG. 10) to the circulation period (FIG. 11).

Figure 25:
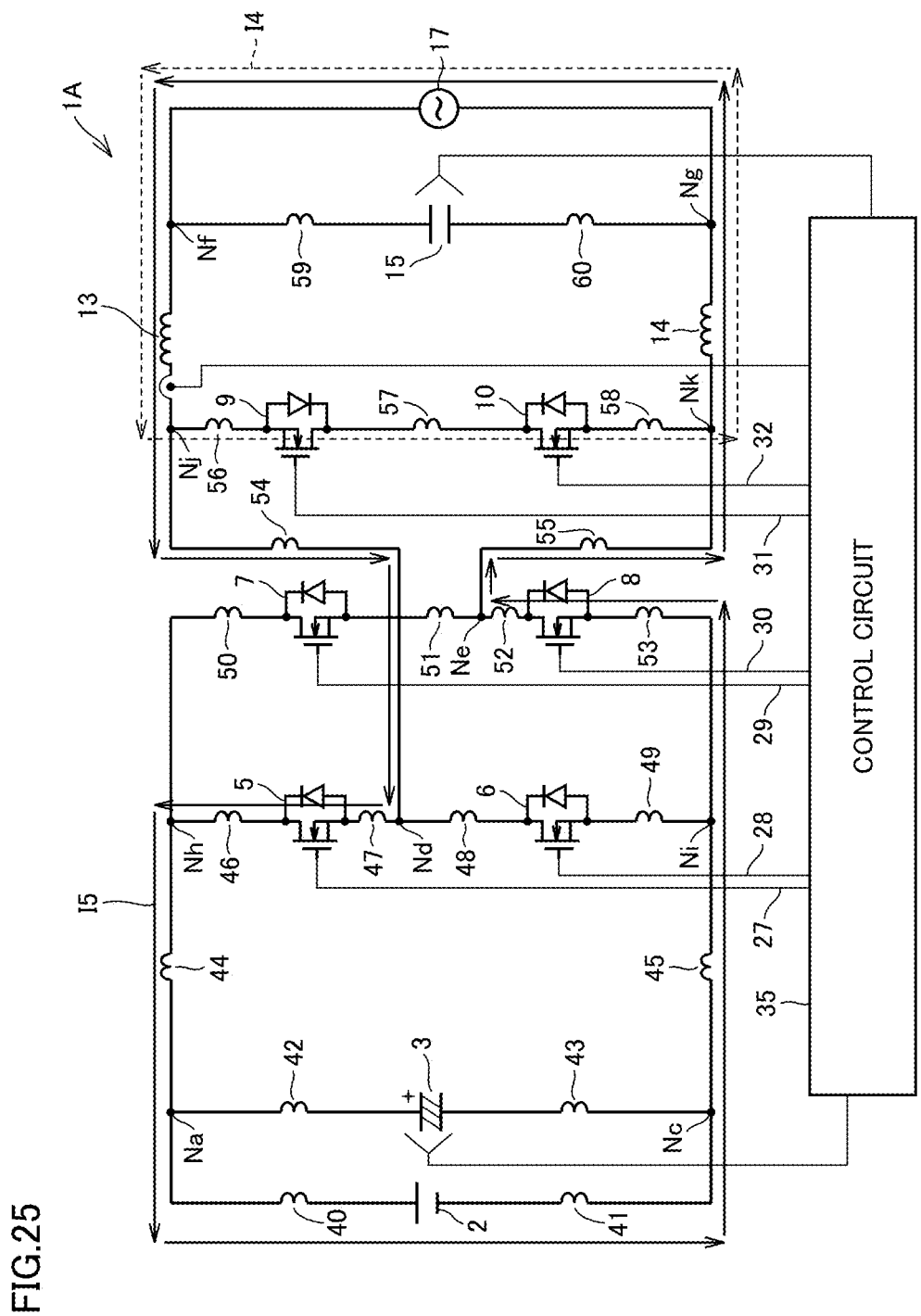
FIG. 25 is a circuit diagram for comparing current paths in a circulation period and a deadtime period in the third operation pattern of the power conversion device according to the first embodiment.

FIG. 25 is a circuit diagram for comparing current paths in a circulation period (FIG. 11) and a deadtime period (FIG. 10) in the third operation pattern. In FIG. 25, the current path (I5) in the deadtime period (FIG. 10) is indicated by a solid line, and the current path (I4) in the circulation period (FIG. 11) is indicated by a dotted line. FIG. 25 also does not depict which of semiconductor elements 5 to 10 in FIG. 10 and FIG. 11 is turned on.

Referring to FIG. 25, in the path indicated by the solid line and the dotted line in an overlapped manner, node Nk-output filter reactor 14-node Ng-AC power supply 17-node Nf-output filter reactor 13-node Nj, change of current does not occur at the time of transition between the circulation period and the deadtime period.

By contrast, in the path of node Nj-wiring inductance 54-wiring inductance 47-semiconductor element 5-wiring inductance 46-node Nh-wiring inductance 44-node Na-wiring inductance 40-DC power supply 2-wiring inductance 41-node Nc-wiring inductance 45-node Ni-wiring inductance 53-semiconductor element 8-wiring inductance 52-node Ne-wiring inductance 55-node Nk, current change occurs such that current does not flow so far but current comes to flow, at the time of transition from the circulation period to the deadtime period.

On the other hand, in the path of node Nk-wiring inductance 58-semiconductor element 10-wiring inductance 57-semiconductor element 9-wiring inductance 56-node Nj, current change occurs such that current flows so far but current no longer flows.

Figure 26:
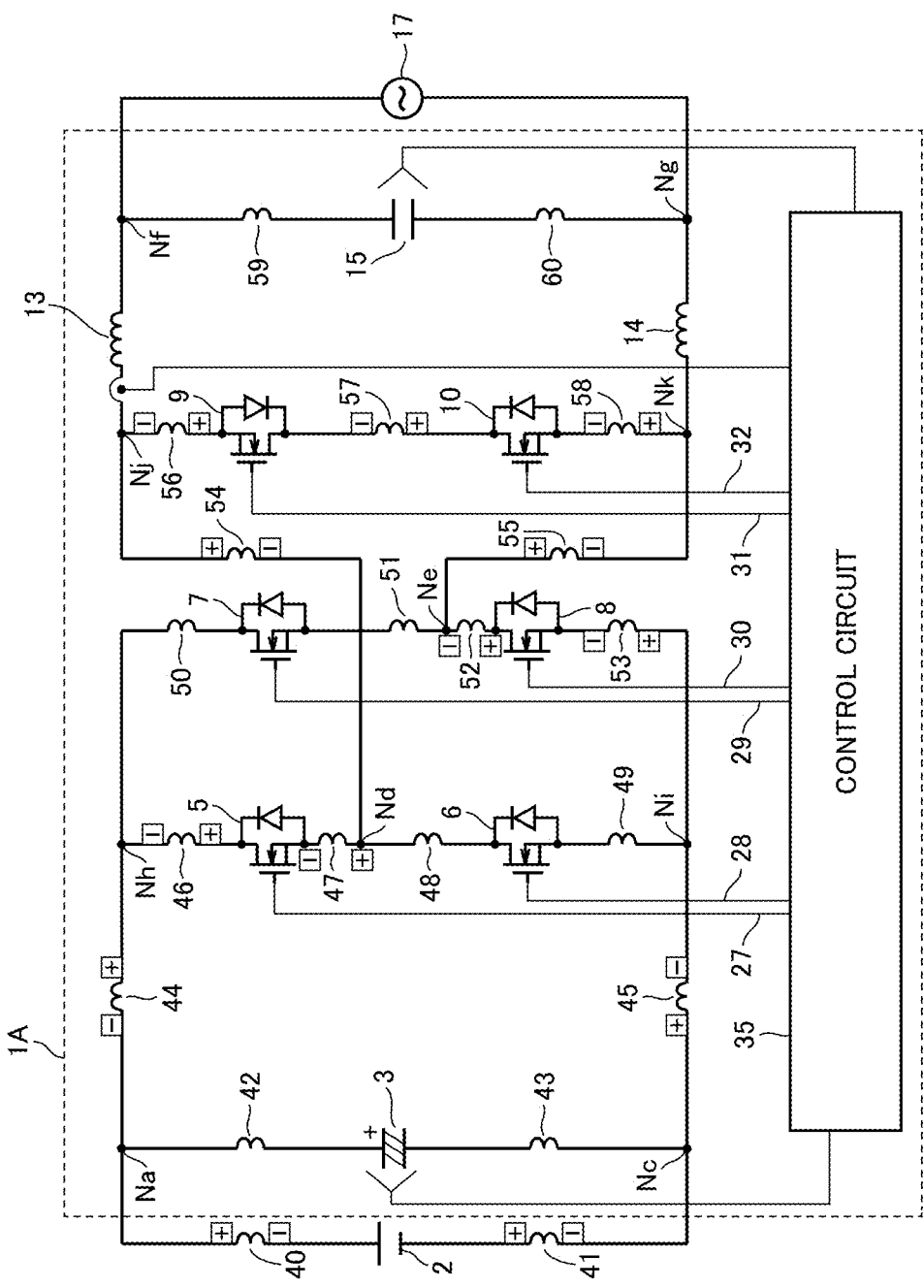
FIG. 26 is a circuit diagram for explaining a potential difference produced in wiring inductance at the time of transition from a circulation period to a deadtime period in the third operation pattern.

FIG. 26 is a circuit diagram for explaining a potential difference produced in wiring inductance at the time of transition from a circulation period to a deadtime period in the third operation pattern.

Referring to FIG. 26, a potential difference in a direction that hinders current change is produced as described below in the wiring inductance included in the path in which current change occurs as explained with reference to FIG. 25.

Specifically, wiring inductance 40 produces a potential difference where DC power supply 2 is the negative side and node Na is the positive side. Wiring inductance 44 produces a potential difference where node Na is the negative side and node Nh is the positive side. Wiring inductance 46 produces a potential difference where node Nh is the negative side and semiconductor element 5 is the positive side. Wiring inductance 47 produces a potential difference where semiconductor element 5 is the negative side and node Nd is the positive side. Wiring inductance 54 produces a potential difference where node Nd is the negative side and node Nj is the positive side. Wiring inductance 56 produces a potential difference where node Nj is the negative side and semiconductor element 9 is the positive side.

Similarly, wiring inductance 57 produces a potential difference where semiconductor element 9 is the negative side and semiconductor element 10 is the positive side. Wiring inductance 58 produces a potential difference where semiconductor element 10 is the negative side and node Nk is the positive side. Wiring inductance 55 produces a potential difference where node Nk is the negative side and node Ne is the positive side. Wiring inductance 52 produces a potential difference where node Ne is the negative side and semiconductor element 8 is the positive side. Wiring inductance 53 produces a potential difference where semiconductor element 8 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

Here, a voltage applied to semiconductor element 10 that is turned off at the time of transition from the circulation period to the deadtime period will be discussed. In the deadtime period, since semiconductor element 5, semiconductor element 8, and semiconductor element 9 are in the conducting state, a voltage corresponding to a voltage drop due to current I5 is applied to these semiconductor element 5, semiconductor element 8, and semiconductor element 9.

On the other hand, the sum of the voltage at DC power supply 2, the voltage at wiring inductance 40, the voltage at wiring inductance 44, the voltage at wiring inductance 46, the voltage at wiring inductance 47, the voltage at wiring inductance 54, the voltage at wiring inductance 56, the voltage at wiring inductance 57, the voltage at wiring inductance 58, the voltage at wiring inductance 55, the voltage at wiring inductance 52, the voltage at wiring inductance 53, the voltage at wiring inductance 45, and the voltage at wiring inductance 41 is applied to semiconductor element 10. Thus, the off surge voltage higher than the voltage at DC power supply 2 is applied to semiconductor element 10.

Based on the above, it is understood that in power conversion device 1A that is a three-level inverter having a clamp circuit, in the third operation pattern (AC voltage is positive and AC current is negative), at the time of transition from the circulation period to the deadtime period, the wiring inductance on the path from DC power supply 2 to connect semiconductor element 5-semiconductor element 9-semiconductor element 10-semiconductor element 8-DC power supply 2 contributes to production of surge voltage.

Next, the transition of power conversion device 1A from the deadtime period (FIG. 10) to the circulation period (FIG. 11) in the third operation pattern will be discussed.

At the time of transition from the deadtime period (FIG. 10) to the circulation period (FIG. 11), change from the current path (I5) indicated by a solid line to the current path (I4) indicated by a dotted line occurs in FIG. 24. In this case, in actuality, recovery current or displacement current occurs when the diode in semiconductor element 8 changes from a conducting state to a non-conducting state.

Figure 27:
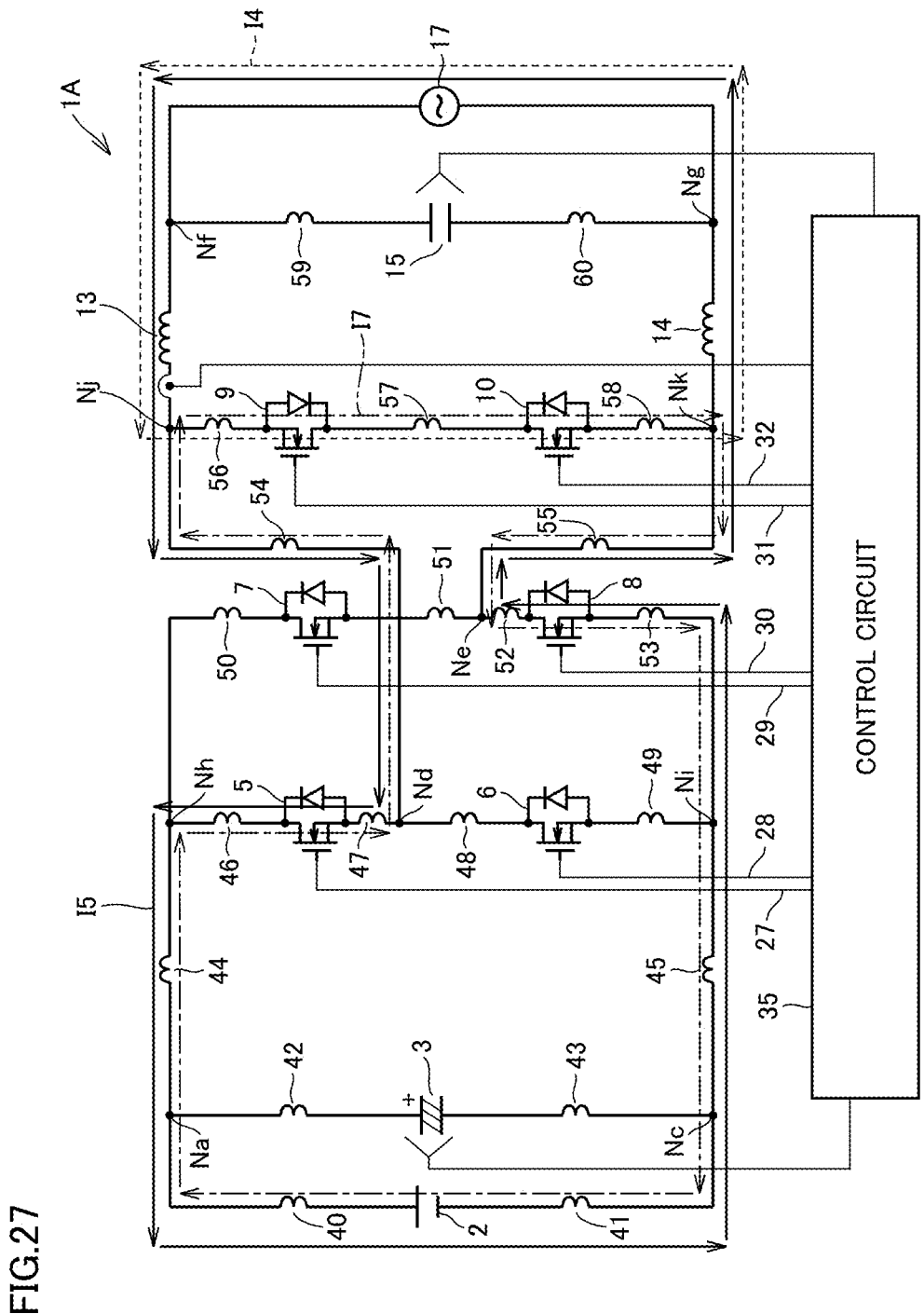
FIG. 27 is a circuit diagram depicting a path of recovery current or displacement current produced at the time of transition from a deadtime period to a circulation period in the third operation pattern.

FIG. 27 is a circuit diagram depicting a path of recovery current or displacement current produced at the time of transition from a deadtime period to a circulation period in the third operation pattern.

Referring to FIG. 27, at the time of transition from the deadtime period to the circulation period, current I7 as recovery current or displacement current occurs, which is different from the current path (I5) in the deadtime period (FIG. 10) indicated by a solid line and the current path (I4) in the circulation period (FIG. 4) indicated by a dotted line. Current I7 flows through a path of DC power supply 2-semiconductor element 5-semiconductor element 9-semiconductor element 10-semiconductor element 8-DC power supply 2, as depicted by a dot-and-dash line, in the same manner as in FIG. 19.

Current I7 disappears when charge inside the diode of semiconductor element 8 is depleted or charging of the floating capacitance is completed. In this case, the wiring inductance included in the path of current I7 produces a potential difference in a direction that hinders current change by which current I7 disappears.

Figure 28:
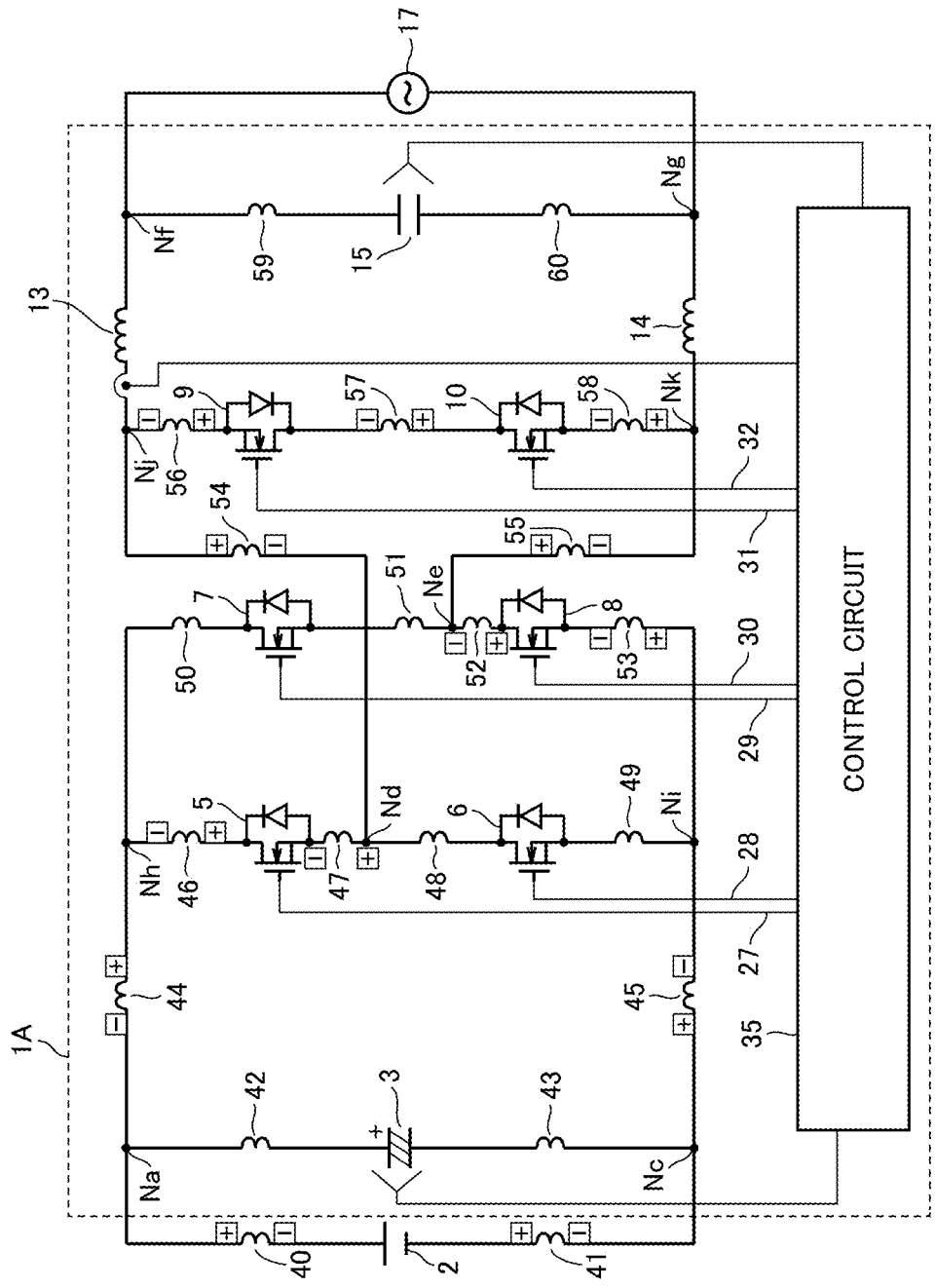
FIG. 28 is a circuit diagram for explaining a potential difference produced in wiring inductance when recovery current or displacement current shown in FIG. 27 disappears.

FIG. 28 shows a circuit diagram for explaining a potential difference produced in wiring inductance when current I7 shown in FIG. 27 disappears.

Referring to FIG. 28, when current I7 (FIG. 27) disappears, wiring inductance 40 produces a potential difference where DC power supply 2 is the negative side and node Na is the positive side. Wiring inductance 44 produces a potential difference where node Na is the negative side and node Nh is the positive side. Wiring inductance 46 produces a potential difference where node Nh is the negative side and semiconductor element 5 is the positive side. Wiring inductance 47 produces a potential difference where semiconductor element 5 is the negative side and node Nd is the positive side. Wiring inductance 54 produces a potential difference where node Nd is the negative side and node Nj is the positive side. Wiring inductance 56 produces a potential difference where node Nj is the negative side and semiconductor element 9 is the positive side. Wiring inductance 57 produces a potential difference where semiconductor element 9 is the negative side and semiconductor element 10 is the positive side.

Furthermore, wiring inductance 58 produces a potential difference where semiconductor element 10 is the negative side and node Nk is the positive side. Wiring inductance 55 produces a potential difference where node Nk is the negative side and node Ne is the positive side. Wiring inductance 52 produces a potential difference where node Ne is the negative side and semiconductor element 8 is the positive side. Wiring inductance 53 produces a potential difference where semiconductor element 8 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

In this way, in the third operation pattern, at the time of transition from the deadtime period to the circulation period, the voltage produced in each wiring inductance is in the same direction as at the time of transition from the circulation period to the deadtime period. However, since semiconductor element 9 and semiconductor element 10 are in the ON state in the circulation period, only a voltage corresponding to a voltage drop due to current is applied to these semiconductor element 9 and semiconductor element 10 when current I7 disappears. Therefore, when recovery current or displacement current disappears at the time of transition from the deadtime period to the circulation period, the recovery surge voltage higher than the voltage at DC power supply 2 is applied to semiconductor element 5 and semiconductor element 8.

Based on the above, it is understood that when power conversion device 1A is in the third operation pattern (AC voltage is positive and AC current is negative), the wiring inductance that is problematic at the time of transition between the deadtime period and the circulation period, that is, the wiring inductance contributing to production of surge voltage is the wiring inductance included in the path from DC power supply 2 to connect semiconductor element 5-semiconductor element 9-semiconductor element 10-semiconductor element 8-DC power supply 2.

(Discussion of Surge Voltage in Fourth Operation Pattern of Power Conversion Device)

Next, the surge voltage produced when power conversion device 1A is in the fourth operation pattern (AC voltage is negative and AC current is positive) will be discussed. Here, it is necessary to consider the transition from the circulation period shown in FIG. 14 to the deadtime period shown in FIG. 13 and vice versa, the transition from the deadtime period (FIG. 13) to the circulation period (FIG. 14).

Figure 29:
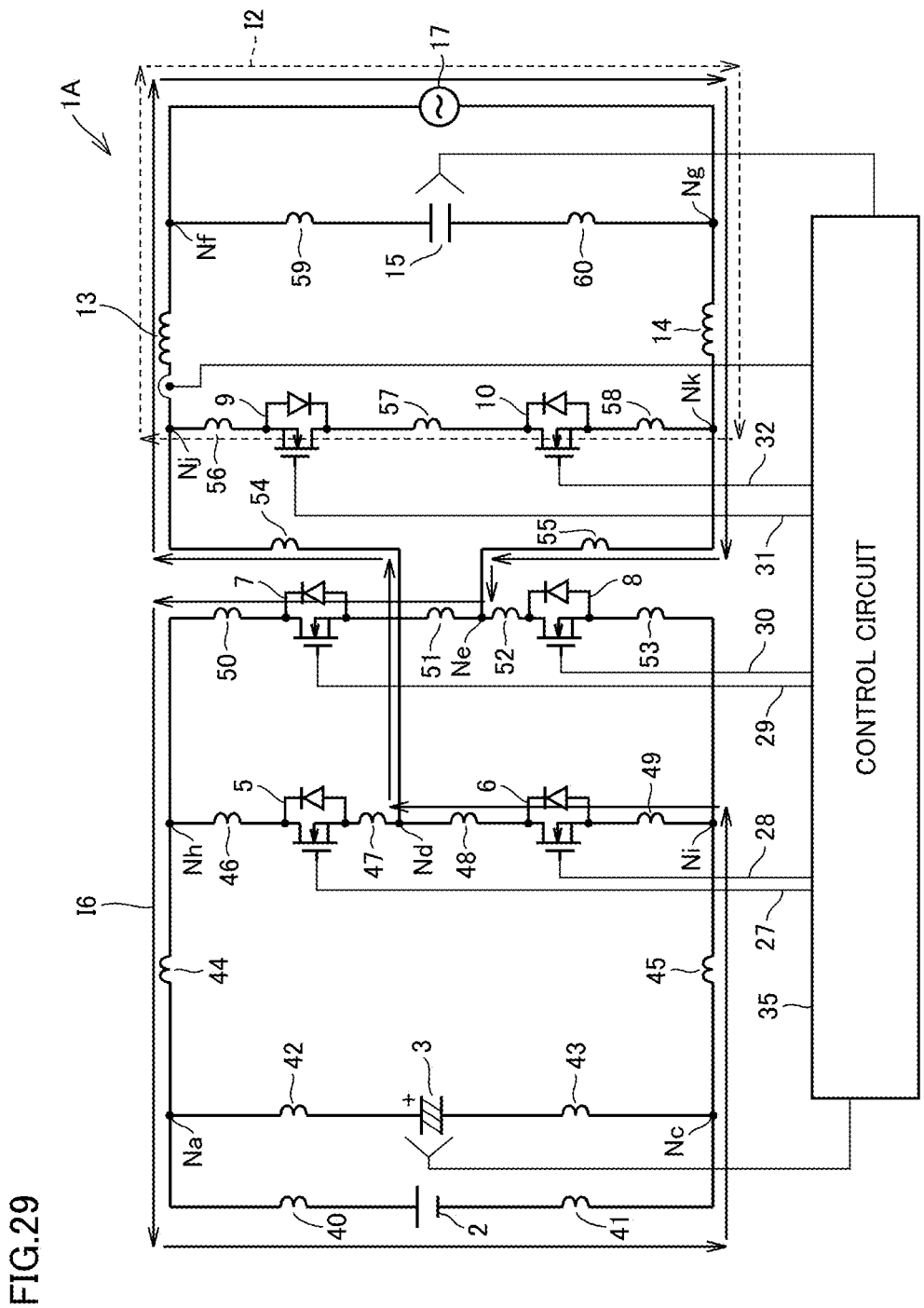
FIG. 29 is a circuit diagram for comparing current paths in a circulation period and a deadtime period in the fourth operation pattern of the power conversion device according to the first embodiment.

FIG. 29 is a circuit diagram for comparing current paths in a circulation period (FIG. 14) and a deadtime period (FIG. 13) in the fourth operation pattern. In FIG. 29, the current path (I6) in the deadtime period (FIG. 13) is indicated by a solid line, and the current path (I2) in the circulation period (FIG. 14) is indicated by a dotted line. FIG. 29 also does not depict which of semiconductor elements 5 to 10 in FIG. 13 and FIG. 14 is turned on.

Referring to FIG. 29, in the path indicated by the solid line and the dotted line in an overlapped manner, node Nj-output filter reactor 13-node Nf-AC power supply 17-node Ng-output filter reactor 14-node Nk, change of current does not occur at the time of transition between the circulation period and the deadtime period.

By contrast, in the path of node Nk-wiring inductance 55-wiring inductance 51-semiconductor element 7-wiring inductance 50-node Nh-wiring inductance 44-node Na-wiring inductance 40-DC power supply 2-wiring inductance 41-node Nc-wiring inductance 45-node Ni-wiring inductance 49-semiconductor element 6-wiring inductance 48-node Nd-wiring inductance 54-node Nj, current change occurs such that current does not flow so far but current comes to flow, at the time of transition from the circulation period to the deadtime period.

On the other hand, in the path of node Nk-wiring inductance 58-semiconductor element 10-wiring inductance 57-semiconductor element 9-wiring inductance 56-node Nj, current change occurs such that current flows so far but current no longer flows.

Figure 30:
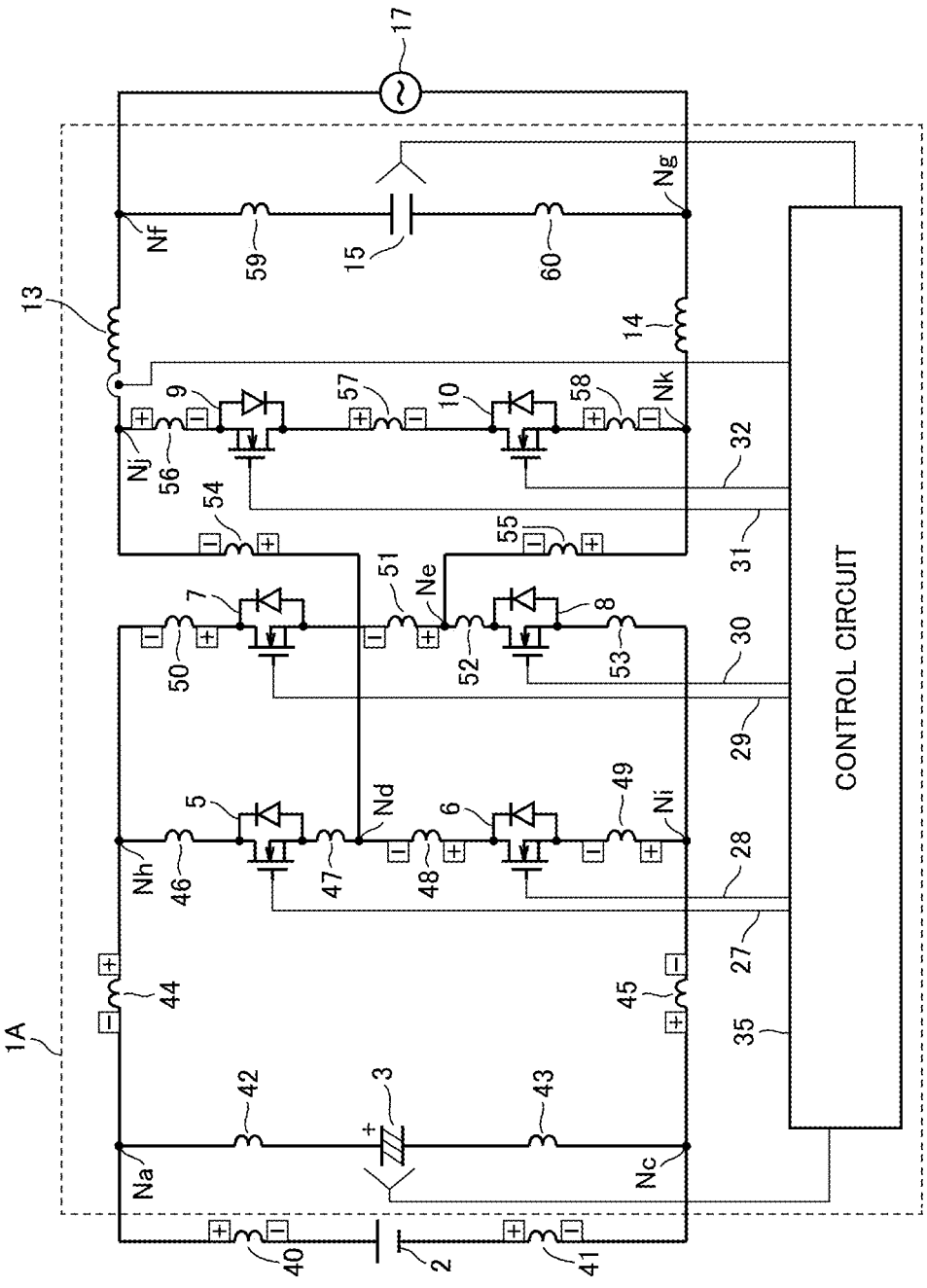
FIG. 30 is a circuit diagram for explaining a potential difference produced in wiring inductance at the time of transition from a circulation period to a deadtime period in the fourth operation pattern.

FIG. 30 is a circuit diagram for explaining a potential difference produced in wiring inductance at the time of transition from a circulation period to a deadtime period in the fourth operation pattern.

Referring to FIG. 30, a potential difference in a direction that hinders current change is produced as described below in the wiring inductance included in the path in which current change occurs as explained with reference to FIG. 29.

Specifically, wiring inductance 40 produces a potential difference where DC power supply 2 is the negative side and node Na is the positive side. Wiring inductance 44 produces a potential difference where node Na is the negative side and node Nh is the positive side. Wiring inductance 50 produces a potential difference where node Nh is the negative side and semiconductor element 7 is the positive side. Wiring inductance 51 produces a potential difference where semiconductor element 7 is the negative side and node Ne is the positive side. Wiring inductance 55 produces a potential difference where node Ne is the negative side and node Nk is the positive side.

Similarly, wiring inductance 58 produces a potential difference where node Nk is the negative side and semiconductor element 10 is the positive side. Wiring inductance 57 produces a potential difference where semiconductor element 10 is the negative side and semiconductor element 9 is the positive side. Wiring inductance 56 produces a potential difference where semiconductor element 9 is the negative side and node Nj is the positive side. Wiring inductance 54 produces a potential difference where node Nj is the negative side and node Nd is the positive side. Wiring inductance 48 produces a potential difference where node Nd is the negative side and semiconductor element 6 is the positive side. Wiring inductance 49 produces a potential difference where semiconductor element 6 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

Here, a voltage applied to semiconductor element 9 at the time of transition from the circulation period to the deadtime period will be discussed. In the deadtime period, only a voltage corresponding to a voltage drop due to current I6 is applied to semiconductor element 6, semiconductor element 7, and semiconductor element 10.

On the other hand, the sum of the voltage at DC power supply 2, the voltage at wiring inductance 40, the voltage at wiring inductance 44, the voltage at wiring inductance 50, the voltage at wiring inductance 51, the voltage at wiring inductance 55, the voltage at wiring inductance 58, the voltage at wiring inductance 57, the voltage at wiring inductance 56, the voltage at wiring inductance 54, the voltage at wiring inductance 48, the voltage at wiring inductance 49, the voltage at wiring inductance 45, and the voltage at wiring inductance 41 is applied to semiconductor element 9. Thus, the off surge voltage higher than the voltage at DC power supply 2 is applied to semiconductor element 9.

Based on the above, it is understood that in power conversion device 1A that is a three-level inverter having a clamp circuit, in the fourth operation pattern (AC voltage is negative and AC current is positive), at the time of transition from the circulation period to the deadtime period, the wiring inductance on the path from DC power supply 2 to connect semiconductor element 7-semiconductor element 10-semiconductor element 9-semiconductor element 6-DC power supply 2 contributes to production of surge voltage.

Next, the transition of power conversion device 1A from the deadtime period (FIG. 13) to the circulation period (FIG. 14) in the fourth operation pattern will be discussed.

At the time of transition from the deadtime period (FIG. 13) to the circulation period (FIG. 14), change from the current path (I6) indicated by a solid line to the current path (I2) indicated by a dotted line occurs in FIG. 29. In this case, in actuality, recovery current or displacement current occurs when the diodes in semiconductor element 7 and semiconductor element 6 change from a conducting state to a non-conducting state.

Figure 31:
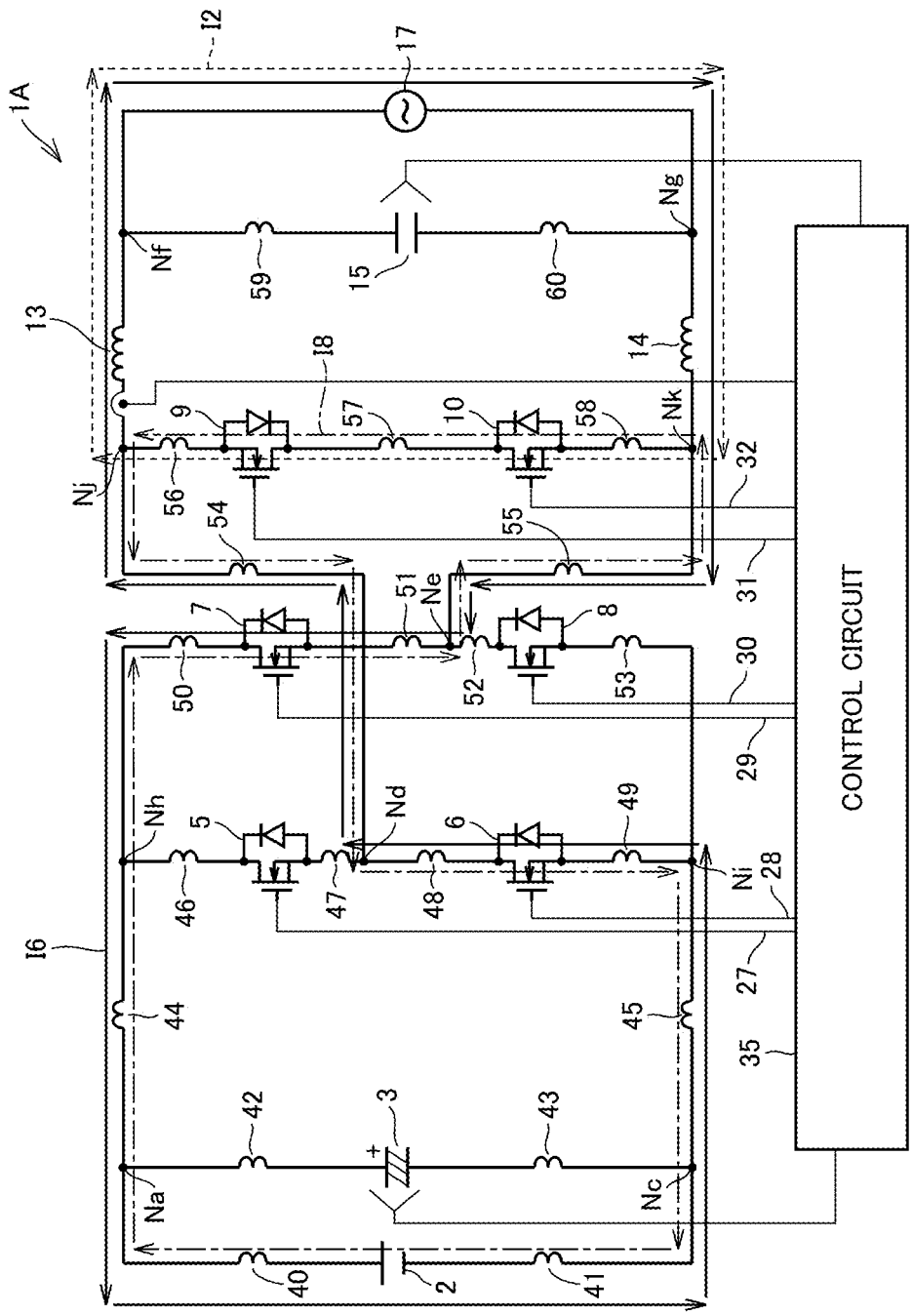
FIG. 31 is a circuit diagram depicting a path of recovery current or displacement current produced at the time of transition from a deadtime period to a circulation period in the fourth operation pattern.

FIG. 31 is a circuit diagram depicting a path of recovery current or displacement current produced at the time of transition from a deadtime period to a circulation period in the fourth operation pattern.

Referring to FIG. 31, at the time of transition from the deadtime period to the circulation period, current I8 as recovery current or displacement current occurs, which is different from the current path (I6) in the deadtime period (FIG. 13) indicated by a solid line and the current path (I2) in the circulation period (FIG. 14) indicated by a dotted line. Current I8 flows through a path of DC power supply 2-semiconductor element 7-semiconductor element 10-semiconductor element 9-semiconductor element 6-DC power supply 2, as depicted by a dot-and-dash line, in the same manner as in FIG. 23.

Current I8 disappears when charge inside the diodes of semiconductor element 7 and semiconductor element 6 is depleted or charging of the floating capacitance is completed. In this case, the wiring inductance included in the path of current I8 produces a potential difference in a direction that hinders current change by which current I7 disappears.

Figure 32:
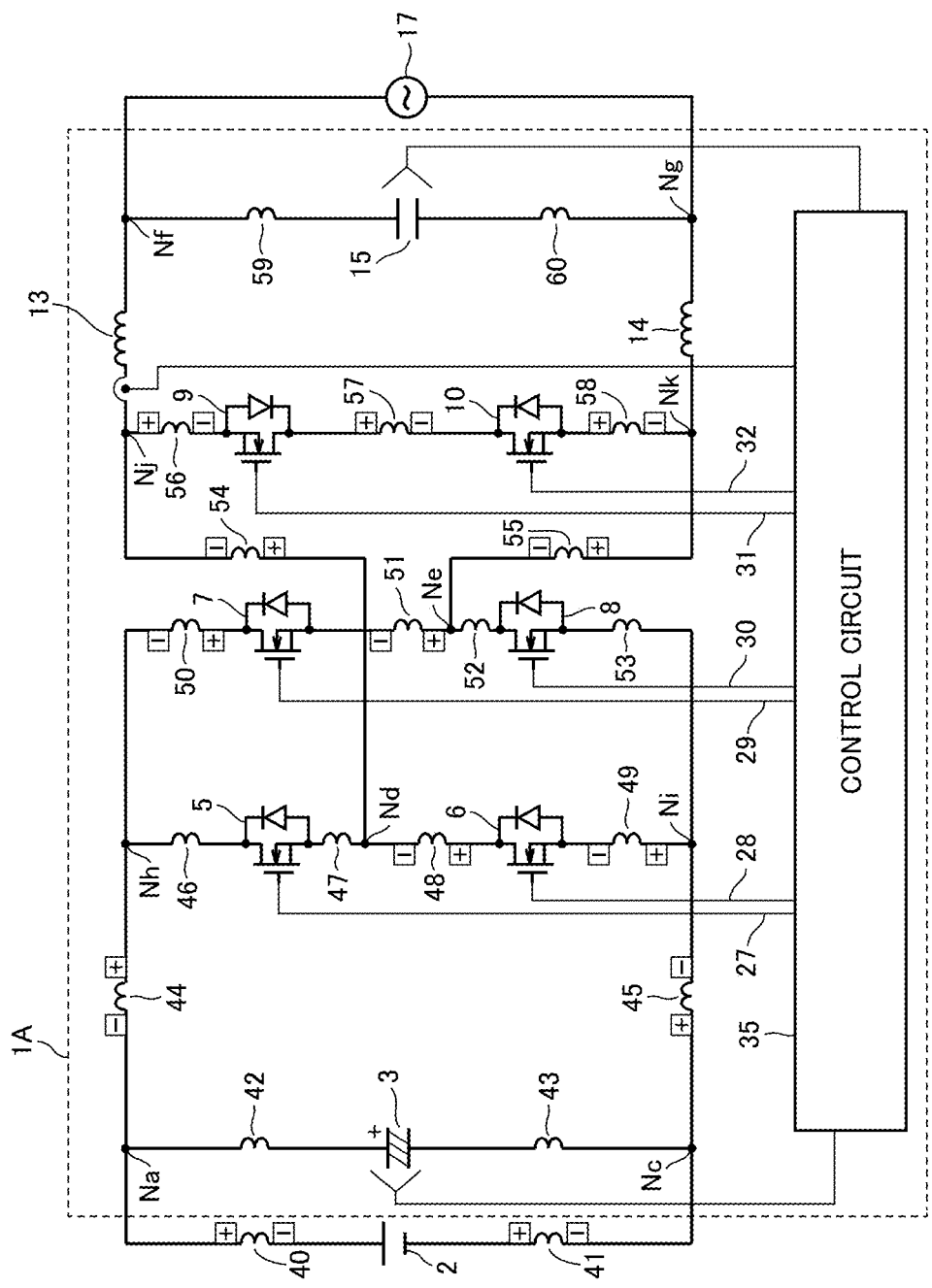
FIG. 32 is a circuit diagram for explaining a potential difference produced in wiring inductance when recovery current or displacement current shown in FIG. 31 disappears.

FIG. 32 shows a circuit diagram for explaining a potential difference produced in wiring inductance when current I7 shown in FIG. 31 disappears.

Referring to FIG. 32, when current I8 (FIG. 31) disappears, wiring inductance 40 produces a potential difference where DC power supply 2 is the negative side and node Na is the positive side. Wiring inductance 44 produces a potential difference where node Na is the negative side and node Nh is the positive side. Wiring inductance 50 produces a potential difference where node Nh is the negative side and semiconductor element 7 is the positive side. Wiring inductance 51 produces a potential difference where semiconductor element 7 is the negative side and node Ne is the positive side. Wiring inductance 55 produces a potential difference where node Ne is the negative side and node Nk is the positive side. Wiring inductance 58 produces a potential difference where node Nk is the negative side and semiconductor element 10 is the positive side.

Furthermore, wiring inductance 57 produces a potential difference where semiconductor element 10 is the negative side and semiconductor element 9 is the positive side. Wiring inductance 56 produces a potential difference where semiconductor element 9 is the negative side and node Nj is the positive side. Wiring inductance 54 produces a potential difference where node Nj is the negative side and node Nd is the positive side. Wiring inductance 48 produces a potential difference where node Nd is the negative side and semiconductor element 6 is the positive side. Wiring inductance 49 produces a potential difference where semiconductor element 6 is the negative side and node Ni is the positive side. Wiring inductance 45 produces a potential difference where node Ni is the negative side and node Nc is the positive side. Wiring inductance 41 produces a potential difference where node Nc is the negative side and DC power supply 2 is the positive side.

In this way, in the fourth operation pattern, at the time of transition from the deadtime period to the circulation period, the voltage produced in each wiring inductance is in the same direction as at the time of transition from the circulation period to the deadtime period. However, since semiconductor element 9 and semiconductor element 10 are in the ON state in the circulation period, only a voltage corresponding to a voltage drop due to current is applied to these semiconductor element 9 and semiconductor element 10 when current I7 disappears. Therefore, when recovery current or displacement current disappears at the time of transition from the deadtime period to the circulation period, the recovery surge voltage is applied to semiconductor element 6 and semiconductor element 7 in accordance with the sum of the voltage at DC power supply 2 and the voltages produced in the wiring inductances.

Based on the above, it is understood that when power conversion device 1A is in the fourth operation pattern (AC voltage is negative and AC current is positive), the wiring inductance that is problematic at the time of transition between the deadtime period and the circulation period, that is, the wiring inductance contributing to production of surge voltage is the wiring inductance included in the path from DC power supply 2 to connect semiconductor element 7-semiconductor element 10-semiconductor element 9-semiconductor element 6-DC power supply 2.

(Summary of Surge Voltage in Each Operation Pattern of Power Conversion Device)

The semiconductor elements in which surge voltage is produced and the current path causing surge voltage in each operation pattern illustrated in FIG. 18 to FIG. 32 can be summed up in FIG. 33.

FIG. 33 is a table showing a list of semiconductor elements in which surge voltage is produced and a current path causing surge voltage in each operation pattern of power conversion device 1A according to the first embodiment.

Referring to FIG. 33, in the first operation pattern in which AC voltage and AC current are positive, the off surge voltage is produced in semiconductor element 5 and semiconductor element 8 while the recovery surge voltage is produced in semiconductor element 10, as explained with reference to FIG. 17 to FIG. 20. As explained with reference to FIG. 18 and FIG. 20, for both of the off surge voltage and the recovery surge voltage, the current path causing surge voltage is the path from DC power supply 2 to connect semiconductor element 5-semiconductor element 9-semiconductor element 10-semiconductor element 8-DC power supply 2, and the wiring inductance on the path produces the surge voltage.

In the second operation pattern in which AC voltage and AC current are negative, the off surge voltage is produced in semiconductor element 6 and semiconductor element 7 while the recovery surge voltage is produced in semiconductor element 9, as explained with reference to FIG. 21 to FIG. 24. As explained with reference to FIG. 22 and FIG. 24, for both of the off surge voltage and the recovery surge voltage, the current path causing surge voltage is the path from DC power supply 2 to connect semiconductor element 7-semiconductor element 10-semiconductor element 9-semiconductor element 6-DC power supply 2, and the wiring inductance on the path produces the surge voltage.

In the third operation pattern in which AC voltage is positive and AC current is negative, the off surge voltage is produced in semiconductor element 10 while the recovery surge voltage is produced in semiconductor element 5 and semiconductor element 8, as explained with reference to FIG. 25 to FIG. 28. As explained with reference to FIG. 26 and FIG. 28, for both of the off surge voltage and the recovery surge voltage, the current path producing surge voltage is the path from DC power supply 2 to connect semiconductor element 5-semiconductor element 9-semiconductor element 10-semiconductor element 8-DC power supply 2, and the wiring inductance on the path produces the surge voltage.

In the fourth operation pattern in which AC voltage is negative and AC current is positive, the off surge voltage is produced in semiconductor element 9 while the recovery surge voltage is produced in semiconductor element 6 and semiconductor element 7, as explained with reference to FIG. 29 to FIG. 32. As explained with reference to FIG. 30 and FIG. 32, for both of the off surge voltage and the recovery surge voltage, the current path causing surge voltage is the path from DC power supply 2 to connect semiconductor element 7-semiconductor element 10-semiconductor element 9-semiconductor element 6-DC power supply 2, and the wiring inductance on the path produces the surge voltage.

Based on FIG. 33, in power conversion device 1A that is a three-level inverter having a clamp circuit, the semiconductor elements in which surge voltage is produced and the current path causing surge voltage are common in the first operation pattern and the third operation pattern. Similarly, the semiconductor elements in which surge voltage is produced and the current path causing surge voltage are common in the second operation pattern and the second operation pattern. Therefore, in power conversion device 1A, there are two kinds of current paths causing surge voltage, that is, paths including wiring inductance producing surge voltage.

(Surge Voltage Reduction in Two-Level Inverter)

Reduction of surge voltage in a two-level inverter will now be described as a comparative example.

Figure 34:
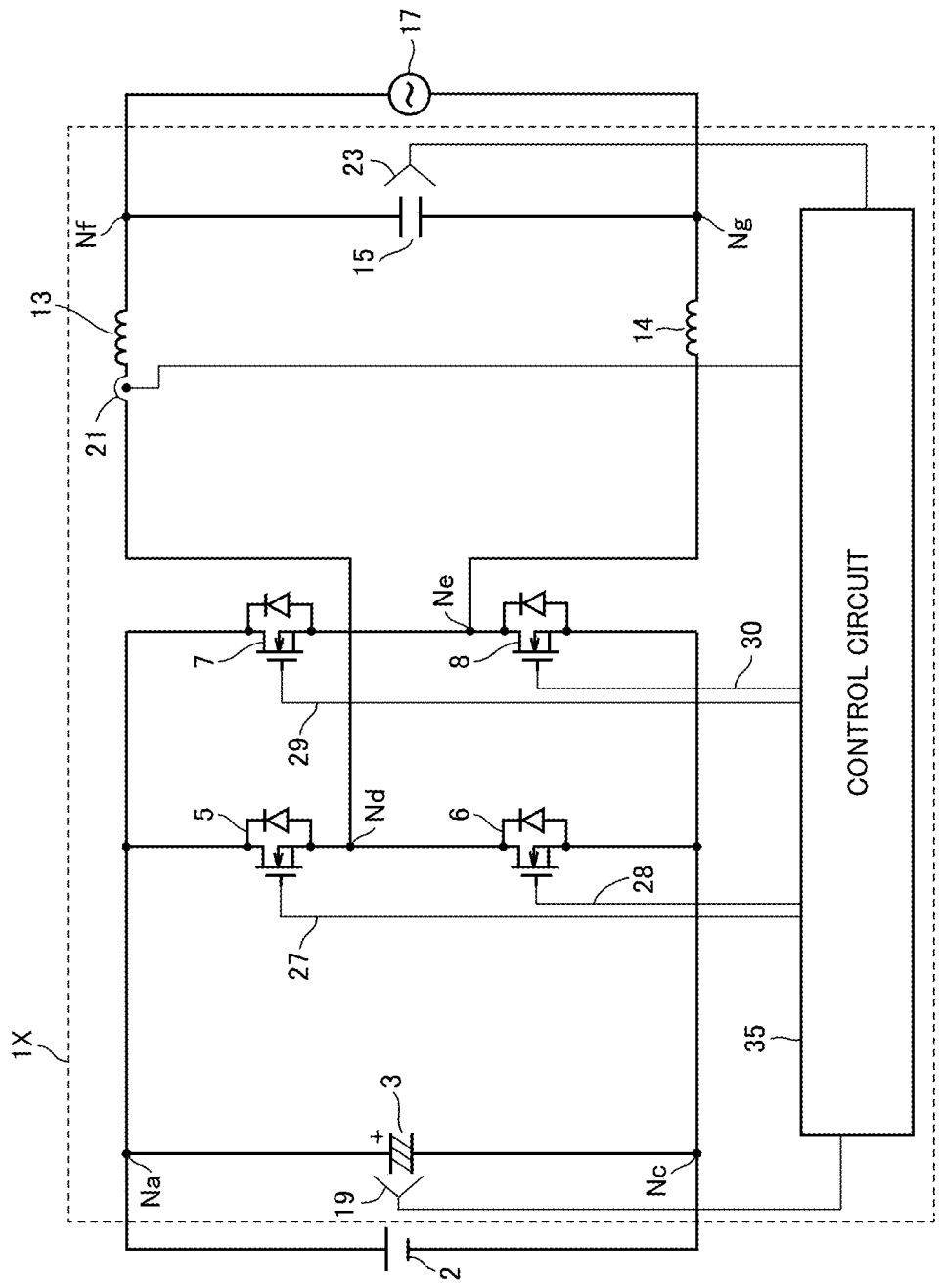
FIG. 34 is a circuit diagram depicting a configuration of a two-level inverter illustrated as a comparative example.

FIG. 34 is a circuit diagram depicting a configuration of a two-level inverter illustrated as a comparative example.

Referring to FIG. 34, a two-level inverter 1X illustrated as a comparative example is configured with a full-bridge inverter and has a circuit configuration excluding semiconductor element 9 and semiconductor element 10 from power conversion device 1A shown in FIG. 1.

More specifically, two-level inverter 1X differs from power conversion device 1A in FIG. 1 in that node Nd is connected to output filter reactor 13 not through a semiconductor element, and node Ne is connected to output filter reactor 14 not through a semiconductor element. On the other hand, in two-level inverter 1X, the bridge circuit including semiconductor element 5 to semiconductor element 8 is configured in the same manner as power conversion device 1A. Similarly, the connection relation of the output filter circuit and AC power supply 17 to nodes Nf and Ng is common in two-level inverter 1X and power conversion device 1A. In other words, power conversion device 1A has a configuration in which at least one semiconductor element to configure a bidirectional switch acting as a clamp circuit is connected between the midpoint of the first leg and the midpoint of the second leg in the bridge circuit (two-level inverter 1X).

Figure 35:
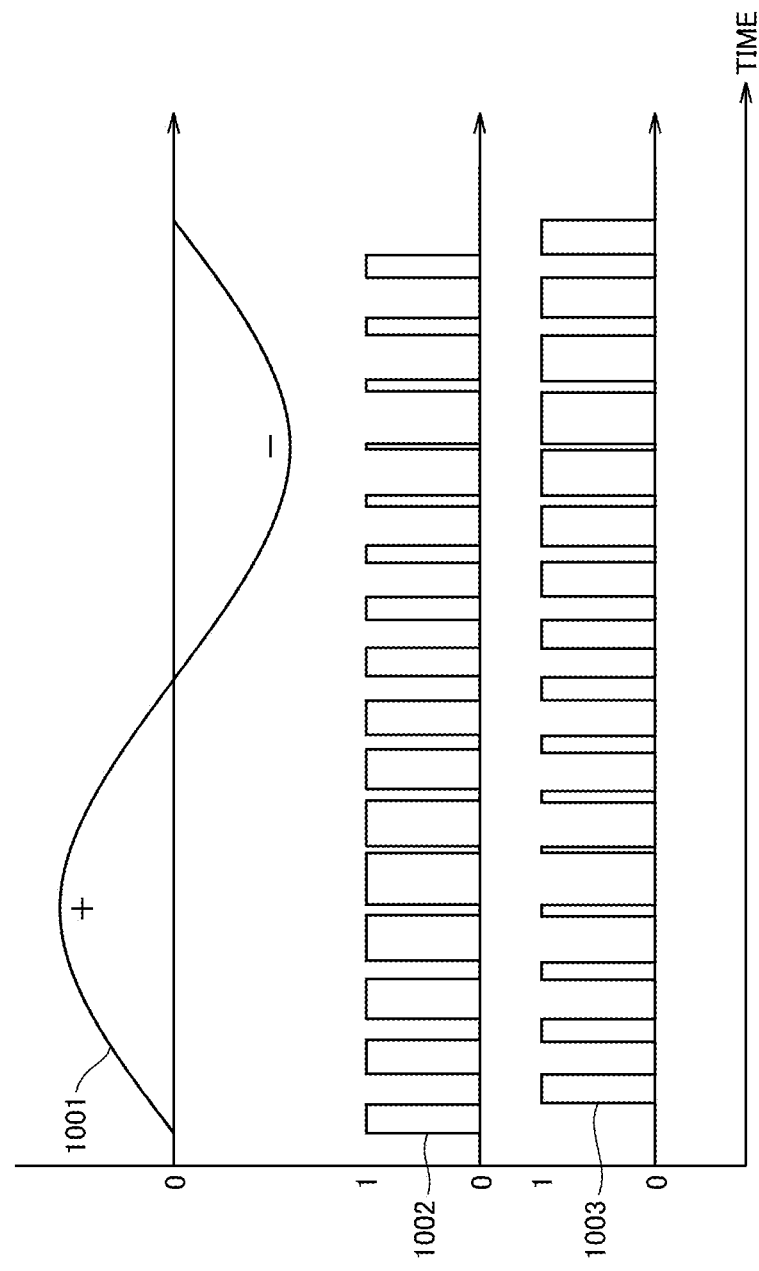
FIG. 35 is a waveform diagram depicting on/off control of semiconductor elements in the two-level inverter shown in FIG. 34.

FIG. 35 is a waveform diagram depicting on/off control of semiconductor elements in two-level inverter 1X shown in FIG. 34.

Referring to FIG. 35, with reference to an AC output command value 1001 similar to AC output command value 201 in FIG. 2, a drive signal 1002 for semiconductor element 5 and semiconductor element 8 and a drive signal 1003 for semiconductor element 6 and semiconductor element 7 are generated.

Throughout the positive period and the negative period of AC output command value 1001, drive signals 1002 and 1003 are complementarily set to "1" and "0". Drive signals 27 and 30 for semiconductor element 5 and semiconductor element 8 are generated in accordance with drive signal 1002, and drive signals 28 and 29 for semiconductor element 6 and semiconductor element 7 are generated in accordance with drive signal 1003. In this case, the deadtime described above is provided as appropriate in drive signals 27 to 30. As a result, semiconductor elements 5 to 8 are switching-controlled irrespective positive/negative of AC output command value 1001.

Figure 36:
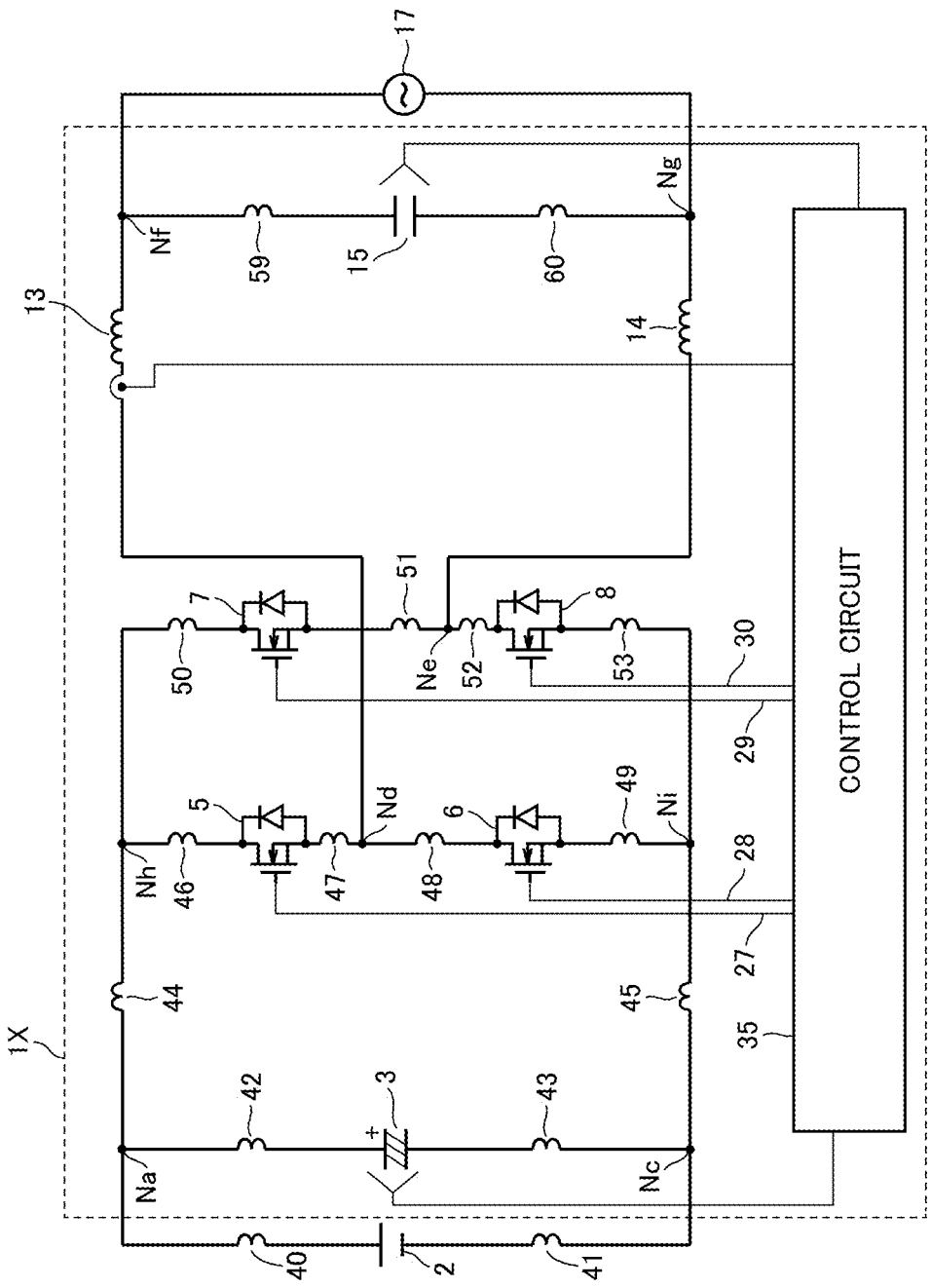
FIG. 36 is a circuit diagram depicting wiring inductance present in the two-level inverter shown in FIG. 34.

FIG. 36 is a circuit diagram depicting wiring inductance present in two-level inverter 1X shown in FIG. 34.

In FIG. 36 compared with FIG. 15, in two-level inverter 1X, wiring inductances 40 to 53 similar to those in FIG. 15 are also present in the bridge circuit configured with semiconductor elements 5 to 8. On the other hand, since semiconductor element 9 and semiconductor element 10 in FIG. 1 are not disposed, wiring inductances 54 to 58 in FIG. 15 need not be considered. Furthermore, wiring inductances 59 and 60 similar to those in FIG. 15 are present between output filter reactor 13, 14 and output filter capacitor 15.

In two-level inverter 1X, the surge voltage is also produced with the switching operation of semiconductor elements 5 to 8. However, because of the difference in switching operation described with reference to FIG. 35, the formed current paths differ between power conversion device 1A according to the first embodiment and two-level inverter 1X of the comparative example. As a result, the production patterns of surge voltage differ between power conversion device 1A and two-level inverter 1X.

Although not described in detail, in two-level inverter 1X (FIG. 34), the first to fourth operation patterns similar to those in power conversion device 1A are also defined, and analysis similar to that in FIG. 18 to FIG. 32 is performed to obtain FIG. 37 similar to FIG. 33.

FIG. 37 is a table showing a list of semiconductor elements in which surge voltage is produced and a current path causing surge voltage in each operation pattern of two-level inverter 1X.

Referring to FIG. 37, in two-level inverter 1X, the off surge voltage or the recovery surge voltage occurs in each of semiconductor elements 5 to 8 through the first to fourth operation patterns. Specifically, depending on positive/negative of AC current, in the first and fourth operation patterns in which AC current is positive, the off surge voltage occurs in semiconductor element 5 and semiconductor element 8 while the recovery surge voltage occurs in semiconductor element 6 and semiconductor element 7. By contrast, in the second and third operation patterns in which AC current is negative, the off surge voltage occurs in semiconductor element 6 and semiconductor element 7 while the recovery surge voltage occurs in semiconductor element 5 and semiconductor element 8.

The current paths causing surge voltage are common in the first to fourth operation patterns. Specifically, the wiring inductance on two paths, namely, the path of DC power supply 2-semiconductor element 5-semiconductor element 6-DC power supply 2 and the path of DC power supply 2-semiconductor element 7-semiconductor element 8-DC power supply 2, produces a surge voltage in common in the operation patterns.

Figure 38:
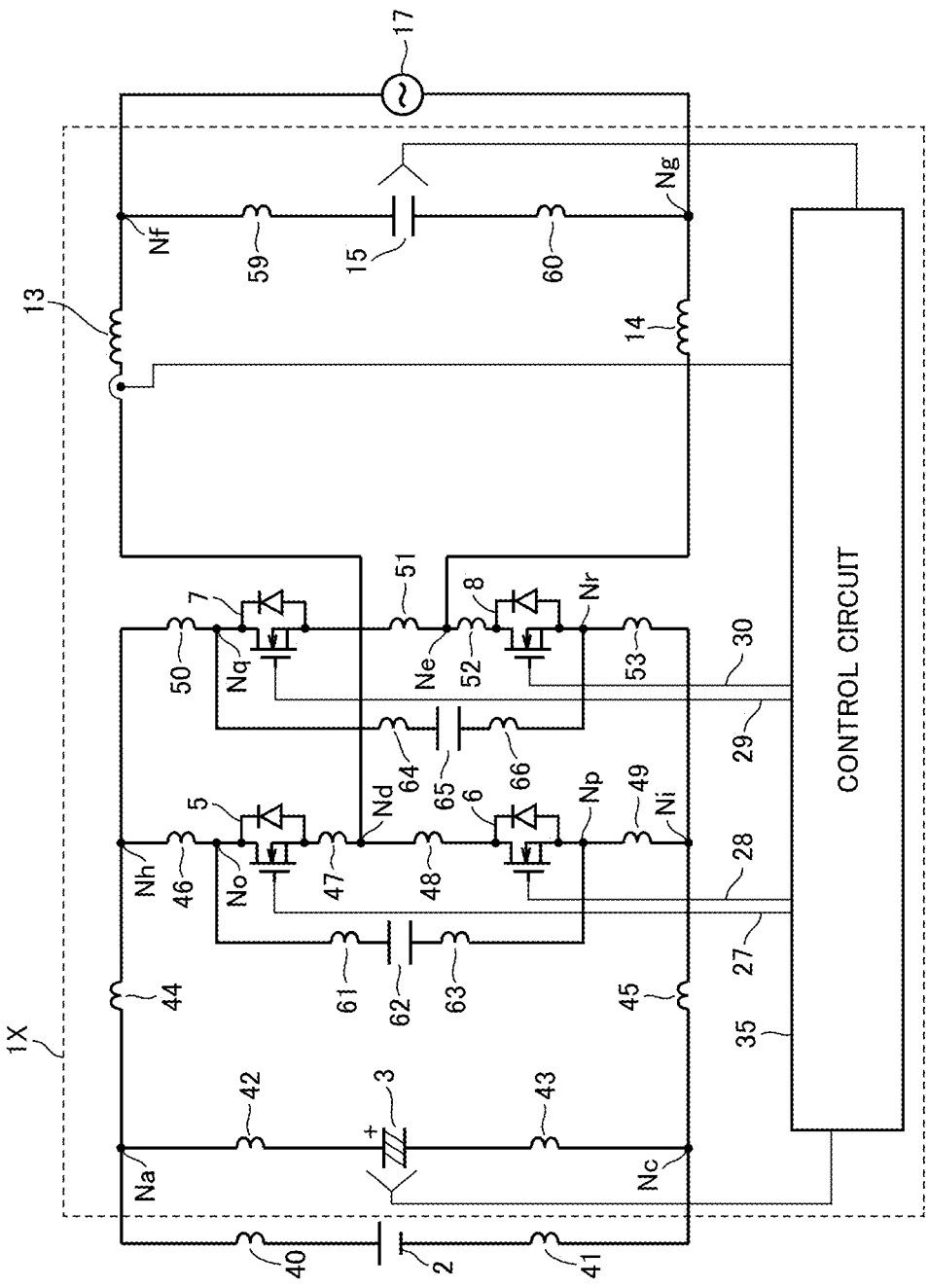
FIG. 38 is a circuit diagram depicting an arrangement example of snubber capacitors in the two-level inverter shown in FIG. 34.

FIG. 38 is a circuit diagram depicting an arrangement example of snubber capacitors in the two-level inverter according to the comparative example.

Referring to FIG. 38, snubber capacitors 62 and 65 for reducing surge voltage are provided for two-level inverter 1X (FIG. 34). Snubber capacitor 62 with wiring inductances 61 and 63 is connected in parallel to a first leg that is a series connection of semiconductor element 5 and semiconductor element 6. Similarly, snubber capacitor 65 with wiring inductances 64 and 66 is connected in parallel to a second leg that is a series connection of semiconductor element 7 and semiconductor element 8.

As a result, in two-level inverter 1X as a whole, DC power supply 2, smoothing capacitor 3, the first leg, the second leg, snubber capacitor 62, and snubber capacitor 65 are connected in parallel. The example in FIG. 38 is a typical arrangement manner in which snubber capacitors 62 and 65 are disposed close to the first leg and the second leg, respectively.

As shown in FIG. 37, in two-level inverter 1X, the current path of DC power supply 2-semiconductor element 5-semiconductor element 6-DC power supply 2 and the current path of DC power supply 2-semiconductor element 7-semiconductor element 8-DC power supply 2 produce a surge voltage.

Snubber capacitor 62 is connected between a node No connected to the positive electrode of semiconductor element 5 and a node Np connected to the negative electrode of semiconductor element 6, for semiconductor element 5 and semiconductor element 6 (first leg) on the former current path. This can shorten the path formed via snubber capacitor 62 between the positive electrode of semiconductor element 5 and the negative electrode of semiconductor element 6. Therefore, the wiring inductance can be reduced on the path including snubber capacitor 62 formed between the positive electrode of semiconductor element 5 and the negative electrode of semiconductor element 6. As a result, the voltage produced in the wiring inductance on the path due to high-frequency current passing through snubber capacitor 62 is reduced at the time of current change associated with the switching operation of semiconductor element 5 or semiconductor element 6, thereby reducing the surge voltage produced in semiconductor element 5 and semiconductor element 6.

Similarly, snubber capacitor 62 is connected between a node Nq connected to the positive electrode of semiconductor element 7 and a node Nr connected to the negative electrode of semiconductor element 8, for semiconductor element 7 and semiconductor element 8 (second leg) on the latter current path. This can shorten the path formed via snubber capacitor 65 between the positive electrode of semiconductor element 7 and the negative electrode of semiconductor element 8. Therefore, the wiring inductance can be reduced on the path including snubber capacitor 65 formed between the positive electrode of semiconductor element 7 and the negative electrode of semiconductor element 8. As a result, the voltage produced in the wiring inductance on the path due to high-frequency current passing through snubber capacitor 65 is reduced at the time of current change associated with the switching operation of semiconductor element 7 or semiconductor element 8, thereby reducing the surge voltage produced in semiconductor element 75 and semiconductor element 8.

In this way, in two-level inverter 1X of the comparative example, as shown in FIG. 38, snubber capacitors 62 and 65 are disposed close to the first leg and the second leg, respectively, whereby the surge voltage produced in semiconductor elements 5 to 8 can be reduced.

(Surge Voltage Reduction in Three-Level Inverter Having Clamp Circuit)

The arrangement of snubber capacitors for reducing the surge voltage in power conversion device 1A according to the first embodiment will now be described.

As understood from FIG. 1 and FIG. 34, power conversion device 1A according to the first embodiment and the two-level inverter of the comparative example have the same configuration of the bridge circuit including semiconductor elements 5 to 8. However, in power conversion device 1A, the effect of reducing the surge voltage is not sufficient if snubber capacitors are disposed in the same manner as in FIG. 37 for the bridge circuit including semiconductor elements 5 to 8.

As explained with reference to FIG. 33, in power conversion device 1A, the current path producing surge voltage differs between when AC voltage is positive and when it is negative, and there are two current paths, namely, the current path (hereinafter referred to as first current path) connecting DC power supply 2-semiconductor element 5-semiconductor element 9-semiconductor element 10-semiconductor element 8-DC power supply 2 and the current path (hereinafter referred to as second current path) connecting DC power supply 2-semiconductor element 7-semiconductor element 10-semiconductor element 9-semiconductor element 6-DC power supply 2.

Therefore, if snubber capacitor 62 is disposed in accordance with the arrangement example in FIG. 38 for semiconductor element 5 and semiconductor element 8 included in the first current path, the path including snubber capacitor 62 formed between the positive electrode of semiconductor element 5 and the negative electrode of semiconductor element 8 further includes wiring inductances 49 and 53 in addition to wiring inductances 61 and 63. As a result, at the time of current change on the first current path associated with the switching operation of semiconductor element 5 or semiconductor element 8, the voltage produced in the wiring inductance on the path due to high-frequency current passing through snubber capacitor 62 increases, so that the effect of reducing the surge voltage may become insufficient.

Similarly, if snubber capacitor 65 is disposed in accordance with the arrangement example in FIG. 38 for semiconductor element 6 and semiconductor element 7 included in the second current path, the path including snubber capacitor 65 formed between the positive electrode of semiconductor element 7 and the negative electrode of semiconductor element 6 further includes wiring inductances 49 and 53 in addition to wiring inductances 64 and 66. As a result, the effect of reducing surge voltage may also become insufficient for semiconductor element 6 and semiconductor element 7, for the same reason.

Figure 39:
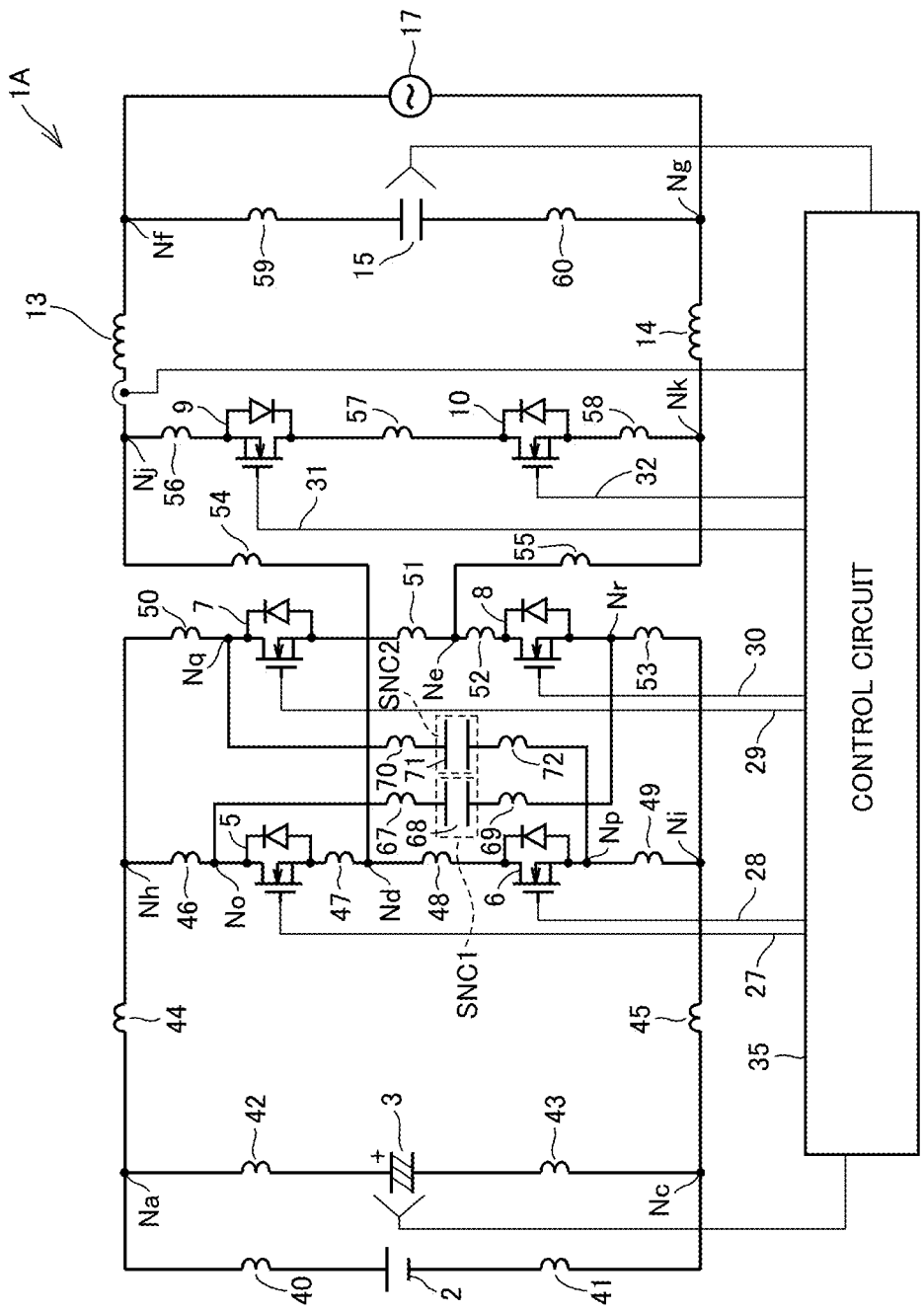
FIG. 39 is a circuit diagram depicting an arrangement example of snubber capacitors (snubber circuits) in the power conversion device according to the first embodiment.

FIG. 39 is a circuit diagram depicting an arrangement example of snubber capacitors in the power conversion device according to the first embodiment.

Referring to FIG. 39, snubber capacitors 68 and 71 are provided for power conversion device 1A that is a three-level inverter having a clamp circuit. Snubber capacitor 68 and snubber capacitor 71 are connected in parallel with DC power supply 2, smoothing capacitor 3, the first leg, and the second leg. Therefore, the electrical connection relation between snubber capacitors 68, 71 and the main circuit including DC power supply 2, smoothing capacitor 3, the first leg, and the second leg in power conversion device 1A is the same as the electrical connection relation between snubber capacitors 62, 65 and the main circuit in FIG. 38.

On the other hand, in FIG. 39, the arrangement of snubber capacitors 68, 71 for semiconductor elements 5 to 8 (the connection distance to each semiconductor element) is different from the arrangement example in FIG. 38.

Specifically, snubber capacitor 68 is connected between node No connected to the positive electrode of semiconductor element 5 and node Nr connected to the negative electrode of semiconductor element 8. Snubber capacitor 71 is connected between node Nq connected to the positive electrode of semiconductor element 7 and node Np connected to the negative electrode of semiconductor element 6.

Thus, the length of the conductor (hereinafter also referred to as "connection distance") connecting snubber capacitor 68 and the positive electrode of semiconductor element 5 can be made shorter than the connection distance between snubber capacitor 68 and the positive electrode of semiconductor element 7. Furthermore, the connection distance between snubber capacitor 68 and the negative electrode of semiconductor element 8 can be made shorter than the wiring distance between snubber capacitor 68 and the negative electrode of semiconductor element 6.

Similarly, the connection distance between snubber capacitor 71 and the positive electrode of semiconductor element 7 can be made shorter than the connection distance between snubber capacitor 71 and the positive electrode of semiconductor element 5. Furthermore, the connection distance between snubber capacitor 71 and the negative electrode of semiconductor element 6 can be made shorter than the connection distance between snubber capacitor 71 and the negative electrode of semiconductor element 8.

Strictly speaking, it is difficult to perfectly match nodes No, Np, Nq, Nr to which snubber capacitors 68, 71 are connected, with the positive electrodes or the negative electrodes of semiconductor elements 5 to 8. For this reason, strictly speaking, wiring inductance is also present, for example, between node No and the positive electrode of semiconductor element 5 but is not depicted in the drawing. Similarly, wiring distance is not depicted between node Nq and the positive electrode of semiconductor element 7, between node Np and the negative electrode of semiconductor element 6, and between node Nr and the negative electrode of semiconductor element 8. It is noted that the wiring inductances not depicted are produced similarly in each of FIG. 38 (comparative example) and FIG. 39 (the first embodiment).

In the configuration example in FIG. 39, a snubber circuit SNC1 includes snubber capacitor 68, and a snubber circuit SNC2 includes snubber capacitor 71. Snubber circuit SNC1 corresponds to an example of "first snubber circuit", and snubber circuit SNC2 corresponds to an example of "second snubber circuit". Furthermore, semiconductor element 5 corresponds to "first semiconductor element", semiconductor element 6 corresponds to "second semiconductor element", semiconductor element 7 corresponds to "third semiconductor element", and semiconductor element 8 corresponds to "fourth semiconductor element". Furthermore, semiconductor element 9 corresponds to "fifth semiconductor element", and semiconductor element 10 corresponds to "sixth semiconductor element". Semiconductor elements 9 and 10 constitute "first bidirectional switch".

As a result, in the first current path, the path formed via snubber capacitor 68 between the positive electrode of semiconductor element 5 and the negative electrode of semiconductor element 8 is shortened, thereby reducing the wiring inductance on the path. As a result, at the time of current change on the first current path associated with the switching operation, a voltage produced in the wiring inductance on the path due to high-frequency current passing through snubber capacitor 68 is reduced, thereby reducing the surge voltage produced in each of semiconductor element 5 and semiconductor element 8.

Similarly, in the first current path, the path formed via snubber capacitor 71 between the positive electrode of semiconductor element 7 and the negative electrode of semiconductor element 6 is also shortened, thereby reducing the wiring inductance on the path. As a result, at the time of current change on the second current path associated with the switching operation, a voltage produced in the wiring inductance on the path due to high-frequency current passing through snubber capacitor 71 is reduced, thereby reducing the surge voltage produced in each of semiconductor element 6 and semiconductor element 7.

Thus, in power conversion device 1A according to the first embodiment, snubber capacitors 68, 71 (snubber circuits SNC1, SNC2) are disposed as explained with reference to FIG. 39 so that the wiring inductance causing surge voltage can be intensively reduced. As a result, in the three-level inverter having a clamp circuit, the surge voltage associated with the switching operation of semiconductor elements can be reduced.

In FIG. 39, snubber circuits SNC1, SNC2 are configured only with snubber capacitors 68, 71. However, the configuration of the snubber circuit can be modified as illustrated in FIG. 40 or FIG. 41.

Figure 40:
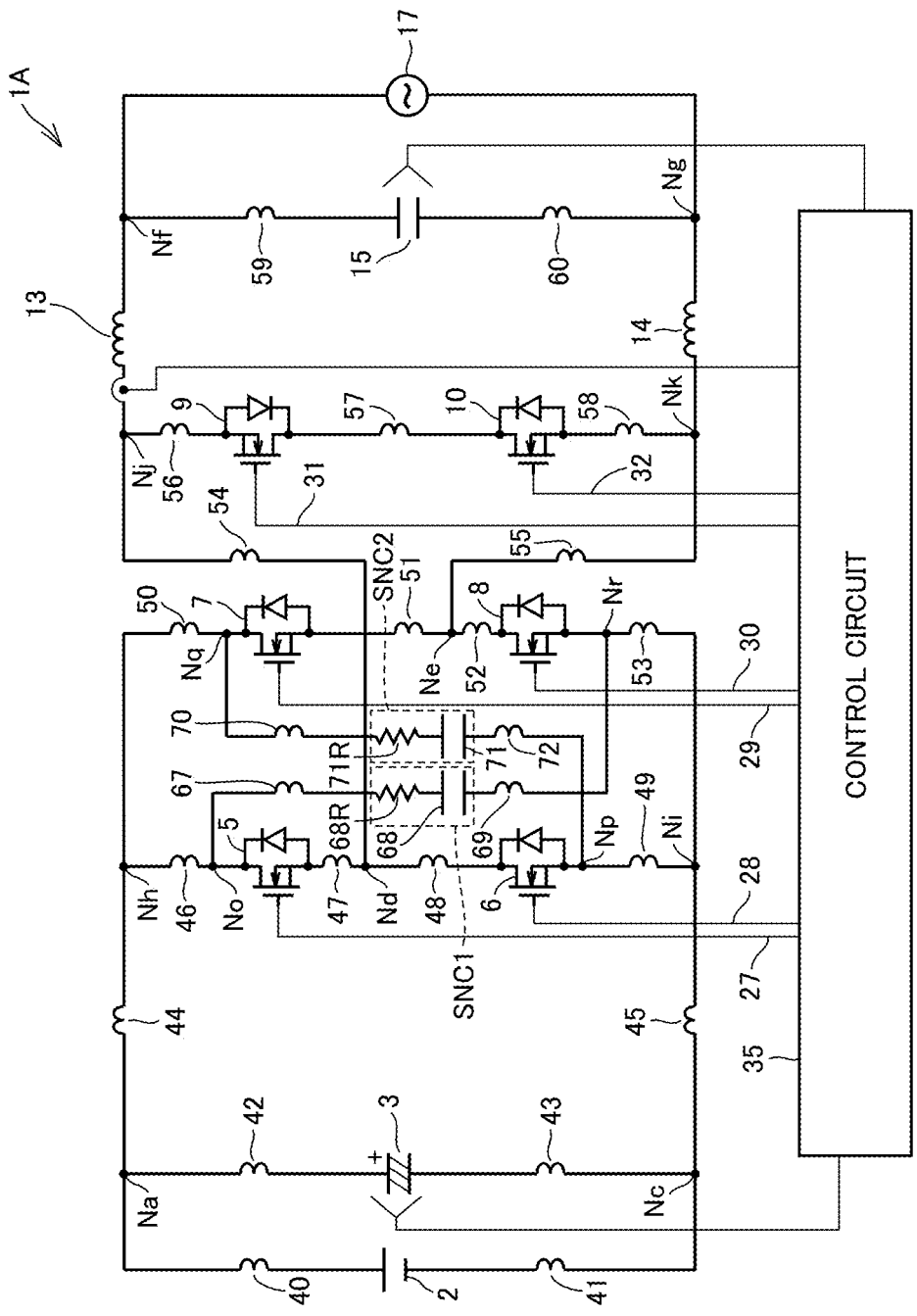
FIG. 40 is a circuit diagram depicting a first modification of the snubber circuits shown in FIG. 39.

In the configuration shown in FIG. 40, compared with FIG. 39, snubber circuit SNC1 further includes a resistance element 68R connected in series with snubber capacitor 68. Similarly, snubber circuit SNC2 further includes a resistance element 71R connected in series with snubber capacitor 71. The configuration of the other part of FIG. 40 is similar to that of FIG. 39 and a detailed description will not be repeated. In this way, each snubber circuit SNC1, SNC2 may be configured as an RC snubber circuit in which a snubber capacitor and a resistance element are connected in series.

Figure 41:
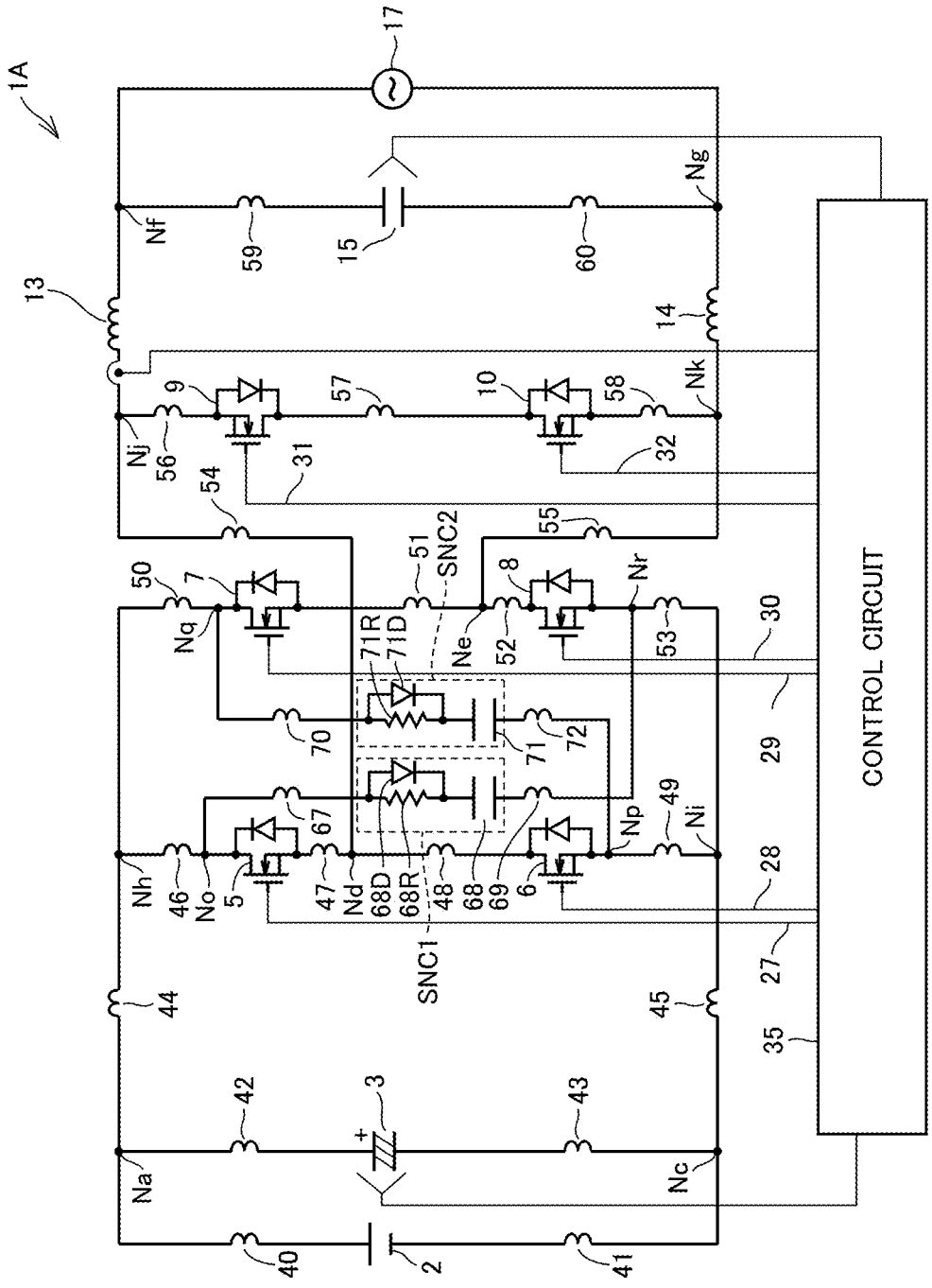
FIG. 41 is a circuit diagram depicting a second modification of the snubber circuits shown in FIG. 39.

In the configuration shown in FIG. 41, compared with FIG. 40, snubber circuit SNC1 further includes a diode 68D connected in parallel with resistance element 68R. Similarly, snubber circuit SNC2 further includes a diode 71D connected in parallel with resistance element 71R. The configuration of the other part of FIG. 41 is similar to that of FIG. 40 and a detailed description will not be repeated.

In this way, each snubber circuit SNC1, SNC2 may be configured as an RCD snubber circuit which includes a snubber capacitor and a resistance element connected in series and a diode connected in parallel with the resistance element.

Furthermore, in power conversion device 1A, the connection of semiconductor element 9 and semiconductor element 10 may be modified.

Figure 42:
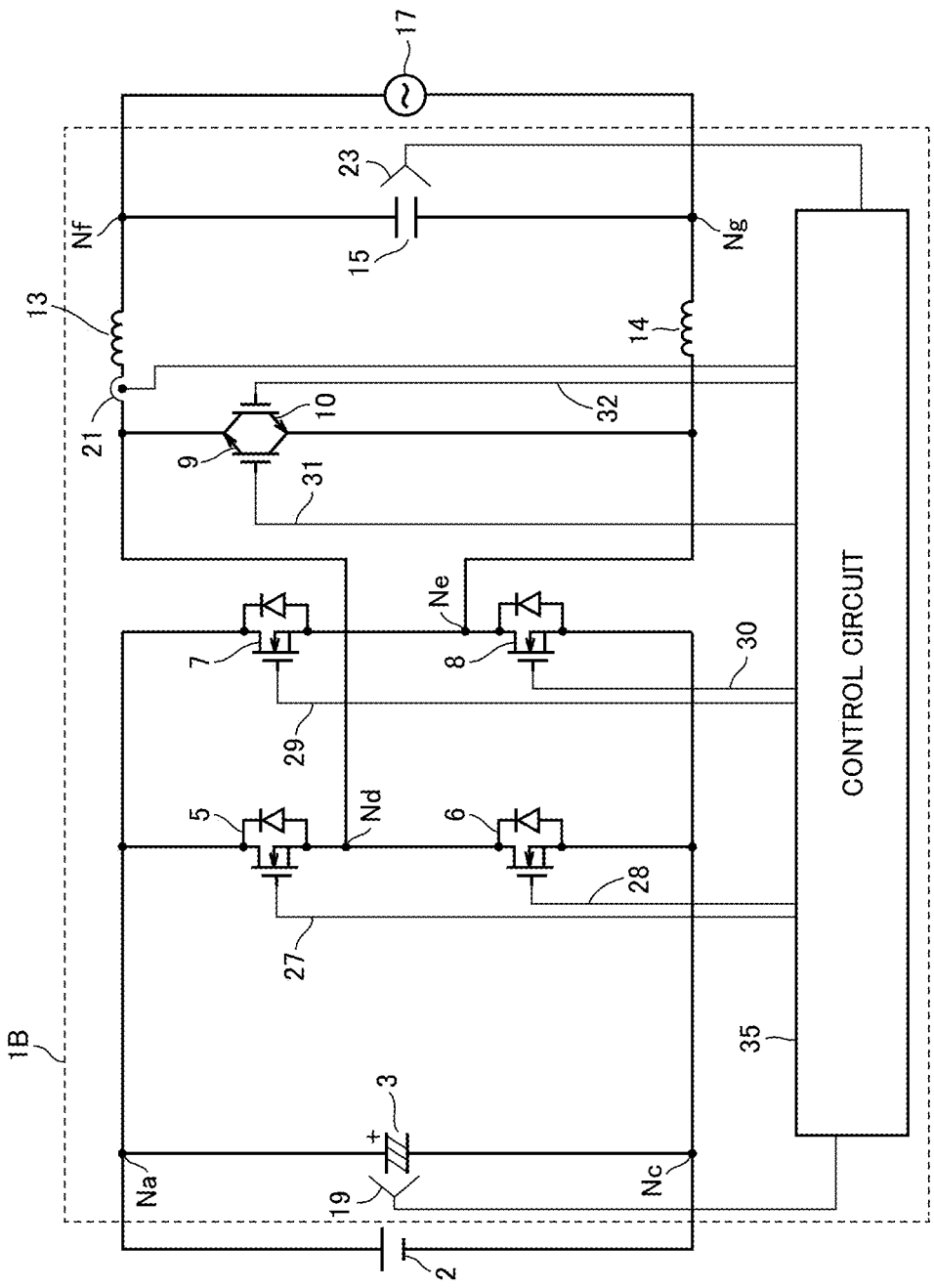
FIG. 42 is a circuit diagram depicting a modification of the power conversion device according to the first embodiment.

FIG. 42 is a circuit diagram depicting a modification of the power conversion device according to the first embodiment.

Referring to FIG. 42, a power conversion device 1B according to a modification of the first embodiment differs from power conversion device 1A shown in FIG. 1 in connection of semiconductor element 9 and semiconductor element 10 to node Nd and node Ne of the bridge circuit including semiconductor elements 5 to 8. In FIG. 1 (power conversion device 1A), semiconductor element 9 and semiconductor element 10 having antiparallel diodes are connected in series in opposite polarities between node Nd and node Nd to constitute a "first bidirectional switch".

By contrast, in power conversion device 1B, semiconductor element 9 and semiconductor element 10 with withstand voltage in opposite directions are connected in parallel between node Nd and node Nd to constitute a "first bidirectional switch".

In FIG. 41, a current path between node Nd and node Ne in the direction from node Nd to node Ne is formed in response to turning-on of semiconductor element 10, and a current path in the direction from node Ne to node Nd is formed in response to turning-on of semiconductor element 9. In other words, in power conversion device 1B, a "bidirectional switch" similar to that in power conversion device 1A can also be formed with semiconductor element 9 and semiconductor element 10.

As a result, power conversion device 1B can operate in accordance with the drive signals in FIG. 2 in the same manner as power conversion device 1A, and the snubber circuits can be arranged in the same manner as in FIG. 39 to FIG. 41 to reduce the surge voltage.

Power conversion device 1A in FIG. 1 may be modified such that the negative electrodes of semiconductor element 9 and semiconductor element 10 are connected to each other, the positive electrode of semiconductor element 9 is connected to node Nd, and the positive electrode of semiconductor element 10 is connected to node Nd. Even in this way, the "first bidirectional switch" can be configured with semiconductor element 9 and semiconductor element 10.

In this case, at the time of turning-on of semiconductor element 9, a current path in the direction from node Nd to node Ne is formed, and at the time of turning-on of semiconductor element 10, a current path in the direction from node Ne to node Nd is formed. Therefore, drive signals 204 and 205 in FIG. 2 need to be interchanged in order to implement the circuit operation of power conversion device 1A described in the first embodiment.

Second Embodiment

In a second embodiment, arrangement examples of the semiconductor elements and the snubber capacitors in implementation of power conversion devices 1A, 1B described in the first embodiment will be described.

Figure 43:
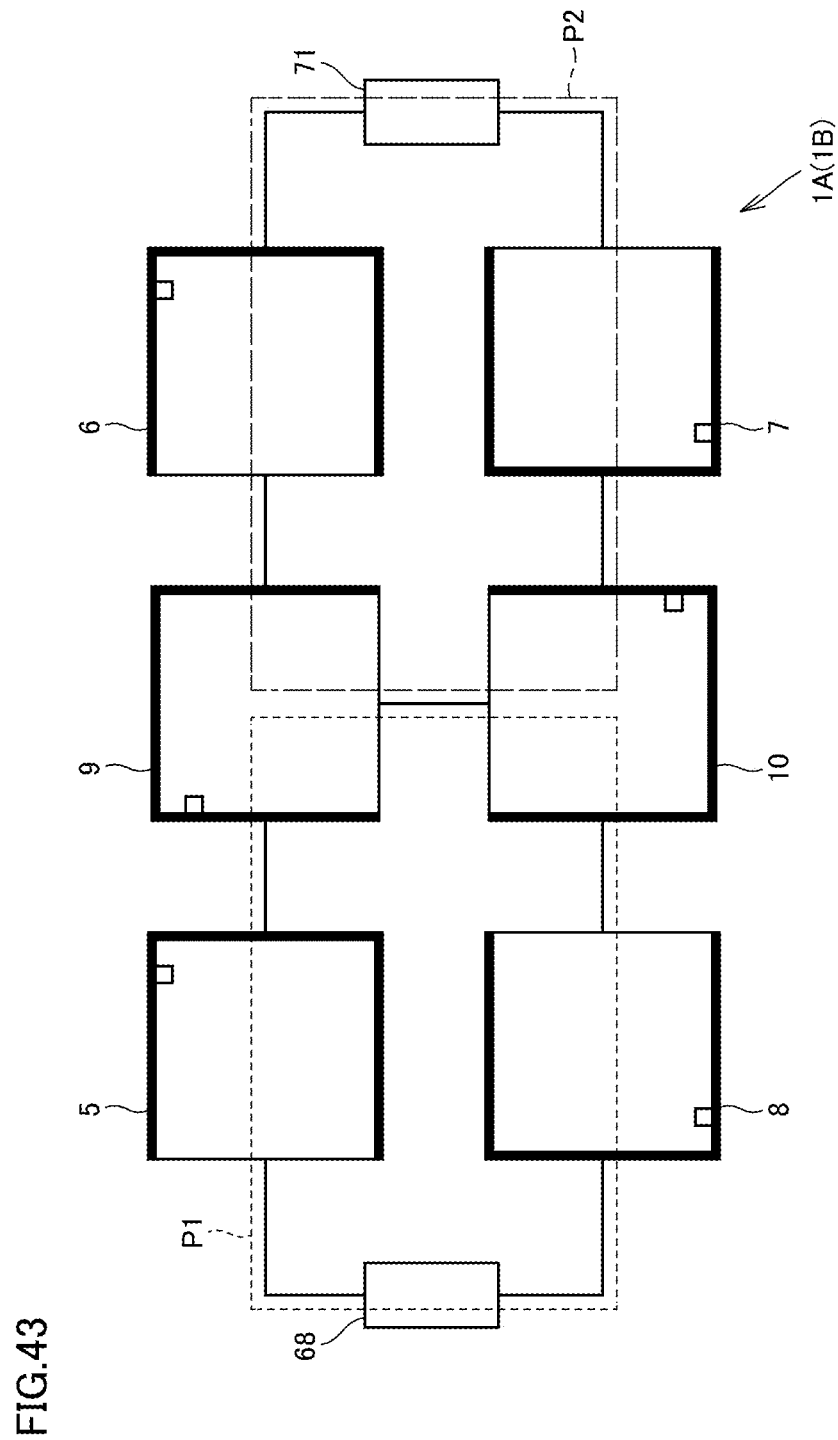
FIG. 43 is a first arrangement diagram of semiconductor elements and snubber capacitors in a power conversion device according to a second embodiment.

FIG. 43 is a first arrangement diagram of semiconductor elements and snubber capacitors in a power conversion device according to the second embodiment.

Referring to FIG. 43, each of semiconductor elements 5 to 10 which are elements of power conversion device 1A or 1B is configured with a discrete element, specifically, an element having a quadrangle-shaped surface-mounted discrete package. For example, a positive electrode is disposed on any one of four sides of the quadrangle and a negative electrode is disposed on each of the other three sides. The three sides having the negative electrode are electrically connected to each other. The control electrode can come out of any side of the quadrangle but here it is assumed that the control electrode is disposed on one of the three sides having negative electrode.

In the following, the side having the negative electrode among four sides of the quadrangle is depicted by a thick line and the side having the positive electrode is depicted by a thin line. Furthermore, the side having the control electrode is depicted with a square mark. In the following, to distinguish three sides having the negative electrode, the side facing the positive electrode is referred to as "negative electrode on the bottom side", the right side as viewed from the bottom side is referred to as "negative electrode on the right side", and the left side as viewed from the bottom side is referred to as "negative electrode on the left side". In the example in FIG. 43, in each semiconductor element, the control electrode is disposed at the negative electrode on the right side.

Although the negative electrode and the positive electrode take up the entire region of the sides in the drawing, the negative electrode and the positive electrode may be disposed at parts of the sides. As can be seen in common surface-mounted discrete elements, the ends of each side may be formed with an insulator.

In the first arrangement example in FIG. 43, the positive electrode of semiconductor element 5 is connected to one end of snubber capacitor 68, and the negative electrode on the bottom side of semiconductor element 5 is connected to the negative electrode on the right side of semiconductor element 9. The negative electrode on the left side of semiconductor element 9 is connected to the positive electrode of semiconductor element 6, and the negative electrode on the bottom side of semiconductor element 6 is connected to one end of snubber capacitor 71.

Furthermore, the positive electrode of semiconductor element 7 and the other end of snubber capacitor 71 are connected. The negative electrode on the bottom side of semiconductor element 7 is connected to the negative electrode on the right side of semiconductor element 10. The positive electrodes of semiconductor element 9 and semiconductor element 10 are connected to each other, and the negative electrode on the left side of semiconductor element 10 and the positive electrode of semiconductor element 8 are connected. The negative electrode on the bottom side of semiconductor element 8 and the other end of snubber capacitor 68 are connected.

In the first arrangement example, semiconductor element 5, semiconductor element 9, and semiconductor element 6 are aligned in line to form a row, and semiconductor element 8, semiconductor element 10, and semiconductor element 7 are aligned in line to form another row. These rows are arranged in parallel.

As described above, in power conversion device 1A, 1B, a path P1 indicated by a dotted line and a path P2 indicated by a dot-and-dash line in FIG. 43 are formed as wiring impedance that affects the surge voltage. Path P1 passes through snubber capacitor 68-semiconductor element 5-semiconductor element 9-semiconductor element 10-semiconductor element 8-snubber capacitor 68. Path P2 passes through snubber capacitor 71-semiconductor element 7-semiconductor element 10-semiconductor element 9-semiconductor element 6-snubber capacitor 71.

Semiconductor element 9 and semiconductor element 10 common to path P1 and path P2 are disposed in the middle of each row. The arrangement order of semiconductor elements in each row is set such that semiconductor element 5 and semiconductor element 8 are close to each other and semiconductor element 6 and semiconductor element 7 are close to each other between two rows.

As a result, semiconductor elements 5 to 10 can be arranged such that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7.

In the first arrangement example in FIG. 43, snubber capacitors 68 and 71 are disposed on the outside of the range in which six semiconductor elements 5 to 10 are arranged. As shown in FIG. 1, the positive electrodes of semiconductor element 5 and semiconductor element 7 need to be connected to snubber capacitors 68 and 71 and also connected to smoothing capacitor 3.

Therefore, in the first arrangement example, the positive electrodes of semiconductor element 5 and semiconductor element 7, each disposed only on one side, are arranged to face the outside of the arrangement group of semiconductor elements 5 to 10, thereby facilitating connection to other elements (smoothing capacitor 3, etc.) for forming power conversion device 1A. Furthermore, it is understood that the negative electrodes of semiconductor element 9 and semiconductor element 10 are also arranged to face the outside to facilitate connection to output filter reactors 13, 14 shown in FIG. 1.

Figure 44:
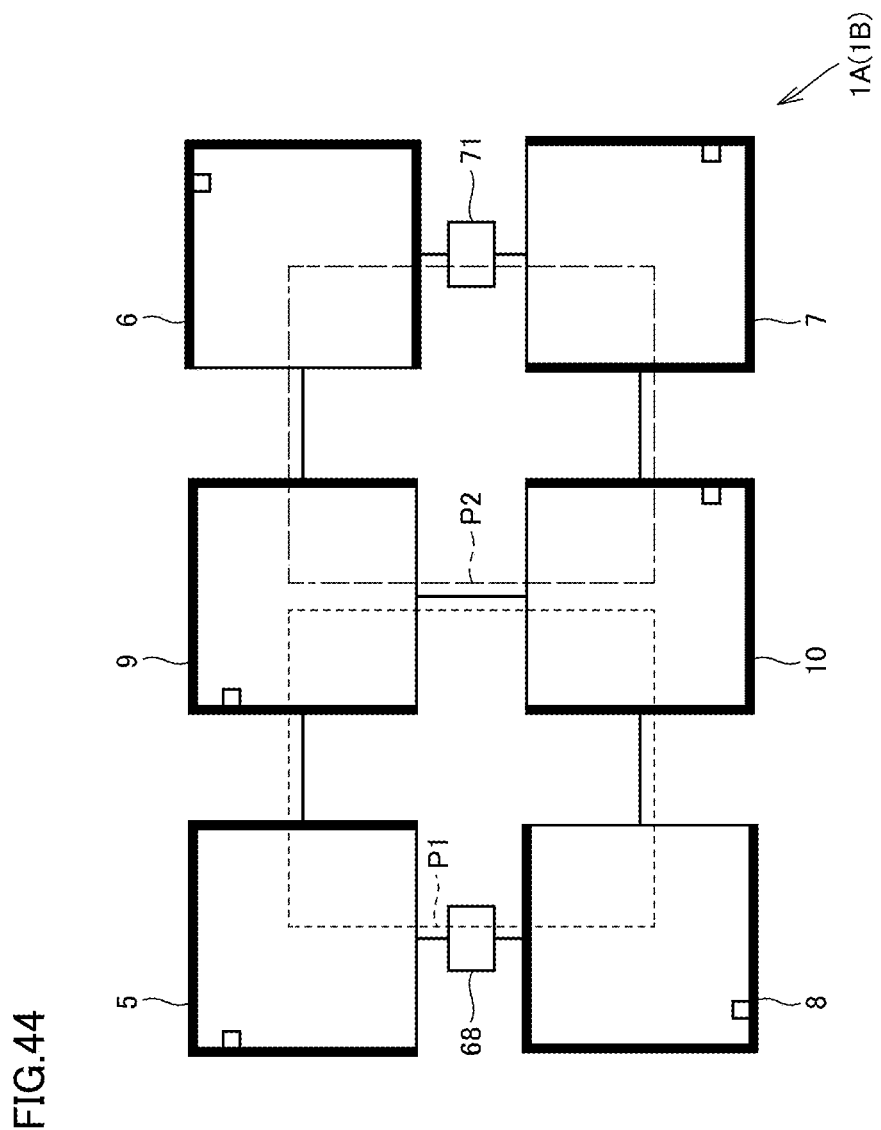
FIG. 44 is a second arrangement diagram of semiconductor elements and snubber capacitors in the power conversion device according to the second embodiment.

FIG. 44 shows a second arrangement example of semiconductor elements and snubber capacitors in the power conversion device according to the second embodiment.

Referring to FIG. 44, the second arrangement example differs from the first arrangement example (FIG. 43) in position of the positive electrodes and the negative electrodes of semiconductor element 5 and semiconductor element 7. Specifically, semiconductor element 5 and semiconductor element 7 are each rotated counterclockwise by 90 degrees from the arrangement in FIG. 43. Thus, the positive electrode of semiconductor element 5 is opposed to the negative electrode (the negative electrode on the left side) of semiconductor element 8, and the positive electrode of semiconductor element 7 is opposed to the negative electrode (the negative electrode on the left side) of semiconductor element 6.

As a result, the connection distance from snubber capacitor 68 to each of the positive electrode of semiconductor element 5 and the negative electrode of semiconductor element 8 can be made shorter than that of the arrangement example in FIG. 43. Similarly, the connection distance from snubber capacitor 71 to each of the positive electrode of semiconductor element 7 and the negative electrode of semiconductor element 6 can be made shorter than that of the arrangement example in FIG. 43.

Thus, wiring inductances 67, 69 and wiring inductances 70, 72 shown in FIG. 39 are reduced. Furthermore, the path length of path P1 and path P2 also can be reduced, compared with FIG. 43. As a result, the surge voltage can be further reduced.

On the other hand, in the second arrangement example, unlike FIG. 43, the positive electrodes of semiconductor element 5 and semiconductor element 7 do not face the outside of the arrangement group of semiconductor elements 5 to 10. Therefore, it is necessary to ensure the insulation distance when wiring for connection to other elements such as smoothing capacitor 3 is drawn from the positive electrodes of semiconductor element 5 and semiconductor element 7.

Figure 45:
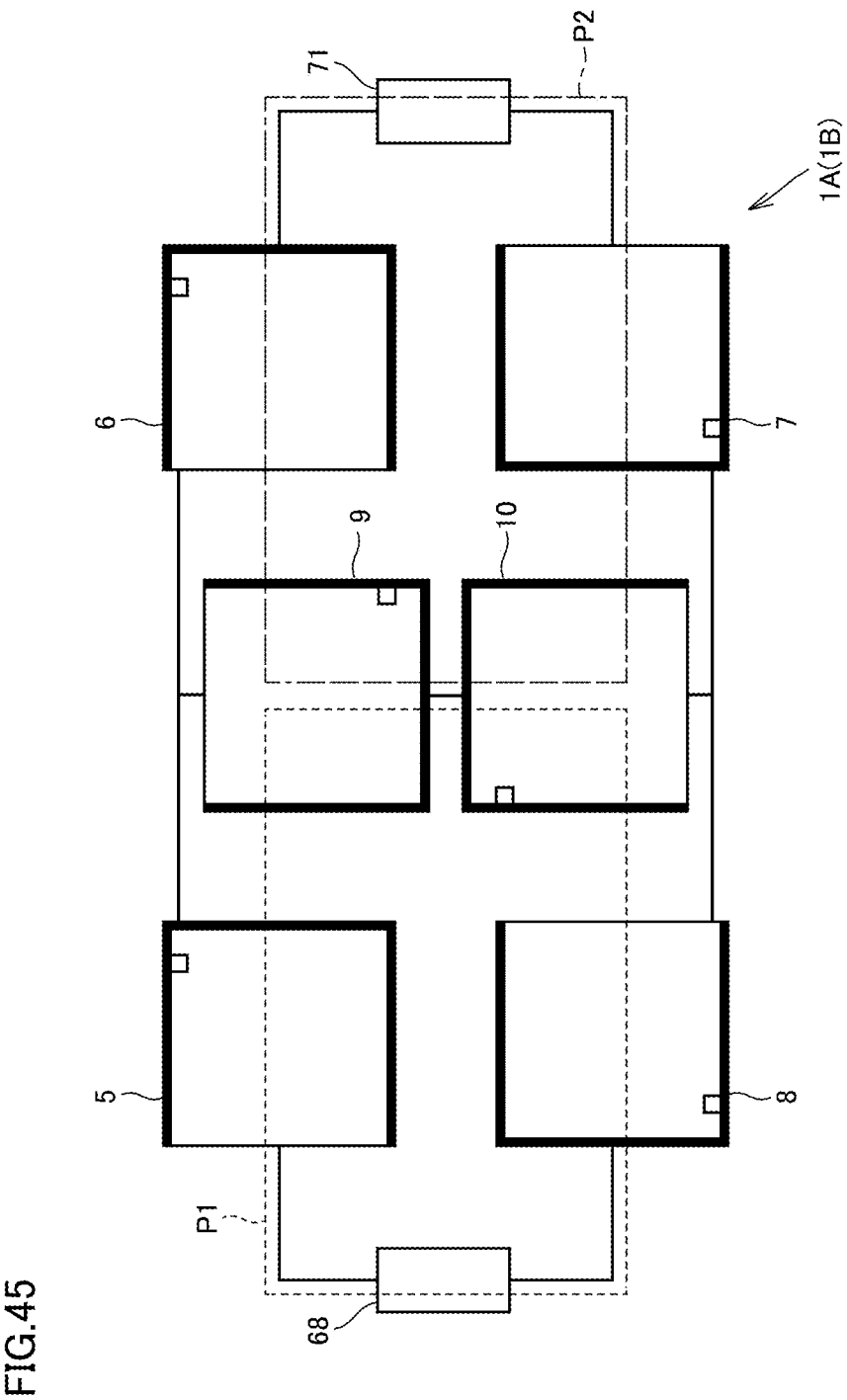
FIG. 45 is a third arrangement diagram of semiconductor elements and snubber capacitors in the power conversion device according to the second embodiment.

FIG. 45 is a third arrangement diagram of semiconductor elements and snubber capacitors in the power conversion device according to the second embodiment. FIG. 45 shows the arrangement example described at the end of the first embodiment in which the negative electrodes of semiconductor element 9 and semiconductor element 10 are connected to each other, the positive electrode of semiconductor element 9 is connected to node Nd, and the positive electrode of semiconductor element 10 is connected to node Ne.

Referring to FIG. 45, in the third arrangement example, semiconductor element 9 and semiconductor element 10 positioned at the center in their respective rows are disposed such that the negative electrodes on the bottom side are opposed to each other. In FIG. 45, the negative electrode on the bottom side of semiconductor element 5 and the positive electrode of semiconductor element 9 are connected, and the positive electrode of semiconductor element 9 and the positive electrode of semiconductor element 6 are connected. Furthermore, the negative electrode on the bottom side of semiconductor element 7 and the positive electrode of semiconductor element 10 are connected, and the negative electrode on the bottom side of semiconductor element 10 and the negative electrode on the bottom side of semiconductor element 9 are connected. Furthermore, the positive electrode of semiconductor element 10 and the positive electrode of semiconductor element 8 are connected.

The power conversion device according to the first embodiment can be implemented even by disposing semiconductor elements 5 to 10 in accordance with the third arrangement example. The arrangement of semiconductor element 9 and semiconductor element 10 in the third arrangement example in FIG. 45 is also applicable to the second arrangement example (FIG. 44). In this case, the positive electrode of semiconductor element 9 is connected to the negative electrode on the left side of semiconductor element 5 and the positive electrode of semiconductor element 6, and the positive electrode of semiconductor element 10 is connected to the negative electrode on the left side of semiconductor element 7 and the positive electrode of semiconductor element 8. Furthermore, semiconductor element 9 and semiconductor element 10 can be connected in parallel in opposite directions as semiconductor elements having withstand voltage in opposite directions, as described with reference to FIG. 42.

In the arrangement examples in FIG. 43 to FIG. 45, semiconductor element 5, semiconductor element 9, and semiconductor element 6 are aligned in line, and semiconductor element 8, semiconductor element 10, and semiconductor element 7 are aligned in line. However, a plurality of semiconductor elements need not be aligned in line precisely linearly in each row. Similarly, the rows are not necessarily arranged precisely in parallel. Displacement in arrangement is acceptable to an extent that satisfies the foregoing conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7.

In the second embodiment, the substrate on which semiconductor elements 5 to 10 included in power conversion device 1A (1B) according to the first embodiment is not necessarily of a particular kind. For example, a multilayer printed wiring board, a monolayer printed wiring board, or a metal substrate having one side formed of metal can be employed as the substrate. In general, a multilayer printed wiring board enables pattern wiring in each layer and therefore increases the flexibility of wiring. As a result, a wiring pattern with less wiring inductance can be easily implemented. A metal substrate is advantageous in heat dissipation from semiconductor elements and facilitates reduction in element temperature.

FIG. 43 to FIG. 45 illustrate the arrangement examples in which quadrangle-shaped surface-mounted discrete elements are employed as semiconductor elements 5 to 10. Next, an arrangement example with a discrete element in a different manner will be described.

Figure 46:
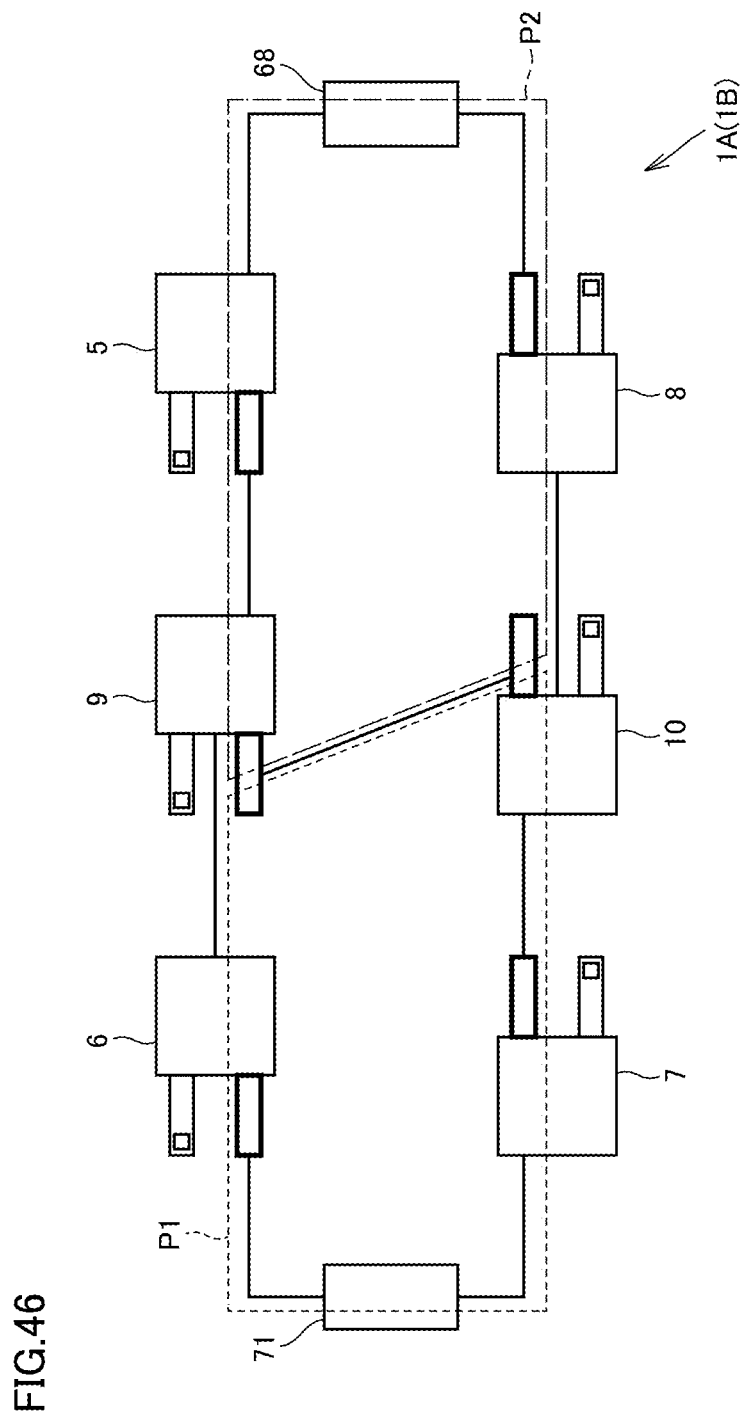
FIG. 46 is a fourth arrangement diagram of semiconductor elements and snubber capacitors in the power conversion device according to the second embodiment.

FIG. 46 is a fourth arrangement diagram of semiconductor elements and snubber capacitors in the power conversion device according to the second embodiment.

In FIG. 46, semiconductor elements 5 to 10 each are formed with an element having a discrete package, which has a positive electrode on the back face and has a negative electrode and a control electrode connected to the outside through leads. For example, in FIG. 46, semiconductor elements 5 to 10 are formed with TO-263 package discrete elements.

In FIG. 46, in the package configuration describe above, the lead of the negative electrode is depicted by a thick line, and the lead of the control electrode is depicted with a square mark.

In the fourth arrangement example shown in FIG. 46, semiconductor element 5, semiconductor element 9, and semiconductor element 6 are aligned in line to form a row, and semiconductor element 8, semiconductor element 10, and semiconductor element 7 are aligned in line to form another row. These rows are arranged in parallel, and the positive electrode (lead) of semiconductor element 9 and the positive electrode (lead) of semiconductor element 10 are connected.

Furthermore, snubber capacitor 68 is connected between the positive electrode (back face) of semiconductor element 5 and the negative electrode (lead) of semiconductor element 8. Similarly, snubber capacitor 71 is connected between the positive electrode (back face) of semiconductor element 7 and the negative electrode (lead) of semiconductor element 6. Thus, path P1 indicated by a dotted line and path P2 indicated by a dot-and-dash line, including wiring impedance that affects the surge voltage, are formed in the same manner as in FIG. 43.

In the arrangement example in FIG. 46, it is understood that semiconductor elements 5 to 10 are placed in the same manner as in FIG. 43 so as to satisfy the conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7.

In particular, in the example in FIG. 46, in semiconductor elements 5 to 10, the control electrodes are disposed to be aligned in a direction positioned on the outside of the region in which semiconductor elements 5 to 10 are arranged. This facilitates placement of signal lines for transmitting drive signals 27 to 32 (FIG. 1) to respective control electrodes.

Alternatively, when placement of signal lines on a printed wiring board is not necessary because connection of a signal line to each control electrode is provided by a connector or the like, the advantage of positioning the control electrodes on the outside is reduced. In such a case, in order to facilitate connection between the positive electrodes of semiconductor element 9 and semiconductor element 10, semiconductor element 9 and semiconductor element 10 may be rotated by 90 degrees in the arrangement example in FIG. 46 such that the positive electrodes (leads) or the negative electrodes (back faces) are opposed to each other.

Figure 47:
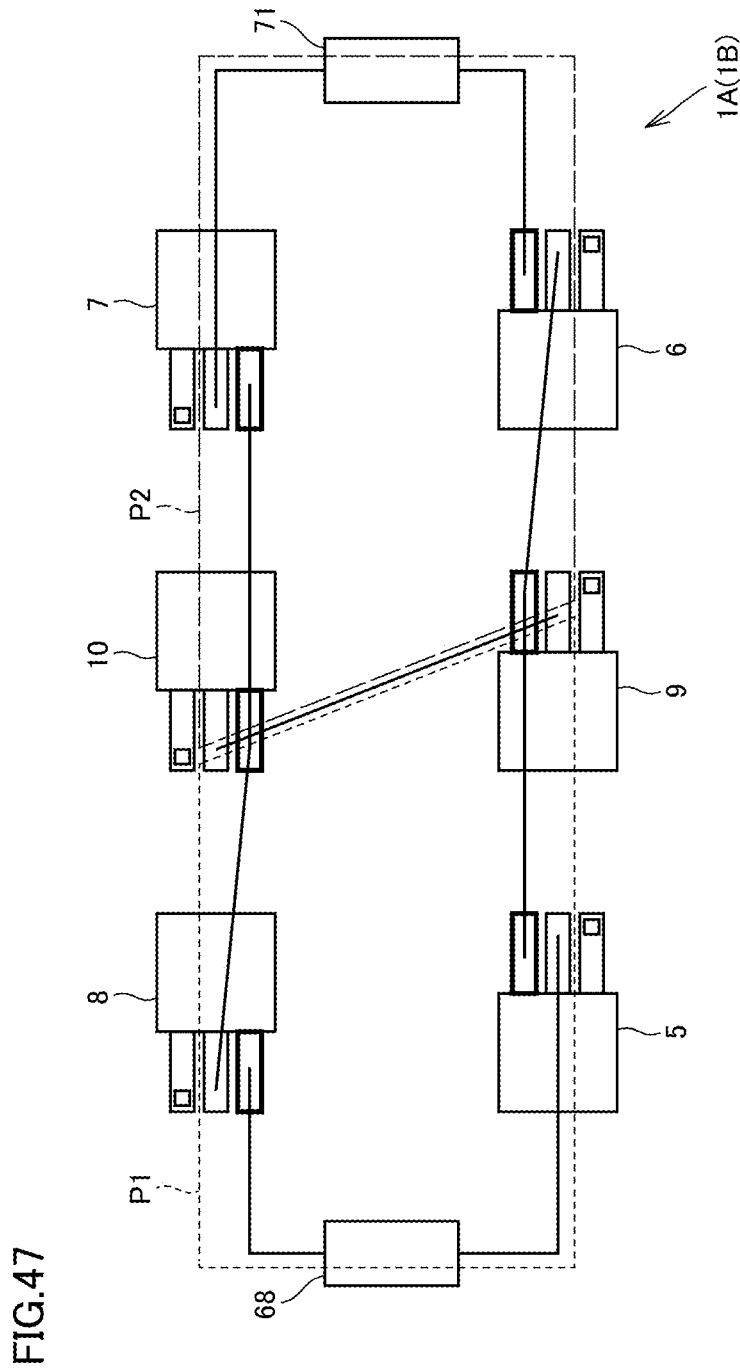
FIG. 47 is a fifth arrangement diagram of semiconductor elements and snubber capacitors in the power conversion device according to the second embodiment.

FIG. 47 is a fifth arrangement diagram of semiconductor elements and snubber capacitors in the power conversion device according to the second embodiment.

In FIG. 47, semiconductor elements 5 to 10 are each formed with an element having a discrete package, in which a positive electrode, a negative electrode, and a control electrode are individually connected to the outside through respective leads. For example, in FIG. 47, semiconductor elements 5 to 10 are formed with TO-247 package discrete elements.

In FIG. 47, the lead of the negative electrode is also depicted by a thick line, and the lead of the control electrode is also depicted with a square mark. The remaining lead is the positive electrode.

In the fifth arrangement example shown in FIG. 47, semiconductor element 5, semiconductor element 9, and semiconductor element 6 are aligned in line to form a row, and semiconductor element 8, semiconductor element 10, and semiconductor element 7 are aligned in line to form another row. The two rows are placed in parallel. Furthermore, snubber capacitor 68 is connected between the positive electrode lead of semiconductor element 5 and the negative electrode lead of semiconductor element 8, and snubber capacitor 71 is connected between the positive electrode lead of semiconductor element 7 and the negative electrode lead of semiconductor element 6. In FIG. 47, path P1 indicated by a dotted line and path P2 indicated by a dot-and-dash line, including wiring impedance that affects the surge voltage, are formed.

In the arrangement example in FIG. 47, it is understood that semiconductor elements 5 to 10 are placed in the same manner as in FIG. 43 and the like so as to satisfy the conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7. Thus, the wiring length of path P1 and path P2 is shortened, thereby reducing the surge voltage produced by wiring inductance.

Even in the arrangement example in FIG. 47, semiconductor elements 5 to 10 are arranged to be aligned such that the leads of the control electrodes are positioned in alignment on the outside, thereby facilitating placement of signal lines for transmitting drive signals 27 to 32 (FIG. 1) to respective control electrodes.

In FIG. 46, semiconductor element 9 and semiconductor element 10 may be rotated by 90 degrees such that the positive electrodes (leads) or the negative electrodes (leads) are opposed to each other, in the same manner as described with reference to FIG. 46. Some types of TO-257 packages have two control electrodes provided in parallel and thus have four leads. Even in such a case, the positive electrode and the negative electrode can be arranged as described above to achieve the effect of reducing surge voltage similarly.

Third Embodiment

The arrangement of snubber circuits described in the first embodiment is applicable to a neutral point clamp-type three-level inverter.

Figure 48:
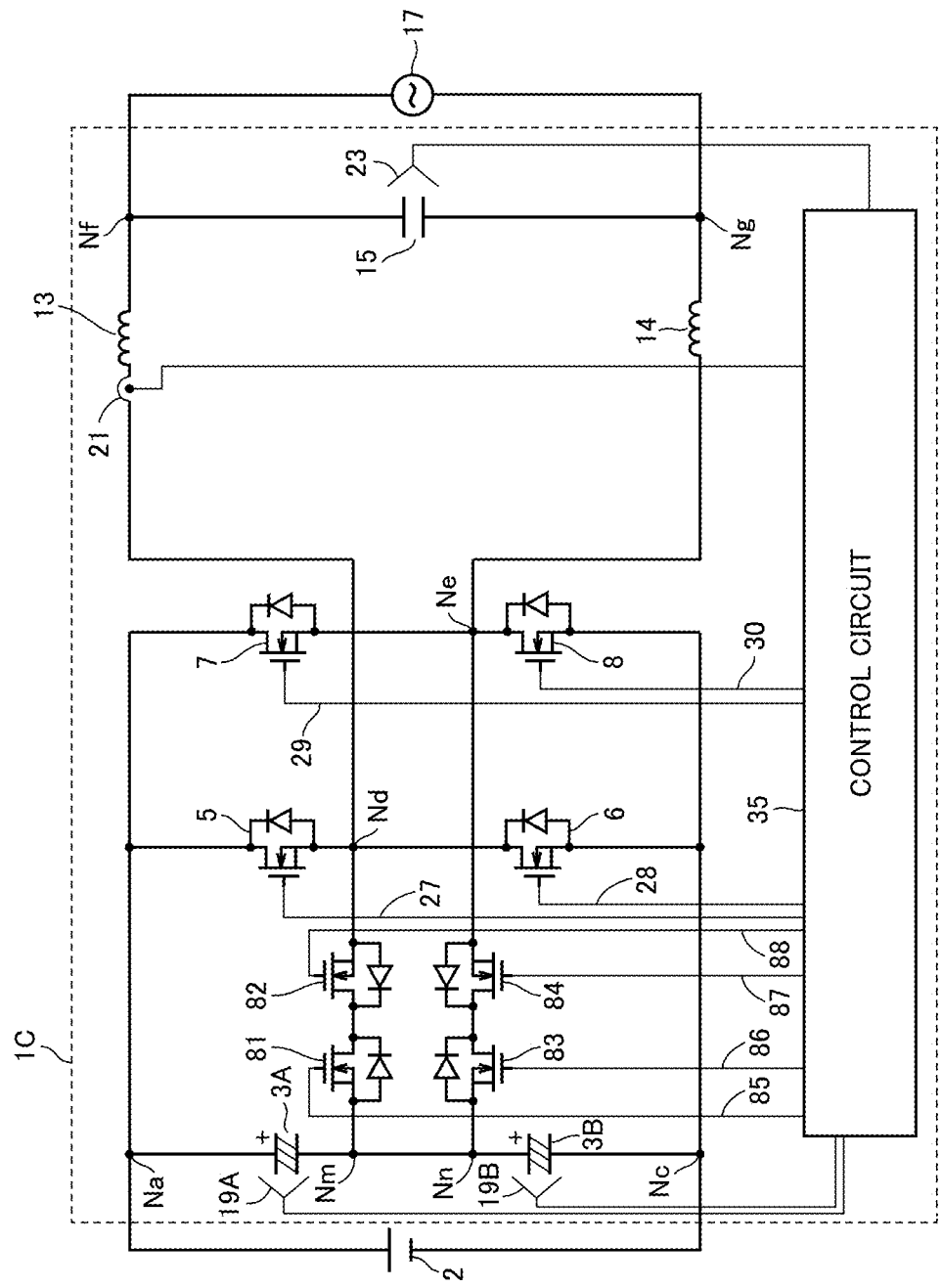
FIG. 48 is a circuit diagram depicting a configuration of a power conversion device according to a third embodiment.

FIG. 48 is a circuit diagram depicting a configuration of a power conversion device 1C according to a third embodiment. Power conversion device 1C has a circuit configuration of a neutral point clamp-type three-level inverter.

Referring to FIG. 48, power conversion device 1C according to the third embodiment differs in that it includes smoothing capacitors 3A and 3B connected in series instead of smoothing capacitor 3 (FIG. 1) and includes semiconductor elements 81 to 84 instead of semiconductor element 9 and semiconductor element 10. Semiconductor elements 81 to 84 are configured with switching elements capable of on/off control, such as IGBTs or MOSFETs, in the same manner as semiconductor elements 5 to 10, and each have a positive electrode, a negative electrode, and a control electrode. Semiconductor elements 81 to 84 also contain or are externally connected to an antiparallel diode for forming a current path in a direction from the negative electrode to the positive electrode.

In power conversion device 1C, the bridge circuit configured with semiconductor elements 5 to 8 is similar to that of power conversion device 1A, but node Nd (the midpoint of the first leg) and node Ne (the midpoint of the second leg) of the bridge circuit are connected to output filter reactor 13 and output filter reactor, not through semiconductor elements.

On the input side of the bridge circuit, smoothing capacitors 3A and 3B are connected in series between node Na and node Nc connected to DC power supply 2.

One end of smoothing capacitor 3A is connected to node Na, and the other end of smoothing capacitor 3A is connected to one end of smoothing capacitor 3B at nodes Nm and Nn. The other end of smoothing capacitor 3B is connected to node Nc. Node Nm and node Nm have the same potential and are electrically the same node but depicted separately for convenience of explanation because they are connected to different destinations as will be described later. Voltage detectors 19A and 19B are provided for smoothing capacitors 3A and 3B.

A bidirectional switch including semiconductor element 81 and semiconductor element 82 is connected between node Nm and node Nd of the bridge circuit. Similarly, a bidirectional switch including semiconductor element 83 and semiconductor element 84 is connected between node Nn and node Ne of the bridge circuit.

In FIG. 48, semiconductor element 81 and semiconductor element 82 are connected in series such that their positive electrodes are connected to each other to form a bidirectional switch. Similarly, semiconductor element 83 and semiconductor element 84 are connected in series such that their positive electrodes are connected to each other to form a bidirectional switch.

The voltage detection value of smoothing capacitor 3A by voltage detector 19A and the voltage detection value of smoothing capacitor 3B by voltage detector 19B are input to control circuit 35. Control circuit 35 further outputs drive signals 85 to 88 for driving semiconductor elements 81 to 84, respectively, in addition to drive signals 27 to 30. Drive signals 85 to 88 are respectively transmitted to the control electrodes of semiconductor elements 81 to 84. As a result, semiconductor elements 81 to 84 are on/off-controlled in response to drive signals 85 to 88, respectively, from control circuit 35.

Figure 49:
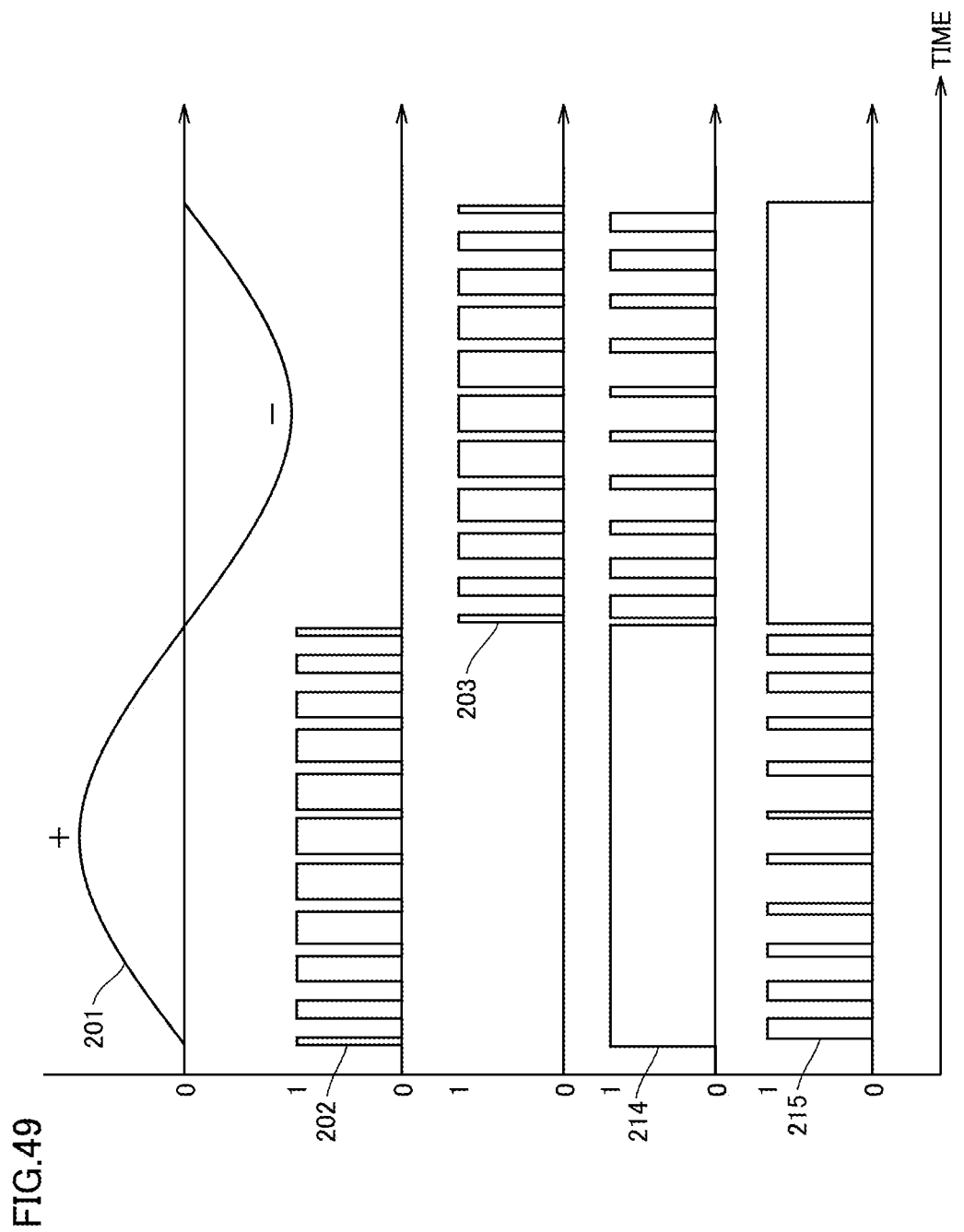
FIG. 49 is a waveform diagram depicting on/off control of semiconductor elements in the power conversion device according to the third embodiment.

FIG. 49 is a waveform diagram depicting on/off control of semiconductor elements in power conversion device 1C shown in FIG. 48.

Referring to FIG. 49, with reference to AC output command value 201 similar to that of FIG. 1, drive signal 202 for semiconductor element 5 and semiconductor element 8 and drive signal 203 for semiconductor element 6 and semiconductor element 7 are generated, in the same manner as in FIG. 1. Furthermore, a drive signal 214 for semiconductor element 82 and semiconductor element 83 and a drive signal 215 for semiconductor element 81 and semiconductor element 84 are generated.

Drive signal 214 in FIG. 49 is the same as drive signal 204 in FIG. 2, and drive signal 215 in FIG. 49 is the same as drive signal 205 in FIG. 2. Drive signal 86 and drive signal 87 for semiconductor elements 82 and 83 are generated with a deadtime in accordance with drive signal 214. Similarly, drive signal 86 and drive signal 87 for semiconductor elements 81 and 84 are generated with a deadtime in accordance with drive signal 215.

Therefore, in power conversion device 1C, semiconductor elements 5 to 8 are on/off-controlled in the same manner as power conversion device 1A (the first embodiment). Furthermore, semiconductor element 82 and semiconductor element 83 are on/off-controlled in the same manner as semiconductor element 9 in power conversion device 1A (the first embodiment), and semiconductor element 81 and semiconductor element 84 are on/off-controlled in the same manner as semiconductor element 10 in power conversion device 1A (the first embodiment).

Therefore, in a period in which AC output command value 201 is positive, semiconductor element 6 and semiconductor element 7 are always turned off, and semiconductor elements 82 and 83 are always turned on. On the other hand, semiconductor element 5 and semiconductor element 8 as well as semiconductor elements 81 and 84 are switching-controlled. Specifically, semiconductor element 5 and semiconductor element 8 are turned on/off in common, and semiconductor element 81 and semiconductor element 84 are turned on/off complementarily to semiconductor element 5 and semiconductor element 8.

On the other hand, in a period in which AC output command value 201 is negative, semiconductor element 5 and semiconductor element 8 are always turned off, and semiconductor element 81 and semiconductor element 84 are always turned on. On the other hand, semiconductor element 6 and semiconductor element 7 as well as semiconductor element 82 and semiconductor element 83 are switching-controlled. Specifically, semiconductor element 6 and semiconductor element 7 are turned on/off in common, and semiconductor element 82 and semiconductor element 83 are turned on/off complementarily to semiconductor element 6 and semiconductor element 7.

In power conversion device 1A, one bidirectional switch including a series connection of two semiconductor elements is connected between node Nd and Ne, whereas in power conversion device 1C, two bidirectional switches including four semiconductor elements are connected in series. Power conversion device 1C differs in that the potential at nodes Nm, Nn, that is, the midpoint of two bidirectional switches is uniquely determined.

Figure 50:
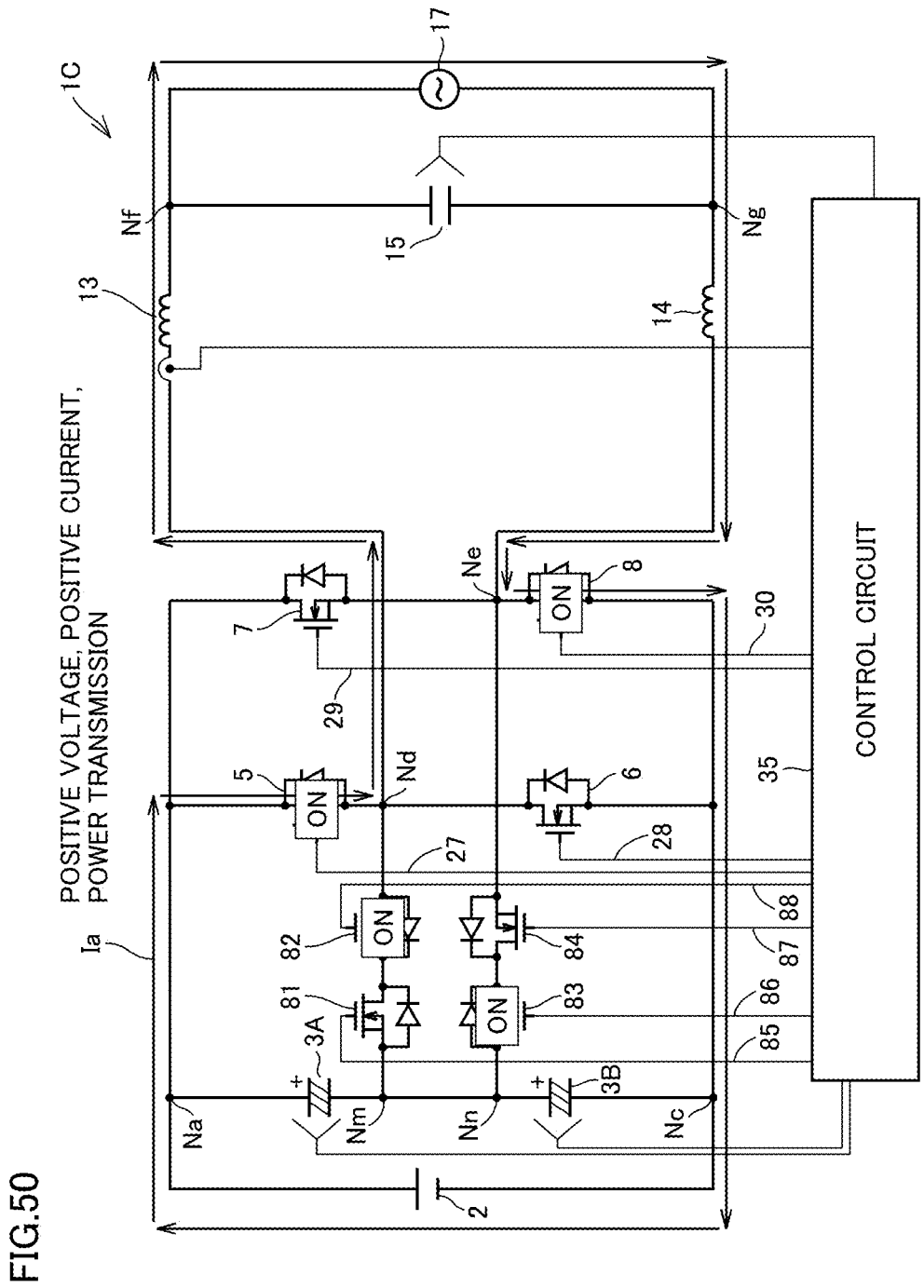
FIG. 50 is a circuit diagram depicting a current path in a power transmission period when AC voltage and AC current are positive (in a first operation pattern) in the power conversion device according to the third embodiment.
Figure 51:
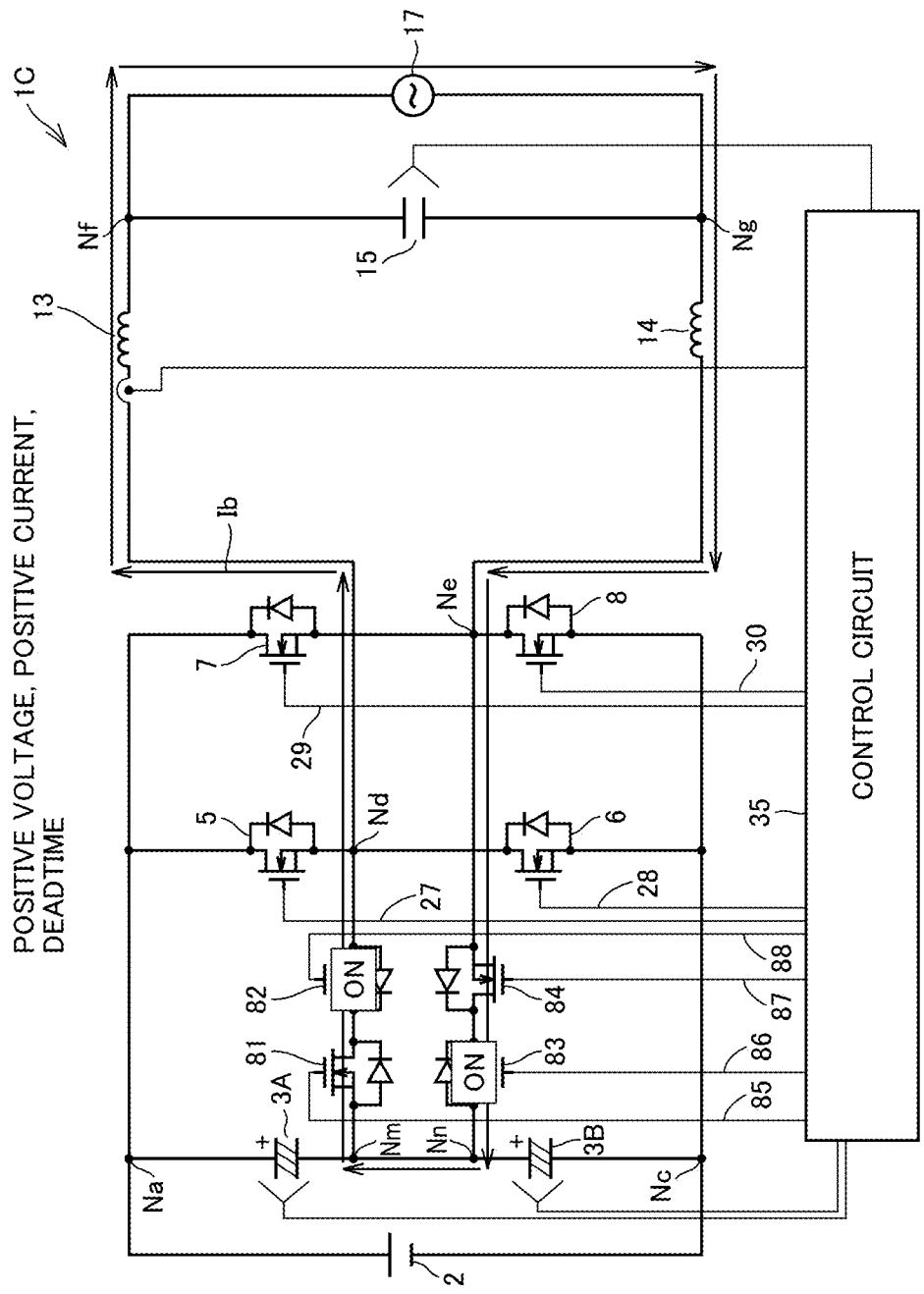
FIG. 51 is a second circuit diagram depicting a current path in a deadtime period in the first operation pattern of the power conversion device according to the third embodiment.
Figure 52:
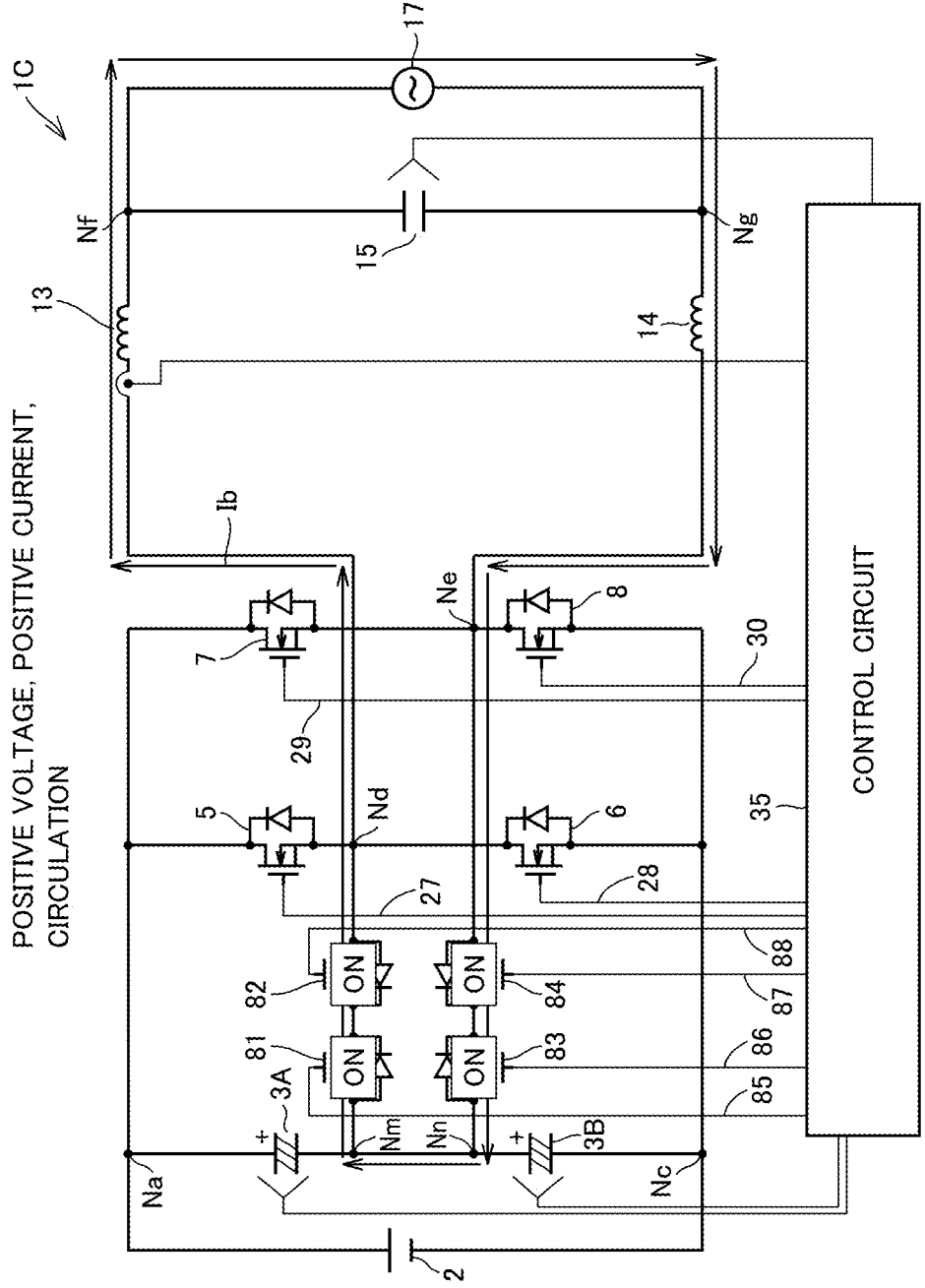
FIG. 52 is a third circuit diagram depicting a current path in a circulation period in the first operation pattern of the power conversion device according to the third embodiment.

In power conversion device 1C according to the third embodiment, there are four operation patterns depending on combinations of positive/negative AC voltages and AC currents, in the same manner as power conversion device 1A. Referring to FIG. 50 to FIG. 52, a current path in power conversion device 1C in the first operation pattern in which AC voltage is positive and AC current is positive will be described.

As described above, in a period in which AC voltage is positive, semiconductor elements 82 and 83 is fixed to ON, and semiconductor element 6 and semiconductor element 7 are fixed to OFF. On the other hand, semiconductor element 5 and semiconductor element 8 as well as semiconductor elements 81 and 84 are switching-controlled.

FIG. 50 shows a current path in the ON period of semiconductor element 5 and semiconductor element 8 (power transmission period) in the first operation pattern.

Referring to FIG. 50, in the ON period of semiconductor element 5 and semiconductor element 8, semiconductor element 82 and semiconductor element 83 are also turned on, and current Ia flows through a path of the positive side of DC power supply 2-semiconductor element 5-output filter reactor 13-AC power supply 17-output filter reactor 14-semiconductor element 8-the negative side of DC power supply 2.

As described with reference to FIG. 5, in this case, in addition to the current passing through DC power supply 2 as shown in FIG. 50, there is current passing through smoothing capacitor 3A and smoothing capacitor 3B. Similarly, on the secondary side of the bridge circuit, as shown in FIG. 50, in addition to the current passing through AC power supply 17, there is current passing through output filter capacitor 15.

FIG. 51 shows a current path in a deadtime period in which semiconductor element 5 and semiconductor element 8 switch from ON to OFF.

Referring to FIG. 51, in the deadtime period, current Ib flows through a path of node Nd-output filter reactor 13-AC power supply 17-output filter reactor 14-semiconductor element 84 (antiparallel diode)-semiconductor element 83-node Nn, Nm-semiconductor element 81 (antiparallel diode)-semiconductor element 82-node Nd.

FIG. 52 shows a current path (circulation period) when semiconductor elements 81 and 84 switch from OFF to ON after the deadtime period (FIG. 51).

Referring to FIG. 52, in the circulation period, current Ib similar to that of FIG. 51 flows through a path of node Nd-output filter reactor 13-AC power supply 17-output filter reactor 14-semiconductor element 84-semiconductor element 83-node Nn, Nm-semiconductor element 81-semiconductor element 82-node Nd. In the circulation period and the deadtime period, the current path is the same but semiconductor element 81 and semiconductor element 84 turn on to perform synchronous rectification, thereby reducing power loss.

When semiconductor element 81 and semiconductor element 84 in the state in FIG. 52 (circulation period) switch from ON to OFF, a current path in a deadtime period shown in FIG. 51 is formed again. Thereafter, when semiconductor element 5 and semiconductor element 8 switch from OFF to ON, current Ia flows through the current path shown in FIG. 50 (transmission period) again.

As can be understood from comparison between FIG. 3 to FIG. 5 and FIGS. 50 to 52, the current path formed in power conversion device 1C is the same as the current path formed in power conversion device 1A except that semiconductor elements 9 and 10 are replaced by semiconductor elements 81 to 84.

Although not described in detail, in the other second operation pattern, third operation pattern, and fourth operation pattern, the difference between the current path in power conversion device 1C and the current path in power conversion device 1A is the same as in the first operation pattern.

Therefore, in power conversion device 1C according to the third embodiment, the semiconductor elements in which surge voltage is produced and the current path causing surge voltage in each operation pattern can be summed up in FIG. 53, in the same manner as FIG. 33.

FIG. 53 is a table showing a list of semiconductor elements in which surge voltage is produced and a current path causing surge voltage in each operation pattern of power conversion device 1C according to the third embodiment.

Referring to FIG. 53, in each of the first to fourth operation patterns, a surge voltage similar to that in FIG. 33 (power conversion device 1A) is produced in semiconductor elements 5 to 8. Furthermore, in power conversion device 1C according to the third embodiment, a surge voltage similar to that in semiconductor element 9 in FIG. 33 is produced in semiconductor element 82 and semiconductor element 83 that are on/off-controlled in accordance with a drive signal (FIG. 49) similar to that of semiconductor element 9. For example, in the operation pattern 2, the recovery surge voltage is produced in semiconductor elements 82 and 83 in the same manner as in semiconductor element 9 in FIG. 33. Furthermore, in the operation pattern 4, the off surge voltage is produced in semiconductor elements 82 and 83.

Similarly, in power conversion device 1C, a surge voltage similar to that in semiconductor element 10 in FIG. 33 is produced in semiconductor element 81 and semiconductor element 84 that are on/off-controlled in accordance with a drive signal (FIG. 49) similar to that of semiconductor element 10. For example, in the operation pattern 1, the recovery surge voltage is produced in semiconductor elements 81 and 84 in the same manner as in semiconductor element 10 in FIG. 33. Furthermore, in the operation pattern 3, the off surge voltage is produced in semiconductor elements 81 and 84.

Furthermore, in consideration of the difference in current path described above, it is understood that, in power conversion device 1C, the current path causing surge voltage in the first and third operation patterns is the one including "-semiconductor element 82-semiconductor element 81-semiconductor element 83-semiconductor element 84" replaced with "-semiconductor element 9-semiconductor element 10-" in the current path shown in FIG. 33. Similarly, in the first and third operation patterns, the current path causing surge voltage is the one including "-semiconductor element 84-semiconductor element 83-semiconductor element 81-semiconductor element 82" replaced with "-semiconductor element 10-semiconductor element 9-" in the path shown in FIG. 33.

Based on FIG. 53, in power conversion device 1C, the current path causing surge voltage is similar to that of power conversion device 1A with respect to semiconductor elements 5 to 8 that constitute the bridge circuit. Therefore, the snubber circuit connected to semiconductor elements 5 to 8 is disposed in the same manner as in the first embodiment so that the surge voltage can be reduced.

Figure 54:
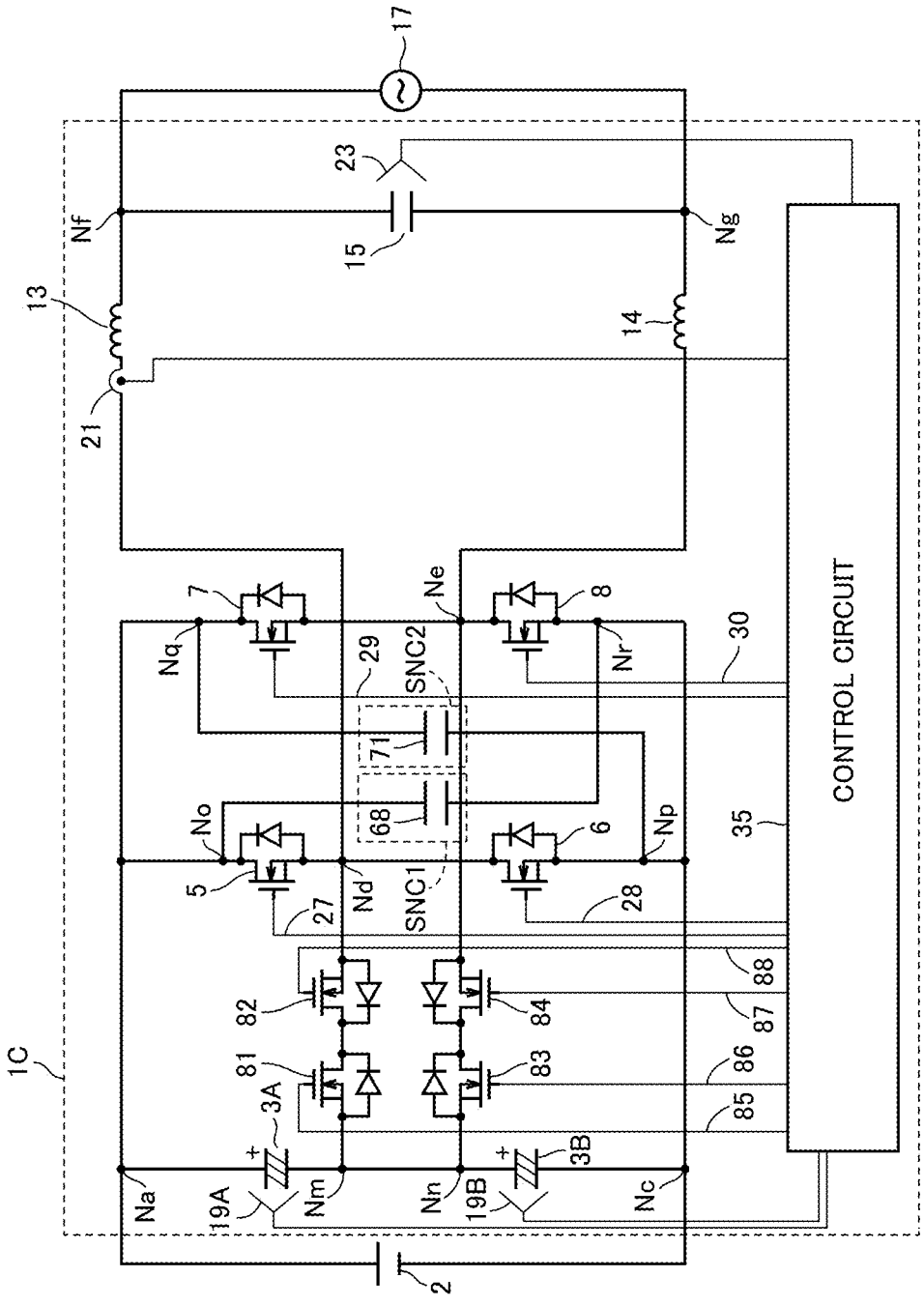
FIG. 54 is a circuit diagram depicting an arrangement example of snubber capacitors (snubber circuits) in the power conversion device according to the third embodiment.

FIG. 54 is a circuit diagram depicting an arrangement example of snubber capacitors (snubber circuits) in the power conversion device according to the third embodiment.

Referring to FIG. 54, based on the current path causing surge voltage shown in FIG. 53, even in power conversion device 1C, snubber capacitors 68, 71 are disposed such that the connection distance between the positive electrode of semiconductor element 5 and the negative electrode of semiconductor element 8 and the connection distance between the positive electrode of semiconductor element 7 and the negative electrode of semiconductor element 6 are reduced.

Specifically, snubber capacitor 68 is disposed in the same manner as in the first embodiment such that the connection distance between snubber capacitor 68 and the positive electrode of semiconductor element 5 is shorter than the connection distance between snubber capacitor 68 and the positive electrode of semiconductor element 7 and that the connection distance between snubber capacitor 68 and the negative electrode of semiconductor element 8 is shorter than the wiring distance between snubber capacitor 68 and the negative electrode of semiconductor element 6.

Similarly, snubber capacitor 71 is disposed such that the connection distance between snubber capacitor 71 and the positive electrode of semiconductor element 7 is shorter than the connection distance between snubber capacitor 71 and the positive electrode of semiconductor element 5 and that the connection distance between snubber capacitor 71 and the negative electrode of semiconductor element 6 is shorter than the connection distance between snubber capacitor 71 and the negative electrode of semiconductor element 8.

Even in the configuration example in FIG. 54, semiconductor element 5 corresponds to "first semiconductor element", semiconductor element 6 corresponds to "second semiconductor element", semiconductor element 7 corresponds to "third semiconductor element", and semiconductor element 8 corresponds to "fourth semiconductor element". Snubber circuit SNC1 corresponds to an example of "first snubber circuit", and snubber circuit SNC2 corresponds to an example of "second snubber circuit". Furthermore, smoothing capacitors 3A and 3B correspond to "first capacitor" and "second capacitor", and nodes Nm, Nn correspond to "the connection point of the first and second capacitors". Semiconductor element 81 corresponds to "seventh semiconductor element", and semiconductor element 82 corresponds to "eighth semiconductor element". Semiconductor elements 81 and 82 constitute "second bidirectional switch". Similarly, semiconductor element 83 corresponds to "ninth semiconductor element", semiconductor element 84 corresponds to "tenth semiconductor element", and semiconductor elements 83 and 84 constitute "third bidirectional switch".

In this way, even in the power conversion device according to the third embodiment, the wiring inductance causing surge voltage is intensively reduced, so that the surge voltage associated with the switching operation of semiconductor elements can be reduced.

Power conversion device 1A according to the first embodiment and power conversion device 1C according to the third embodiment have in common in that they include semiconductor elements that constitute a bidirectional switch functioning as a clamp circuit between the midpoint of the first leg and the midpoint of the second leg of the bridge circuit (semiconductor elements 5 to 8) corresponding to the two-level inverter according to the comparative example. Because of the operation of the bidirectional switch, in power conversion device 1A and power conversion device 1C, unlike the two-level inverter of the comparative example, there is a period in which current does not flow through semiconductor elements 5 to 8 that constitute the bridge circuit.

As a result, in power conversion device 1A, 1C, when a surge voltage occurs due to commutation associated with the switching operation from a current path not including semiconductor elements 5 to 8, the wiring inductance causing surge voltage differs from that in the two-level inverter configured only with the bridge circuit including semiconductor elements 5 to 8.

Therefore, in power conversion device 1A, 1C, although the electrical connection relation of snubber circuits SNC1, SNC2 to semiconductor elements 5 to 8 is the same, the arrangement position (the length of the connection distance) differs from the comparative example illustrated in FIG. 38 (the snubber circuit arrangement for the two-level inverter). In other words, the surge voltage can be reduced with the configuration illustrated in FIG. 39 and FIG. 54.

In the main circuit configuration in FIG. 48, semiconductor element 81 and semiconductor element 82 may be connected in series such that their negative electrodes are connected to each other to form a bidirectional switch. Similarly, semiconductor element 83 and semiconductor element 84 may also be connected in series such that their negative electrodes are connected to each other to form a bidirectional switch.

Even in power conversion device 1C according to the third embodiment, semiconductor element 81 and semiconductor element 82 may be configured with elements having withstand voltage in opposite directions and they may be connected in antiparallel to form a bidirectional switch, in the same manner as described in the first embodiment. Semiconductor element 83 and semiconductor element 84 may also constitute a bidirectional switch in the same manner as described above.

Furthermore, even in power conversion device 1C according to the third embodiment, the snubber circuit shown in FIG. 54 may be configured as an RC snubber circuit shown in FIG. 40 or an RCD snubber circuit shown in FIG. 41.

Fourth Embodiment

In a fourth embodiment, arrangement examples of semiconductor elements and snubber capacitors in implementation of power conversion device 1C described in the third embodiment will be described.

Figure 55:
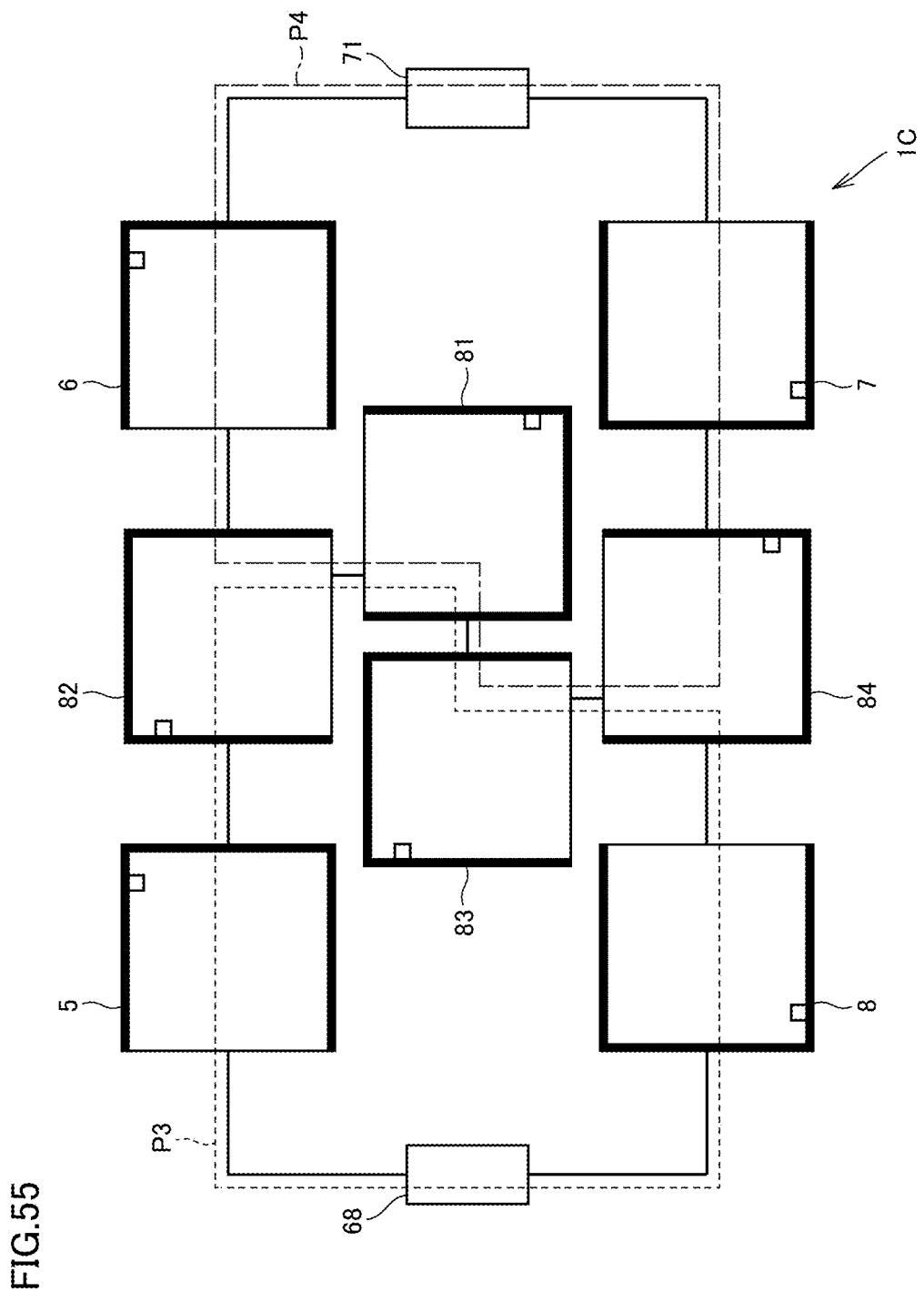
FIG. 55 is a first arrangement diagram of semiconductor elements and snubber capacitors in a power conversion device according to a fourth embodiment.

FIG. 55 is a first arrangement diagram of semiconductor elements and snubber capacitors in a power conversion device according to the fourth embodiment.

Referring to FIG. 55, each of semiconductor elements 5 to 8 and semiconductor elements 81 to 84 which are elements of power conversion device 1C is configured with a discrete element having a quadrangle-shaped surface-mounted discrete package, in the same manner as in FIG. 43 to FIG. 45. In the fourth embodiment, the sides on which the positive electrode, the negative electrode, and the control electrode are disposed are depicted in the same manner as in the second embodiment (FIG. 43 to FIG. 45).

The positive electrode of semiconductor element 5 is connected to one end of snubber capacitor 68, and the negative electrode on the bottom side of semiconductor element 5 and the negative electrode on the right side of semiconductor element 82 are connected. The negative electrode on the left side of semiconductor element 82 is connected to the positive electrode of semiconductor element 6, and the negative electrode on the bottom side of semiconductor element 6 and one end of the snubber capacitor are connected. The positive electrode of semiconductor element 7 and the other end of snubber capacitor 71 are connected, and the negative electrode on the bottom side of semiconductor element 7 and the negative electrode on the right side of semiconductor element 84 are connected.

Furthermore, the positive electrode of semiconductor element 84 and the positive electrode of semiconductor element 83 are connected, and the negative electrode on the left side of semiconductor element 83 and the negative electrode on the left side of semiconductor element 81 are connected. The positive electrode of semiconductor element 81 is connected to the positive electrode of semiconductor element 82, and the negative electrode on the left side of semiconductor element 84 and the positive electrode of semiconductor element 8 are connected. The negative electrode on the bottom side of semiconductor element 8 is connected to the other end of snubber capacitor 68.

In the first arrangement example, semiconductor element 5, semiconductor element 82, and semiconductor element 6 are aligned in line to form a row, and semiconductor element 8, semiconductor element 84, and semiconductor element 7 are aligned in line to form a row. These rows are arranged in parallel, and semiconductor element 83 and semiconductor element 81 are connected between these rows.

As described above, in power conversion device 1C, a path P3 indicated by a dotted line and a path P4 indicated by a dot-and-dash line in FIG. 55 are formed as wiring impedance that affects the surge voltage. Path P3 passes through snubber capacitor 68-semiconductor element 5-semiconductor element 82-semiconductor element 81-semiconductor element 83-semiconductor element 84-semiconductor element 8-snubber capacitor 68. Path P4 passes through snubber capacitor 71-semiconductor element 7-semiconductor element 84-semiconductor element 83-semiconductor element 81-semiconductor element 82-semiconductor element 6-snubber capacitor 71.

Semiconductor element 82 and semiconductor element 84 are disposed in the middle of the respective rows such that semiconductor elements 81 to 84 common to path P3 and path P4 are disposed at the center. The arrangement order of semiconductor elements in each row is set such that semiconductor element 5 and semiconductor element 8 are close to each other and semiconductor element 6 and semiconductor element 7 are closed to each other between two rows.

Specifically, semiconductor elements 5 to 8 and semiconductor elements 81 to 84 are arranged such that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7, in the same manner as in the second embodiment.

In FIG. 55, snubber capacitors 68 and 71 are disposed on the outside of the range in which six semiconductor elements 5 to 8 and semiconductor elements 81 to 84 are arranged, in the same manner as in FIG. 43. Thus, the positive electrodes of semiconductor element 5 and semiconductor element 7, which are connected to smoothing capacitor 3 in addition to snubber capacitors 68 and 71, can be arranged so as to face the outside of the arrangement group of semiconductor elements 5 to 8 and semiconductor elements 81 to 84. As a result, the positive electrodes of semiconductor element 5 and semiconductor element 7 are easily connected to smoothing capacitor 3.

Figure 56:
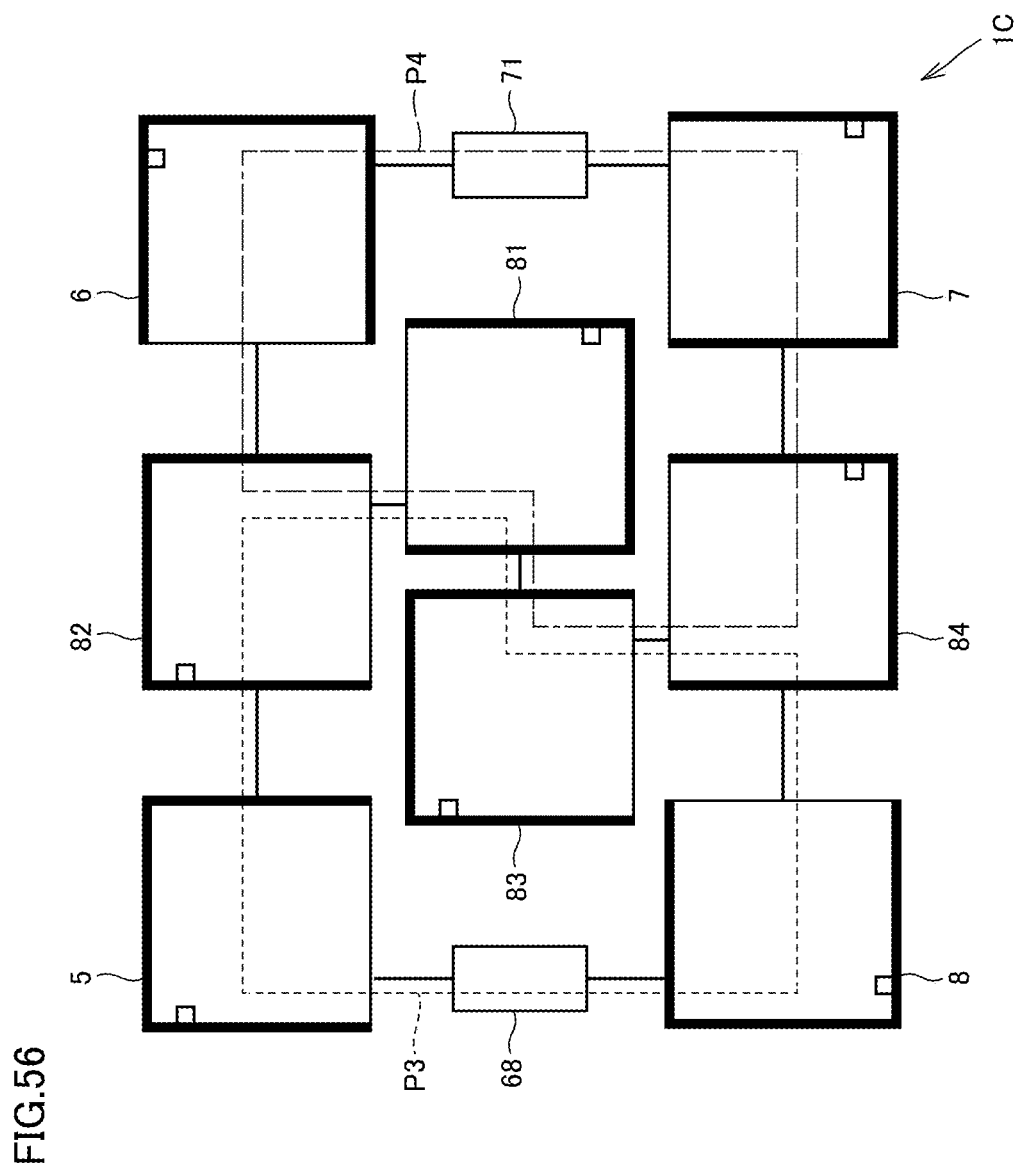
FIG. 56 is a second arrangement diagram of semiconductor elements and snubber capacitors in the power conversion device according to the fourth embodiment.

FIG. 56 shows a second arrangement example of semiconductor elements and snubber capacitors in the power conversion device according to the fourth embodiment.

Referring to FIG. 56, the second arrangement example differs from the first arrangement example (FIG. 55) in position of the positive electrodes and the negative electrodes of semiconductor element 5 and semiconductor element 7. Specifically, semiconductor element 5 and semiconductor element 7 are each rotated counterclockwise by 90 degrees from the arrangement in FIG. 55. Thus, the positive electrode of semiconductor element 5 is opposed to the negative electrode (the negative electrode on the left side) of semiconductor element 8, and the positive electrode of semiconductor element 7 is opposed to the negative electrode (the negative electrode on the left side) of semiconductor element 6.

Thus, the connection distance from snubber capacitor 68 to each of the positive electrode of semiconductor element 5 and the negative electrode of semiconductor element 8 can be made shorter than that of the arrangement example in FIG. 55. Similarly, the connection distance from snubber capacitor 71 to each of the positive electrode of semiconductor element 7 and the negative electrode of semiconductor element 6 can also be made shorter than that of the arrangement example in FIG. 55.

Thus, the wiring inductance associated with connection of snubber capacitor 68 and snubber capacitor 71 is reduced. Furthermore, the path length of path P3 and path P3 also can be reduced, compared with FIG. 55. As a result, the surge voltage can be further reduced.

On the other hand, in the second arrangement example, unlike FIG. 55, the positive electrodes of semiconductor element 5 and semiconductor element 7 do not face the outside of the arrangement group of semiconductor elements 5 to 8 and semiconductor elements 81 to 84. Therefore, it is necessary to ensure the insulation distance when wiring for connection to other elements such as smoothing capacitor 3 is drawn from the positive electrodes of semiconductor element 5 and semiconductor element 7, in the same manner as described with reference to FIG. 43.

As described at the end of the third embodiment, the negative electrodes of semiconductor element 81 and semiconductor element 82 may be connected to each other and the negative electrodes of semiconductor element 83 and semiconductor element 84 may be connected to each other. In this case, in FIG. 55 and FIG. 56, semiconductor elements 81 to 84 are rotated as appropriate to ensure the electrical connection relation for configuring power conversion device 1C. Similarly, semiconductor element 81 and semiconductor element 82 as well as semiconductor element 83 and semiconductor element 84 may be configured as two semiconductor elements having withstand voltage in opposite directions and which may be connected in parallel in opposite directions.

In the arrangement examples in FIG. 55 and FIG. 56, semiconductor element 5, semiconductor element 82, and semiconductor element 6 are aligned in line, and semiconductor element 8, semiconductor element 84, and semiconductor element 7 are aligned in line. However, a plurality of semiconductor elements need not be aligned in line precisely linearly. Similarly, the rows are not necessarily arranged precisely in parallel. In the fourth embodiment, displacement in arrangement is acceptable to an extent that satisfies the conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7, in the same manner as in the second embodiment.

In the fourth embodiment, semiconductor elements 5 to 8 and semiconductor elements 81 to 84 included in power conversion device 1C according to the third embodiment may be mounted on any kind of substrate, in the same manner as in the second embodiment. More specifically, a multilayer printed wiring board, a monolayer printed wiring board, or a metal substrate having one side formed of metal can be employed as the substrate.

Figure 57:
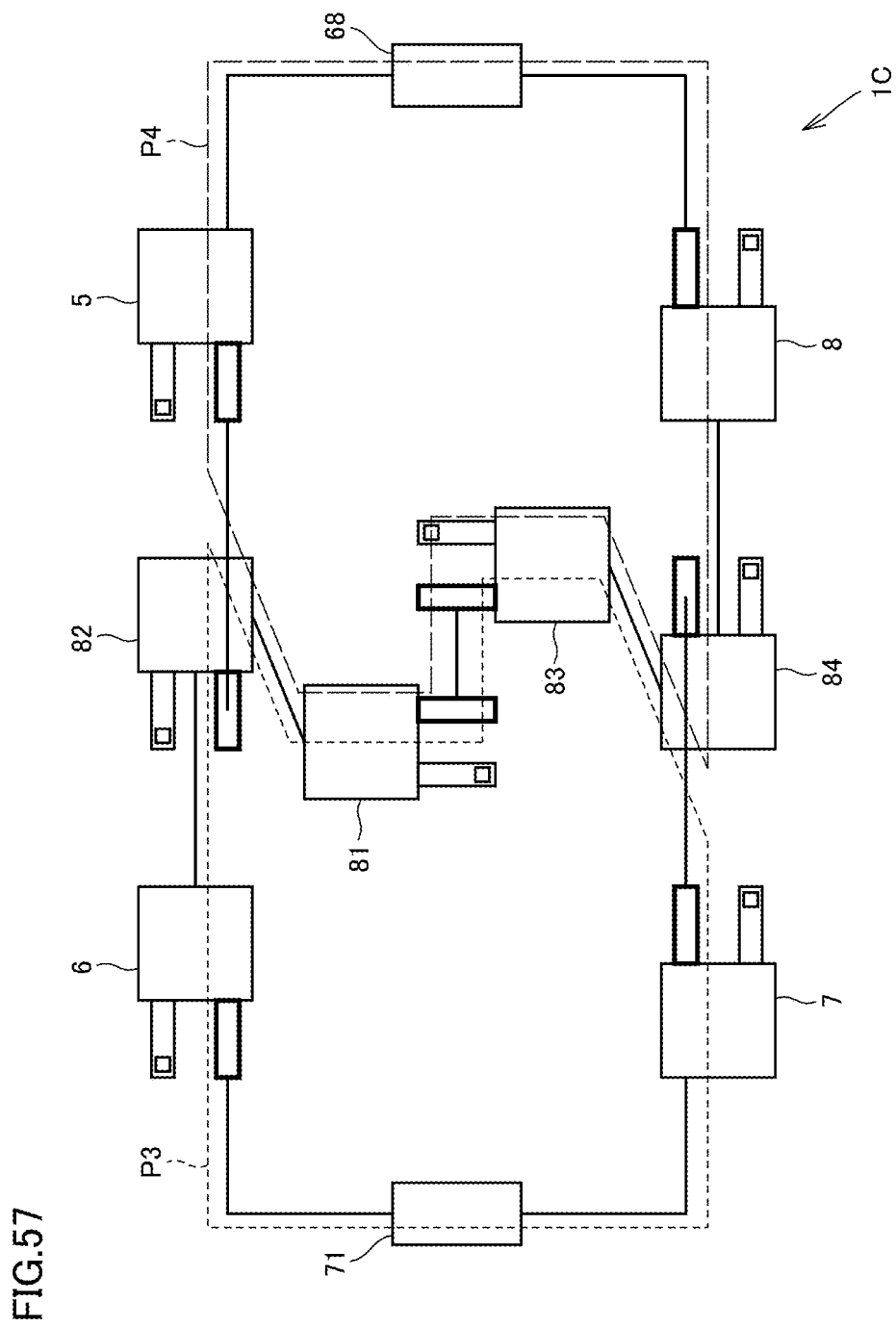
FIG. 57 is a third arrangement diagram of semiconductor elements and snubber capacitors in the power conversion device according to the fourth embodiment.

FIG. 57 is a third arrangement diagram of semiconductor elements and snubber capacitors in the power conversion device according to the fourth embodiment.

Referring to FIG. 57, each of semiconductor elements 5 to 8 and semiconductor elements 81 to 84 which are elements of power conversion device 1C is configured with an element having a discrete package such as TO-263 package, in the same manner as in FIG. 46. Specifically, in each semiconductor element in FIG. 57, the positive electrode is formed on the package back face, and the negative electrode and the control electrode are connected to the outside through leads. In the fourth embodiment, the leads of the negative electrode and the control electrode are depicted in the same manner as in the second embodiment (FIG. 46).

In the third arrangement example shown in FIG. 57, semiconductor element 5, semiconductor element 82, and semiconductor element 6 are aligned in line to form a row, and semiconductor element 8, semiconductor element 84, and semiconductor element 7 are aligned in line to form another row. These rows are placed in parallel, and snubber capacitor 68 is connected between the positive electrode of semiconductor element 5 and the negative electrode of semiconductor element 8. Furthermore, snubber capacitor 71 is connected between the positive electrode of semiconductor element 7 and the negative electrode of semiconductor element 6. Thus, path P3 indicated by a dotted line and path P4 indicated by a dot-and-dash line, including wiring impedance that affects the surge voltage, are formed in the same manner as in FIG. 55 and FIG. 56.

In the arrangement example in FIG. 57, it is understood that semiconductor elements 5 to 8 and semiconductor elements 81 to 84 are arranged in the same manner as in FIG. 55 and FIG. 56 so as to satisfy the conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7.

In particular, in the arrangement example in FIG. 57, in semiconductor elements 5 to 8 and semiconductor elements 81 to 84, the control electrodes are disposed to be aligned in a direction positioned on the outside of the region in which semiconductor elements 5 to 8 and semiconductor elements 81 to 84 are arranged. This facilitates placement of signal lines for transmitting drive signals 27 to 30 and drive signals 85 to 88 (FIG. 48) to respective control electrodes.

Alternatively, when placement of signal lines on a printed wiring board is not necessary because connection of a signal line to each control electrode is provided by a connector or the like, the advantage of positioning the control electrodes on the outside is reduced. In this case, the direction of semiconductor elements 81 to 84 is not limited.

Figure 58:
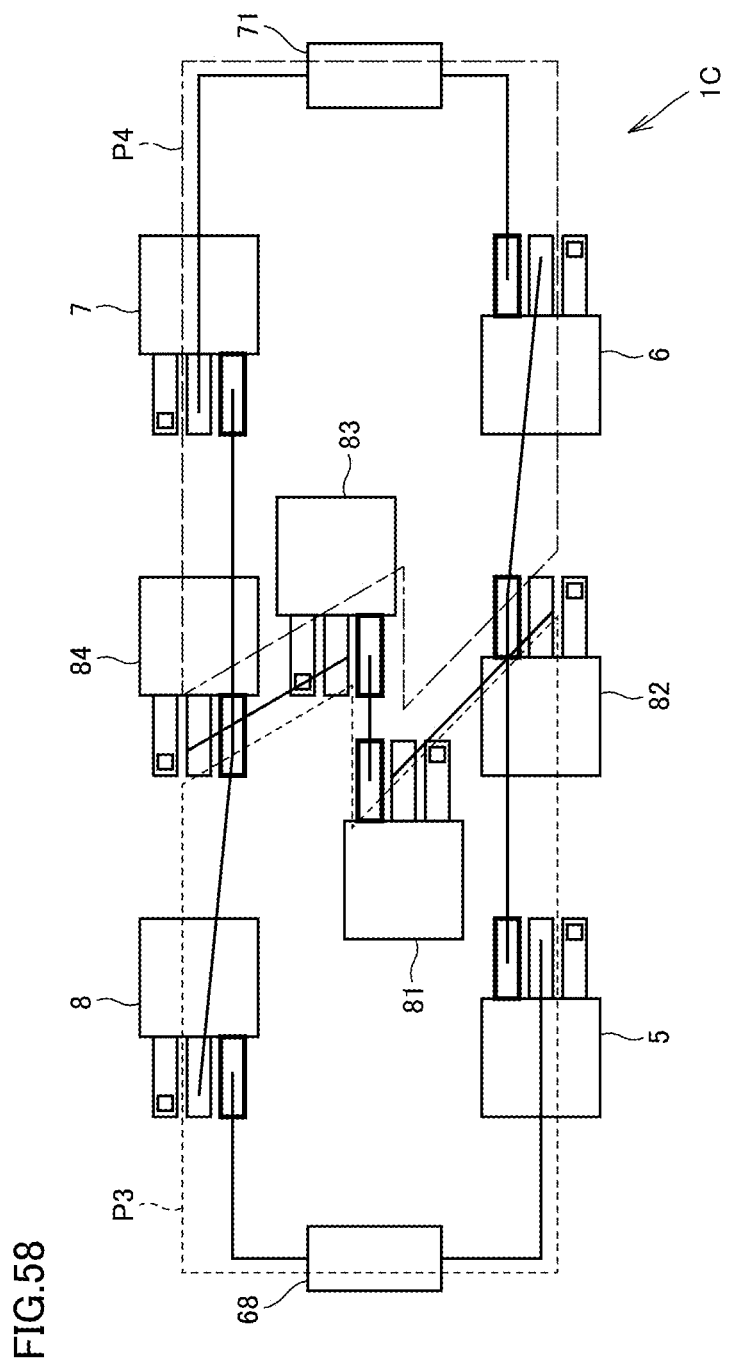
FIG. 58 is a fourth arrangement diagram of semiconductor elements and snubber capacitors in the power conversion device according to the fourth embodiment.

FIG. 58 is a fourth arrangement diagram of semiconductor elements and snubber capacitors in the power conversion device according to the fourth embodiment.

Referring to FIG. 58, each of semiconductor elements 5 to 8 and semiconductor elements 81 to 84 which are elements of power conversion device 1C is configured with an element having a discrete package such as TO-247 package, in the same manner as in FIG. 47. More specifically, in each semiconductor element in FIG. 58, the positive electrode, the negative electrode, and the control electrode are individually connected to the outside through respective leads. In the fourth embodiment, the leads of the positive electrode, the negative electrode, and the control electrode are depicted in the same manner as in the second embodiment (FIG. 47).

In the fourth arrangement example shown in FIG. 58, semiconductor element 5, semiconductor element 82, and semiconductor element 6 are aligned in line to form a row, and semiconductor element 8, semiconductor element 84, and semiconductor element 7 are aligned in line to form another row. These two rows are placed in parallel, and semiconductor elements 81 and 83 are arranged between the two rows.

Furthermore, snubber capacitor 68 is connected between the positive electrode lead of semiconductor element 5 and the negative electrode lead of semiconductor element 8, and snubber capacitor 71 is connected between the positive electrode lead of semiconductor element 7 and the negative electrode lead of semiconductor element 6. In FIG. 58, path P3 indicated by a dotted line and path P4 indicated by a dot-and-dash line, including wiring impedance that affects the surge voltage, are also formed.

In the arrangement example in FIG. 58, it is understood that semiconductor elements 5 to 8 and semiconductor elements 81 to 84 are placed in the same manner as in FIG. 55 and the like so as to satisfy the conditions that the connection distance to the negative electrode of semiconductor element 8 is shorter than the connection distance to the negative electrode of semiconductor element 8, relative to the positive electrode of semiconductor element 5, and that the connection distance to the negative electrode of semiconductor element 6 is shorter than the connection distance to the negative electrode of semiconductor element 8, relative to the positive electrode of semiconductor element 7. Thus, the wiring length of path P3 and path P4 is shortened, thereby reducing the surge voltage produced by wiring inductance.

In FIG. 58, in semiconductor elements 5 to 8 and semiconductor elements 81 to 84, the control electrodes are disposed to be aligned in a direction positioned on the outside of the region in which semiconductor elements 5 to 8 and semiconductor elements 81 to 84 are arranged, in the same manner as in FIG. 57. This facilitates placement of signal lines for transmitting drive signals 27 to 30 and drive signals 85 to 88 (FIG. 48) to respective control electrodes.

Furthermore, when placement of signal lines on a printed wiring board is not necessary because connection of a signal line to each control electrode is provided by a connector or the like, the advantage of positioning the control electrodes on the outside is reduced. In this case, the direction of semiconductor elements 81 to 84 is not limited.

Embodiments disclosed here should be understood as being illustrative rather than being limitative in all respects. The scope of the present disclosure is shown not in the foregoing description but in the claims, and it is intended that all modifications that come within the meaning and range of equivalence to the claims are embraced here.

REFERENCE SIGNS LIST 1A, 1B, 1C power conversion device, 1X two-level inverter (comparative example), 2 DC power supply, 3, 3A, 3B smoothing capacitor, 5, 6, 7, 8, 9, 10, 75, 81, 82, 83, 84 semiconductor element, 13, 14 output filter reactor, 15 output filter capacitor, 17 AC power supply, 19, 19A, 19B, 23 voltage detector, 21 current detector, 27 to 32, 85 to 88, 202 to 205, 214, 215, 1002, 1003 drive signal, 35 control circuit, 40 to 61, 64, 67, 69, 70, 72, 1703 wiring inductance, 62, 65, 68, 71 snubber capacitor, 68D, 71D diode, 68R, 71R resistance element, 201, 1001 AC output command value, 1702 switch, 1704 load, Na to Nk, Nm, Nn, No, Np, Nq, Nr node, SNC1, SNC2 snubber circuit.

The invention claimed is:

1. A power conversion device comprising:
a first leg including first and second semiconductor elements connected to each other in series;
a second leg connected in parallel with the first leg and including third and fourth semiconductor elements connected to each other in series;
a first snubber circuit connected in parallel with the first leg and the second leg;
a second snubber circuit connected in parallel with the first leg, the second leg, and the first snubber circuit; and
at least one semiconductor element electrically connected between a midpoint of the first leg that is a connection point of the first semiconductor element and the second semiconductor element and a midpoint of the second leg that is a connection point of the third semiconductor element and the fourth semiconductor element, wherein
a positive electrode of the first semiconductor element and a positive electrode of the third semiconductor element are connected to each other, a negative electrode of the first semiconductor element and a positive electrode of the second semiconductor element are connected, a negative electrode of the third semiconductor element and a positive electrode of the fourth semiconductor element are connected, and a negative electrode of the second semiconductor element and a negative electrode of the fourth semiconductor element are connected,
a connection distance between the first snubber circuit and the positive electrode of the first semiconductor element is shorter than a connection distance between the first snubber circuit and the positive electrode of the third semiconductor element, and a connection distance between the first snubber circuit and the negative electrode of the fourth semiconductor element is shorter than a connection distance between the first snubber circuit and the negative electrode of the second semiconductor element, and
a connection distance between the second snubber circuit and the positive electrode of the third semiconductor element is shorter than a connection distance between the second snubber circuit and the positive electrode of the first semiconductor element, and a connection distance between the second snubber circuit and the negative electrode of the second semiconductor element is shorter than a connection distance between the second snubber circuit and the negative electrode of the fourth semiconductor element.

2. The power conversion device according to claim 1, wherein each of the first and second snubber circuits includes a capacitor.

3. The power conversion device according to claim 1, wherein each of the first and second snubber circuits includes a capacitor and a resistor connected in series.

4. The power conversion device according to claim 1, wherein each of the first and second snubber circuits includes
a capacitor and a resistor connected in series, and
a diode connected in parallel with the resistor.

5. The power conversion device according to claim 1, wherein the at least one semiconductor element includes fifth and sixth semiconductor elements to configure a first bidirectional switch connected between the midpoint of the first leg and the midpoint of the second leg.

6. The power conversion device according to claim 5, wherein a negative electrode of the fifth semiconductor element is connected to the midpoint of the first leg, a negative electrode of the sixth semiconductor element is connected to the midpoint of the second leg, and positive electrodes of the fifth and sixth semiconductor elements are connected to each other.

7. The power conversion device according to claim 5, wherein a positive electrode of the fifth semiconductor element is connected to the midpoint of the first leg, a positive electrode of the sixth semiconductor element is connected to the midpoint of the second leg, and negative electrodes of the fifth and sixth semiconductor elements are connected to each other.

8. The power conversion device according to claim 5, wherein the fifth and sixth semiconductor elements are connected in parallel between the midpoint of the first leg and the midpoint of the second leg to have withstand voltage in opposite directions.

9. The power conversion device according to claim 5, wherein
the first semiconductor element, the fifth semiconductor element, and the second semiconductor element are arranged to form a first row,
the third semiconductor element, the sixth semiconductor element, and the fourth semiconductor element are arranged to form a second row,
in the first row, the fifth semiconductor element is disposed between the first semiconductor element and the second semiconductor element,
in the second row, the sixth semiconductor element is disposed between the third semiconductor element and the fourth semiconductor element, and
an arrangement order in each of the first and second rows disposed in parallel is determined such that the first semiconductor element is closer to the fourth semiconductor element than the third semiconductor element and the second semiconductor element is closer to the third semiconductor element than the fourth semiconductor element.

10. The power conversion device according to claim 1, further comprising first and second capacitors connected in series, the first and second capacitors being connected in parallel with the first leg and the second leg, wherein
the at least one semiconductor element includes
seventh and eighth semiconductor elements to form a second bidirectional switch connected between a connection point of the first and second capacitors and the midpoint of the first leg, and ninth and tenth semiconductor elements to form a third bidirectional switch connected between the connection point of the first and second capacitors and the midpoint of the second leg.

11. The power conversion device according to claim 10, wherein
- a negative electrode of the seventh semiconductor element is connected to the connection point of the first and second capacitors, a negative electrode of the eighth semiconductor element is connected to the midpoint of the first leg, and positive electrodes of the seventh and eighth semiconductor elements are connected to each other, and
- a negative electrode of the ninth semiconductor element is connected to the connection point of the first and second capacitors, a negative electrode of the tenth semiconductor element is connected to the midpoint of the second leg, and positive electrodes of the ninth and tenth semiconductor elements are connected to each other.

12. The power conversion device according to claim 10, wherein
- a positive electrode of the seventh semiconductor element is connected to the connection point of the first and second capacitors, a positive electrode of the eighth semiconductor element is connected to the midpoint of the first leg, and negative electrodes of the seventh and eighth semiconductor elements are connected to each other, and
- a positive electrode of the ninth semiconductor element is connected to the connection point of the first and second capacitors, a positive electrode of the tenth semiconductor element is connected to the midpoint of the second leg, and negative electrodes of the ninth and tenth semiconductor elements are connected to each other.

13. The power conversion device according to claim 10, wherein
- the seventh and eighth semiconductor elements are connected in parallel between the connection point of the first and second capacitors and the midpoint of the first leg to have withstand voltage in opposite directions, and
- the ninth and tenth semiconductor elements are connected in parallel between the connection point of the first and second capacitors and the midpoint of the second leg to have withstand voltage in opposite directions.

14. The power conversion device according to claim 1, wherein each of the first semiconductor element, the second semiconductor element, the third semiconductor element, the fourth semiconductor element, and the at least one semiconductor element is configured with a discrete element.

15. The power conversion device according to claim 14, wherein each semiconductor element is configured with a quadrangle-shaped surface-mounted discrete package and has a positive electrode disposed on one of four sides of the quadrangle and a negative electrode disposed on other three sides of the four sides.

16. The power conversion device according to claim 14, wherein each semiconductor element is configured with a surface-mounted discrete package having respective leads of at least a negative electrode and a control electrode.

17. The power conversion device according to claim 14, wherein each semiconductor element is formed with a discrete package having respective leads of at least a positive electrode, a negative electrode, and a control electrode.

* * * * *